US011252859B2

(12) United States Patent
Hubalek et al.

(10) Patent No.: US 11,252,859 B2
(45) Date of Patent: Feb. 22, 2022

(54) METERING DEVICE WITH REMOVABLE GATE ASSEMBLY

(71) Applicant: Great Plains Manufacturing, Inc., Salina, KS (US)

(72) Inventors: Verne A. Hubalek, Lindsborg, KS (US); Alex Potuzak, Salina, KS (US); Larry C. Spaeny, Assaria, KS (US); Steven Gerald Dunning, Assaria, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 271 days.

(21) Appl. No.: 16/548,507

(22) Filed: Aug. 22, 2019

(65) Prior Publication Data

US 2021/0051842 A1    Feb. 25, 2021

(51) Int. Cl.
*A01C 7/12* (2006.01)
*A01C 7/10* (2006.01)

(52) U.S. Cl.
CPC .............. *A01C 7/124* (2013.01); *A01C 7/102* (2013.01); *A01C 7/122* (2013.01); *A01C 7/127* (2013.01)

(58) Field of Classification Search
CPC .................................. A01C 7/102; A01C 7/12
See application file for complete search history.

(56) References Cited

U.S. PATENT DOCUMENTS

| 4,408,704 A * | 10/1983 | Steilen ................... A01C 7/123 111/177 |
| 4,793,523 A | 12/1988 | Bailey et al. |
| 4,928,858 A * | 5/1990 | Tite ......................... A01C 7/123 111/34 |
| 6,205,938 B1 | 3/2001 | Foley et al. |
| 6,598,548 B2 | 7/2003 | Lempriere |

(Continued)

FOREIGN PATENT DOCUMENTS

| DE | 100383 | 12/1898 |
| DE | 251390 C | 10/1912 |

(Continued)

OTHER PUBLICATIONS

European Search Report dated Jan. 18, 2021 for related European Patent Application No. 20190294.7, 9 pages.

(Continued)

*Primary Examiner* — Thomas B Will
*Assistant Examiner* — Ian A Normile
(74) *Attorney, Agent, or Firm* — Hovey Williams LLP; Kameron D. Kelly

(57) ABSTRACT

A metering device for dispensing agricultural product from a bin. The metering device comprises a housing enclosing an interior space, and a gate assembly removably received within the interior space of the housing. The gate assembly is configured to guide agricultural product through the housing. The gate assembly comprises a product gate comprising an arcuately-extending gate valve. The product gate at least partially defines a channel within the interior space of the housing through which agricultural product can flow. The gate assembly further comprises a gate key configured to selectively secure the product gate within the housing. Rotation of the gate key is configured to cause a corresponding rotation of the product gate.

17 Claims, 40 Drawing Sheets

(56) References Cited

U.S. PATENT DOCUMENTS

| | | | |
|---|---|---|---|
| 7,341,009 B2 | 3/2008 | Kaster et al. | |
| 7,765,943 B2 | 8/2010 | Landphair et al. | |
| 8,166,895 B2 | 5/2012 | Dean et al. | |
| 8,196,534 B2 | 6/2012 | Meyer et al. | |
| 8,434,416 B2 | 5/2013 | Kowalchuk et al. | |
| 8,671,857 B2 | 3/2014 | Kowalchuk et al. | |
| 9,148,990 B2 | 10/2015 | Redman et al. | |
| 9,609,804 B2 | 4/2017 | Kowalchuck et al. | |
| 2021/0176913 A1 * | 6/2021 | Radeke | A01C 7/123 |

FOREIGN PATENT DOCUMENTS

| | | | | |
|---|---|---|---|---|
| DE | 475086 C | 4/1929 | | |
| DE | 6801000 U | 1/1969 | | |
| DE | 2726915 A1 * | 12/1978 | | A01C 7/125 |
| DE | 3527761 * | 2/1987 | | A01C 7/04 |
| DE | 10028967 A1 * | 12/2001 | | A01C 7/123 |
| DE | 10155395 B4 | 5/2003 | | |
| EP | 0956756 B1 | 11/1999 | | |
| EP | 1086616 B1 | 3/2001 | | |
| EP | 1570716 B1 | 9/2005 | | |
| EP | 1430762 B1 | 11/2005 | | |
| EP | 1430761 B1 | 5/2006 | | |
| EP | 1832153 B1 | 9/2007 | | |
| EP | 2329703 B1 | 6/2011 | | |
| EP | 2468084 B1 | 6/2012 | | |
| EP | 2476302 B1 | 7/2012 | | |
| EP | 2011382 B1 | 11/2012 | | |
| EP | 2329703 B2 | 12/2012 | | |
| EP | 2832202 B1 | 2/2015 | | |
| EP | 2832203 B1 | 2/2015 | | |
| FR | 2691040 A1 * | 11/1993 | | A01C 7/04 |
| FR | 3001608 B1 | 7/2015 | | |
| GB | 1559378 * | 1/1980 | | A01C 7/125 |

OTHER PUBLICATIONS

Amazone Cataya Brochure, Amazonen-Werke H. Dreyer GmbH & Co. KG, www.amazone.de; www.amazone.at; 48 pages.

* cited by examiner

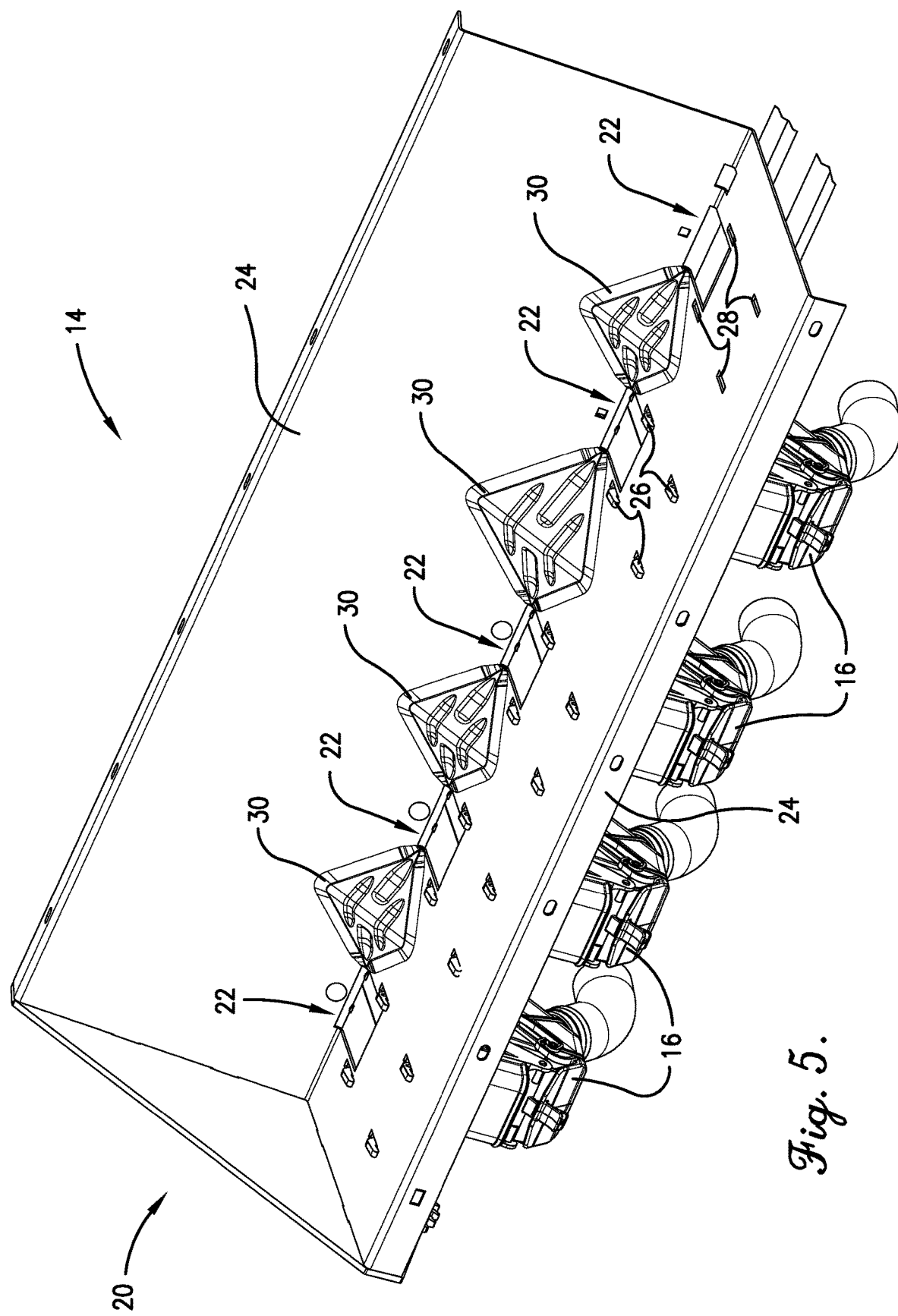

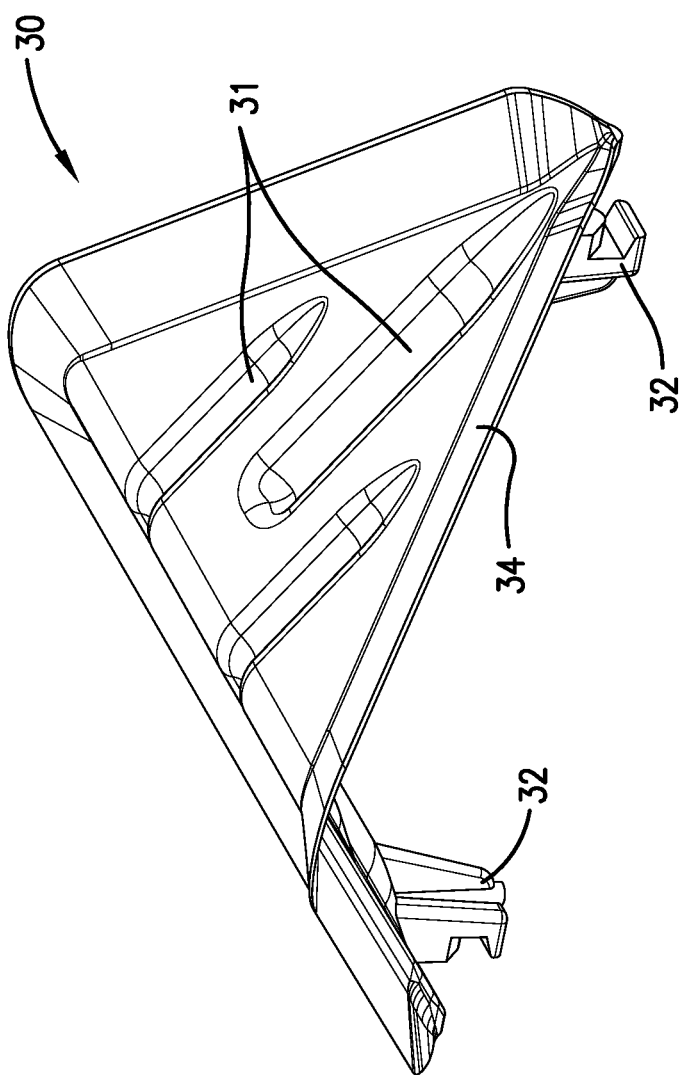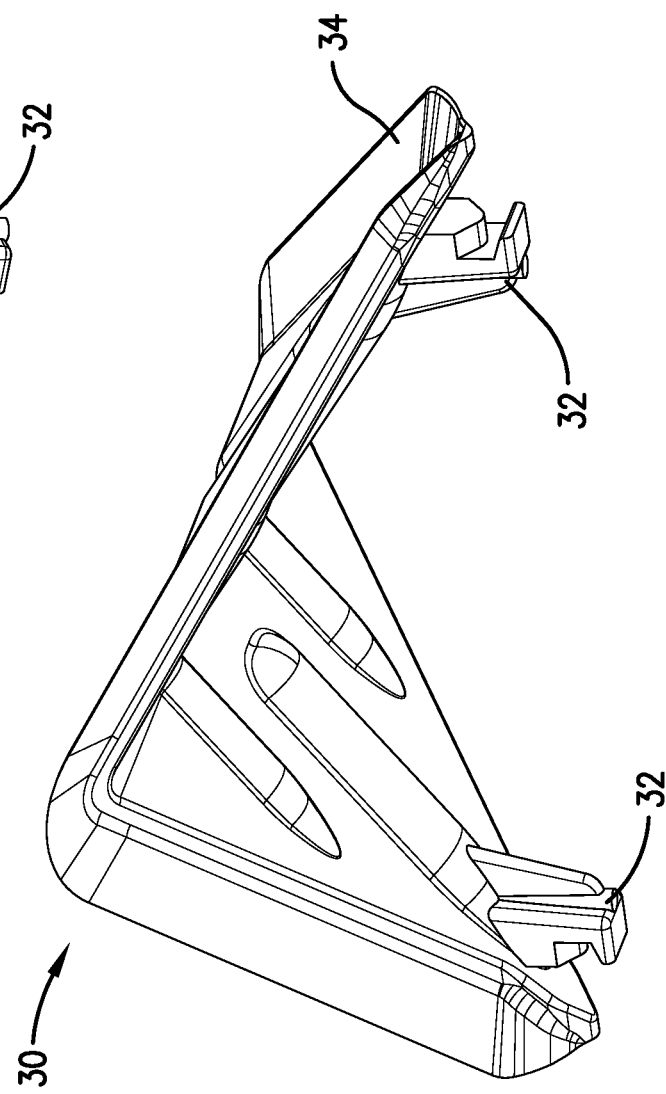

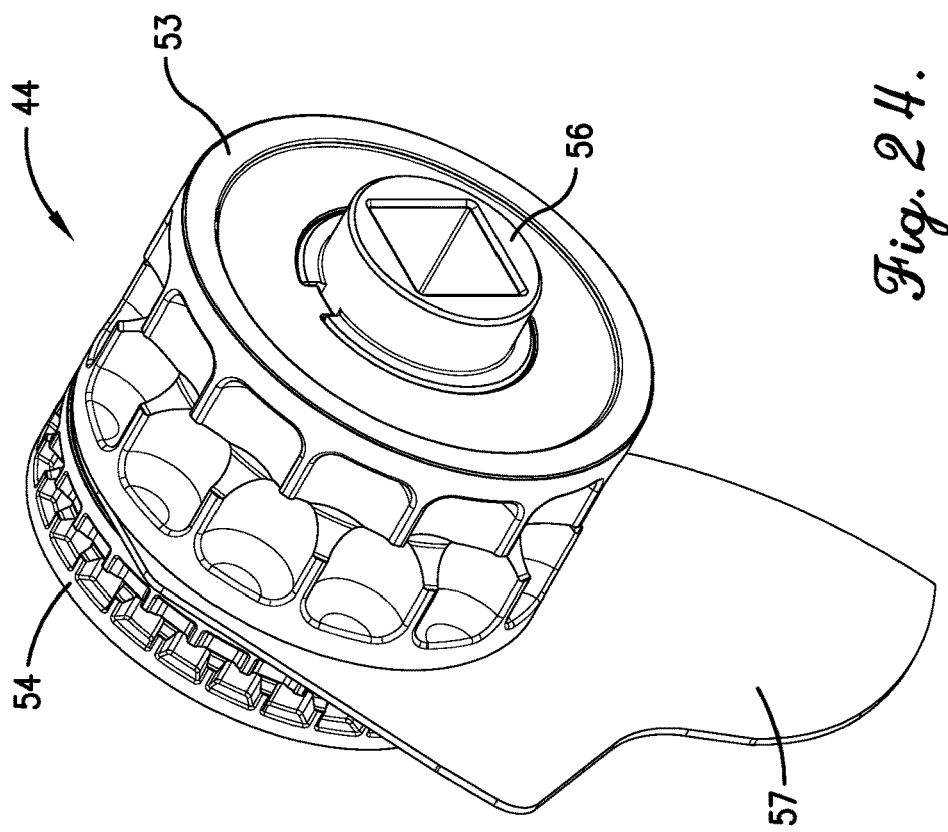
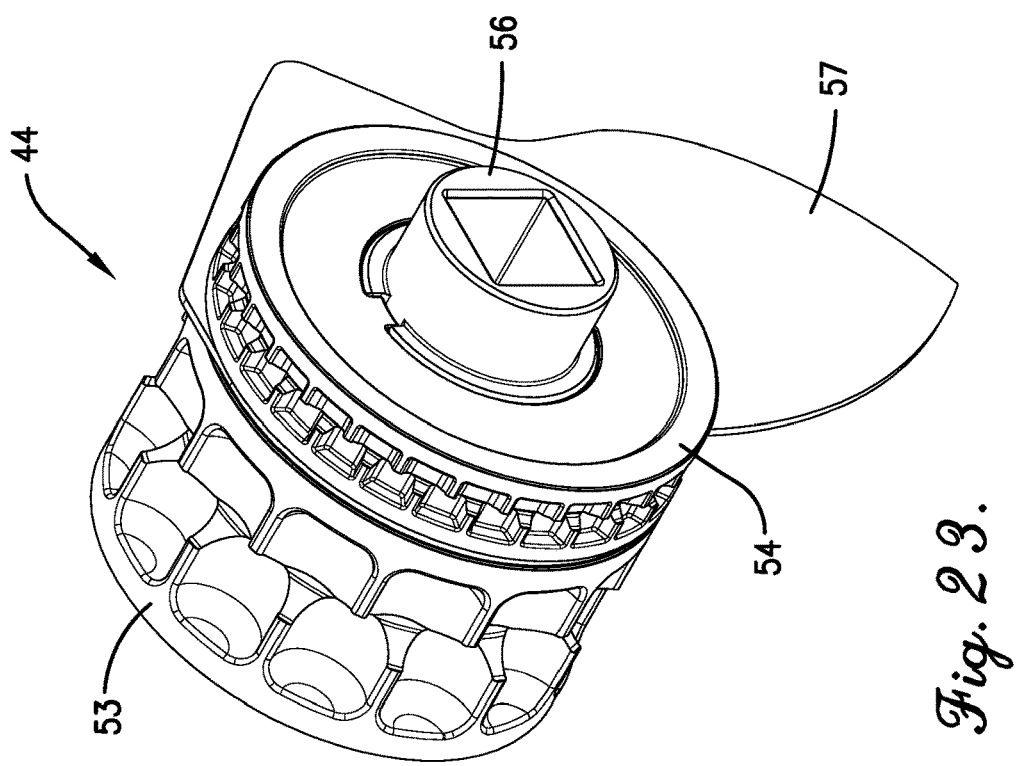

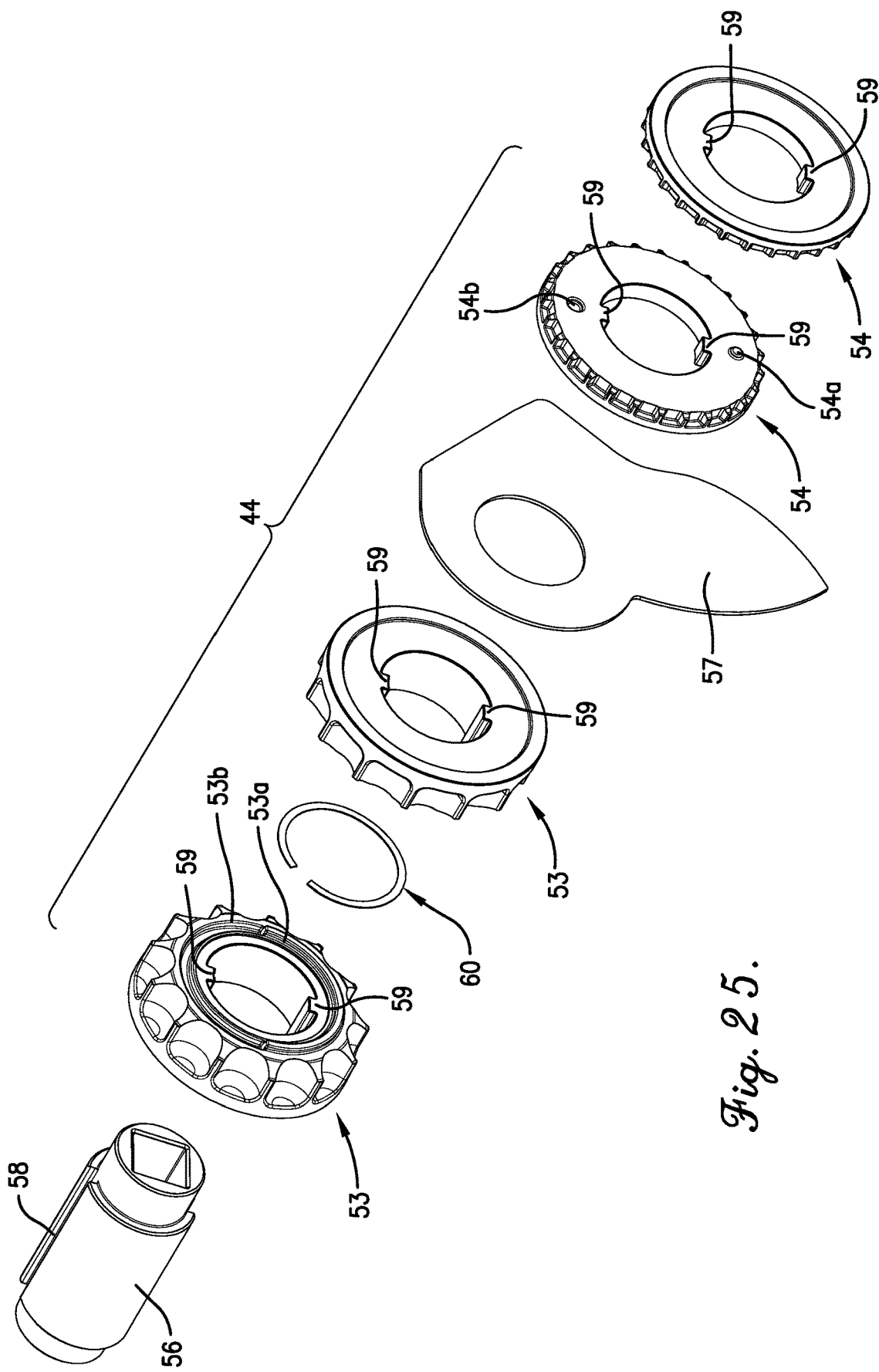

METERING DEVICE WITH REMOVABLE GATE ASSEMBLY

FIELD OF THE INVENTION

Embodiments of the present invention are directed generally to agricultural implements for seeding. In more detail, embodiments of the present invention are directed to agricultural implements that include seed bins and seed metering devices for dispensing seed and other agricultural products.

BACKGROUND OF THE INVENTION

Certain agricultural implements, such as seed drills are configured to dispense agricultural products (e.g., seed and/or treatment) into or onto the ground. Commonly, a seed drill will include one or more bins that hold agricultural product. As the seed drill is pulled through a field by a tractor or other prime mover, agricultural product can be dispensed from the bins via a plurality of metering devices associated with the bins.

Unfortunately, previously-used metering devices were often difficult to modify/adjust for use with different agricultural products. For instance, most previously-used metering devices were only configured for use with a single type of agricultural product, e.g., for use with a specific type of seed or treatment. Thus, if an operator wished to initially plant a specific type of seed into or onto the ground, the operator would initially use a plurality of metering devices of a first type to dispense the specific type of seed into or onto the ground. If the operator subsequently wished to apply a specific type of treatment into or onto the ground, the operator would be required to complete the difficult and time-consuming task of changing out each of the metering devices of the first type with a plurality of metering devices of a second type (i.e., metering devices configured to dispense the specific type of treatment).

In addition, previously-used metering devices were difficult and time-consuming to repair, clean, and otherwise maintain. Specifically, it has been generally difficult to access the interior space of previously-used metering devices. As such, maintenance and clean-outs of such metering devices (which required access to the interior spaces of the metering devices) necessitated the complete removal of the metering devices from the bins. In addition, if an operator wished to calibrate the metering devices, the calibration process would involve the difficult and time-consuming process of removing the individual metering devices from the bins, and then individually measuring and adjusting specifications and/or characteristics (e.g., dispensing rate) of each metering device.

Finally, it has been problematic for many previously-used bins to efficiently and completely distribute all of the agricultural product held within the bins to the associated seed meters for depositing into or onto the ground. Such previously-used bins would often have interior portions that would unwantedly trap or otherwise hold agricultural product within the bins. Such trapped agricultural product would have to be removed (or cleaned-out) from the bins by hand, which is a difficult and time-consuming process.

SUMMARY OF THE INVENTION

In one embodiment of the present invention, there is provided a metering device for dispensing agricultural product from a bin. The metering device comprises a housing enclosing an interior space, and a gate assembly removably received within the interior space of the housing. The gate assembly is configured to guide agricultural product through the housing. The gate assembly comprises a product gate comprising an arcuately-extending gate valve. The product gate at least partially defines a channel within the interior space of the housing through which agricultural product can flow. The gate assembly further comprises a gate key configured to selectively secure the product gate within the housing. Rotation of the gate key is configured to cause a corresponding rotation of the product gate.

In another embodiment of the present invention, there is provided an implement for dispensing agricultural product. The implement comprises a bin for holding the agricultural product, and a plurality of metering devices secured to a bottom of the bin. The metering devices are configured to dispense agricultural product from the bin into or onto the ground. Each of the metering devices includes a housing enclosing an interior space, and a gate assembly removably received within the interior space of the housing. The gate assembly is configured to guide agricultural product through the housing. The gate assembly comprises a product gate comprising an arcuately-extending gate valve. The product gate at least partially defines a channel within the interior space of the housing through which agricultural product can flow. The gate assembly further comprises a gate key configured to selectively secure the product gate within the housing. Rotation of the gate key is configured to cause a corresponding rotation of the product gate. The implement further comprises a driveshaft extending through each of said gate keys of said metering devices.

In a further embodiment of the present invention, there is provided a method of dispensing agricultural product from an implement. The method comprises a number of steps. One step includes providing agricultural product from a bin of the implement to a metering device. An additional step includes conveying agricultural product through a channel of the metering device. The channel is defined between at least one metering wheel and a gate assembly comprising an arcuately-shaped gate valve extending below the metering wheel. An additional step includes adjusting a position of the gate valve with respect to the metering wheel so as to adjust a size of the channel. A further step includes removing, by hand, the gate assembly from the housing of the metering device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 5 is an enlarged upper perspective view of a portion of the bottom section of the bin shown in FIG. 4;

FIG. 6 is an upper perspective view of a flow tent according to embodiments of the present invention;

FIG. 7 is a lower perspective view of the flow tent from FIG. 6;

FIG. 23 is a perspective view of a first side of a metering assembly according to embodiments of the present invention;

FIG. 24 is a perspective view of a second side of the metering assembly from FIG. 23;

FIG. 25 is a first side exploded view of the metering assembly from FIGS. 23 and 24;

Figure 1:
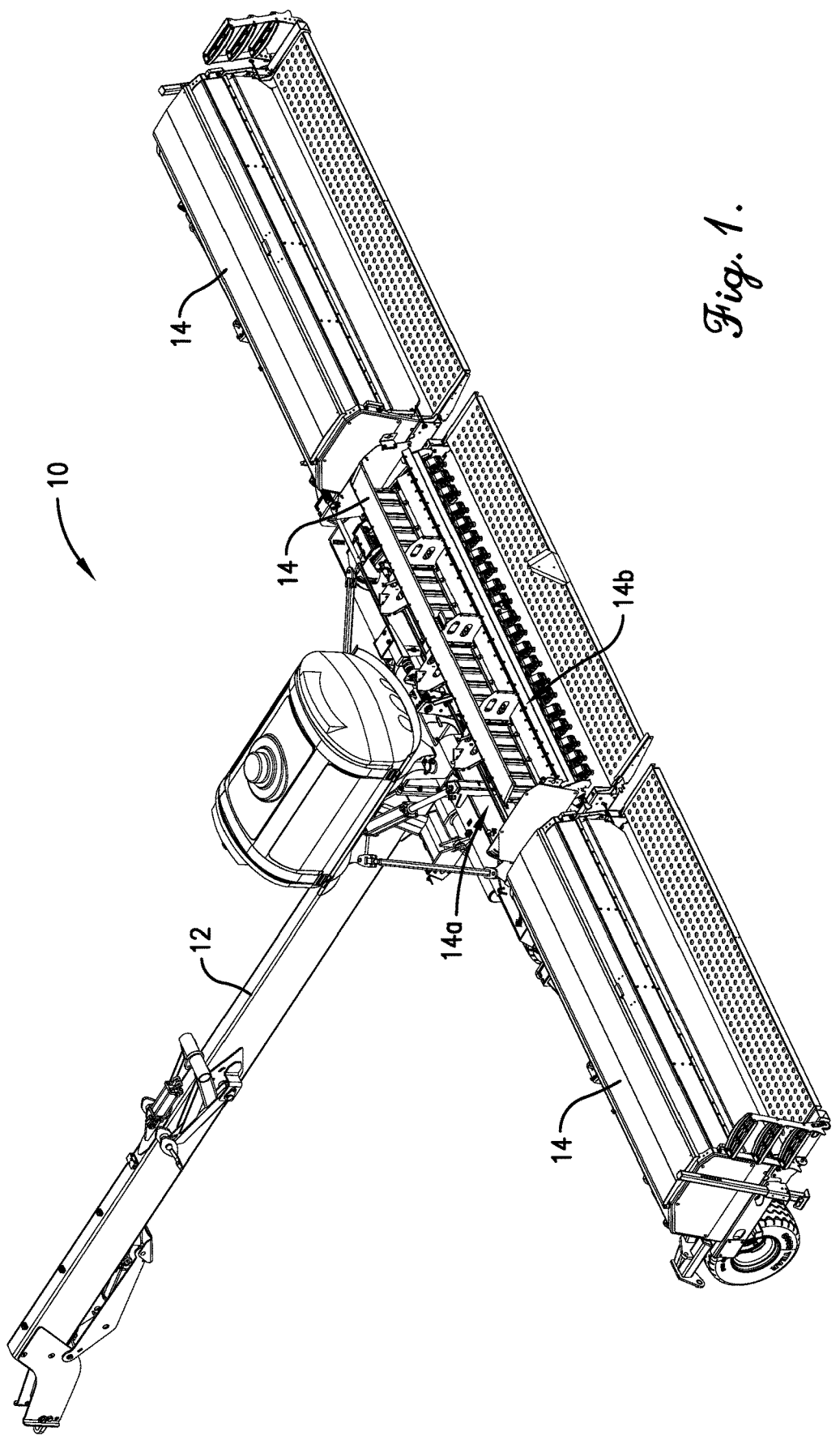
FIG. 1 is a perspective view of an agricultural implement according to embodiments of the present invention, with the agricultural implement propelling a plurality of bins that each include a plurality of metering devices for metering agricultural product from the bins into or onto the ground.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Embodiments of the present invention are directed generally to agricultural implements, such as seed and/or treatment drill 10 illustrated in FIG. 1. The drill 10 may comprise a frame 12 that is towed by a tractor or other prime mover (not shown). The frame 12 may include bins 14 that extend laterally across a portion of a length of the frame 12. As will be described in more detail below, the bins 14 are configured to hold agricultural products, such as seed and/or treatment (e.g., fertilizer, pesticides, etc.), for dispensing into and/or onto the ground. In some embodiments, the bins 14 may be divided into multiple containment sections that are each configured to hold distinct types of agricultural product. For instance, as illustrated by the central bin 14 shown in FIG. 1, the bins 14 may be separated in half, so as to include a forward containment section 14a and a rearward containment section 14b. As such, the forward containment section 14a may be configured to hold a first type of agricultural product (e.g., seed), while the rearward containment section 14b may be configured to hold a second type of agricultural product (e.g., treatment). As used herein, the term "treatment" may refer to fertilizers, pesticides, herbicides, nutrients, or other additives used in connection with seeding.

Figure 2:
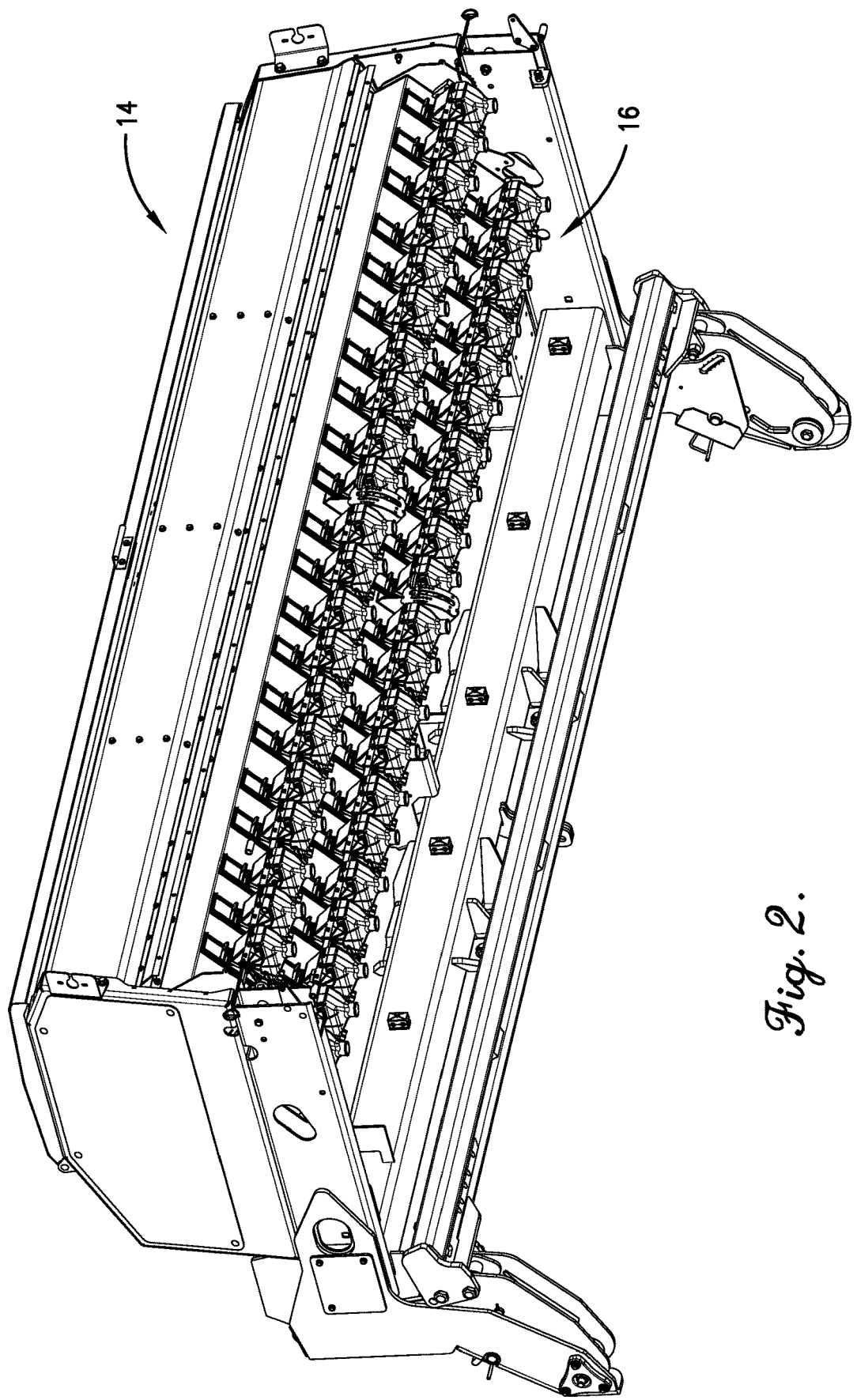
FIG. 2 is a bottom perspective view of an underside of one of the bins from the agricultural implement of FIG. 1, with the bin including a plurality of metering devices attached to a bottom of the bin.
Figure 3:
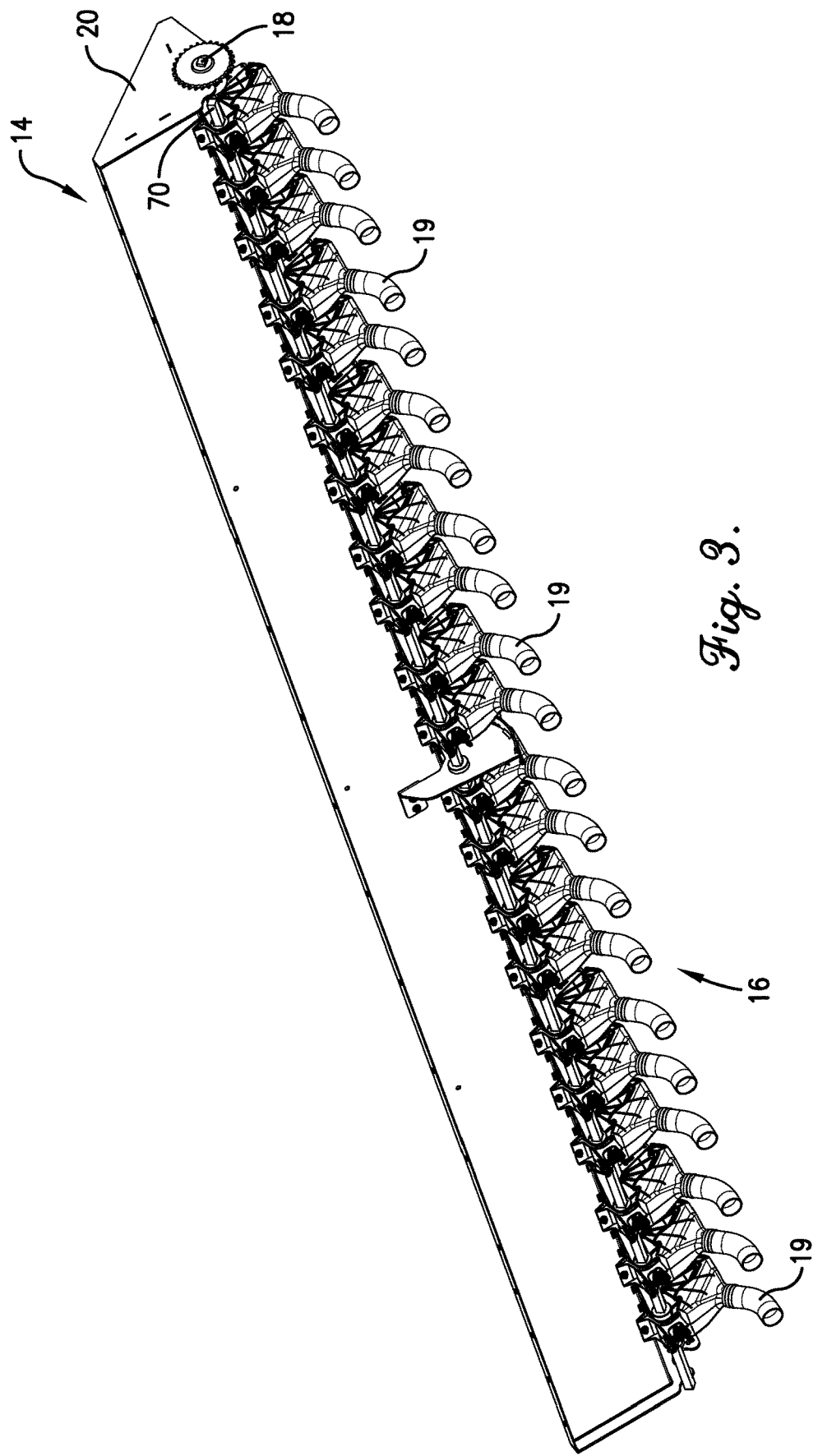
FIG. 3 is a lower perspective view of a bottom section of a bin from the agricultural implement from FIG. 1, with the bottom section of the bin including a row of metering devices secured to a bottom of the bottom section of the bin.

To facilitate dispensing of agricultural product from the drill 10, the drill 10 may additionally comprise a plurality of metering devices 16 secured to a bottom side of the bins 14, such as illustrated in FIG. 2. In instances in which the bins 14 are divided into multiple containment sections, embodiments may provide for a plurality of metering devices 16 to be secured to a bottom of each containment section. Nevertheless, as will be described in more detail below, the metering devices 16 are configured to precisely meter agricultural product from the bins 14 into or onto the ground. To accomplish such metering, the drill 10 may include a primary driveshaft 18 (See FIGS. 3 and 4) that extends through each of the metering devices 16 and rotates components of the metering devices 16 such that agricultural product can be removed from the bin 14, conveyed through the metering devices 16, and dispensed from the drill 10 into or onto the ground. As shown in FIG. 3, in some embodiments, each of the metering devices 16 may include a product tube 19 secured to a bottom end the metering device 16 and which extends downward towards the ground. In such embodiments, agricultural product may be metered from the bins 14 via the metering devices 16, and dispensed into or onto the ground after passing (e.g., falling) through the product tubes 19.

Figure 4:
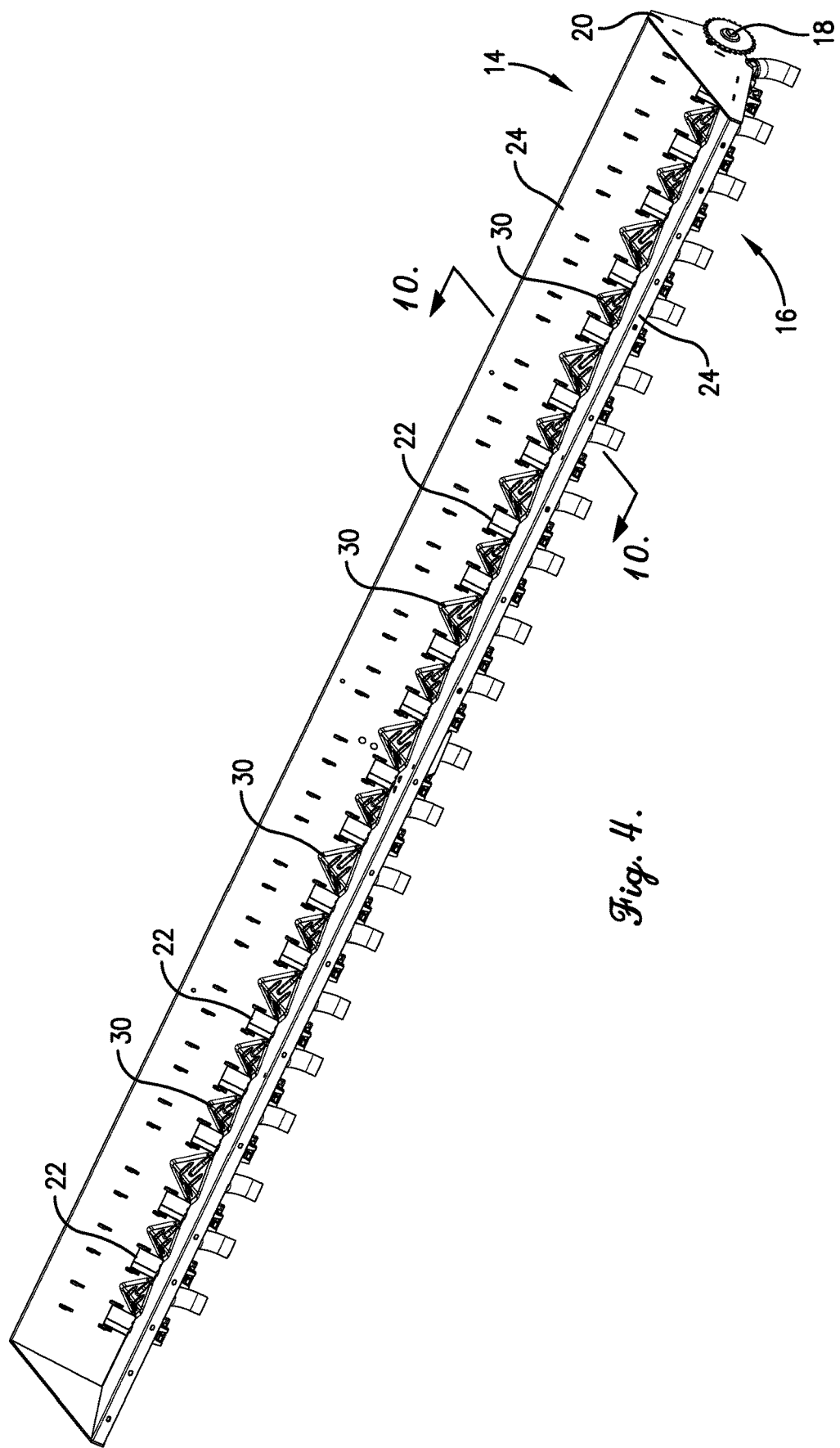
FIG. 4 is an upper perspective view of the bottom section of the bin from FIG. 3.
Figure 8:
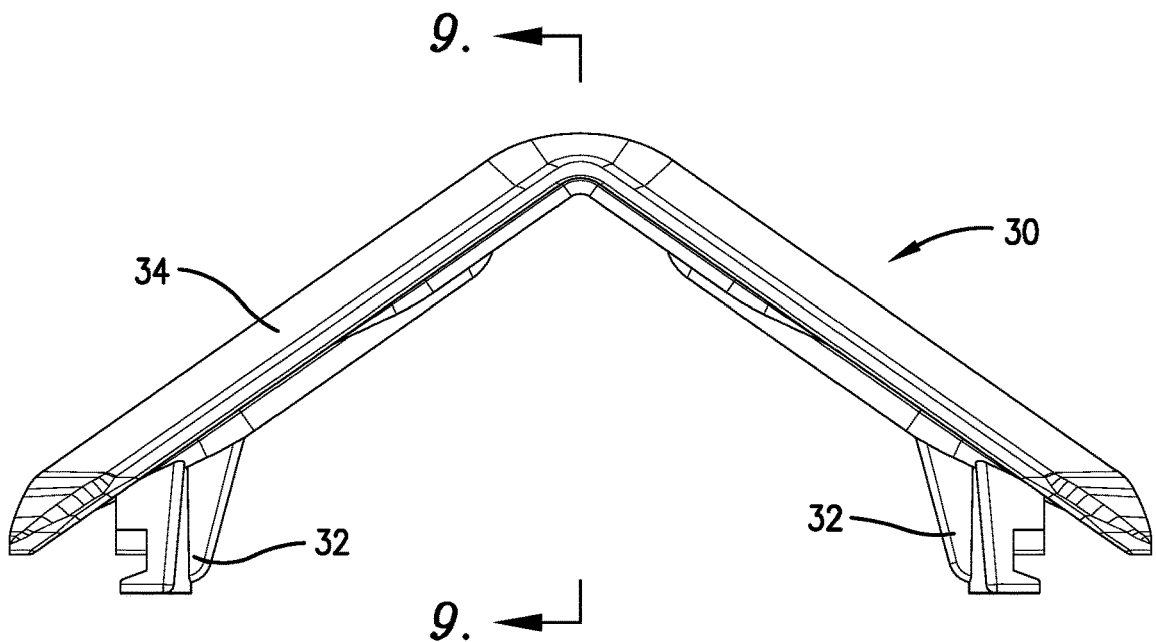
FIG. 8 is an elevation view of the flow tent from FIGS. 6 and 7.

Beginning with the bins 14, as illustrated in FIG. 1, the bins 14 may comprise a generally rectangular container configured to hold agricultural products (e.g., seed and/or treatment). Turning to FIGS. 3 and 4, a bottom section 20 of the bins 14 may be formed in a triangular or funnel shape. In some embodiments, the bins 14 may include an individual bottom section 20 associated with each containment section (e.g., each containment section 14a, 14b). The bottom sections 20 may, in some embodiments, be detachable from remaining portions of the bins 14. In alternative embodiments, the bottom sections 20 may be integrated as a unitary element of the bins 14. As perhaps best shown in FIG. 4, the bottom section 20 may include a plurality of product openings 22 formed through the bottom of the bottom section 20. In some embodiments, such as when the bottom section 20 is formed in a triangular shape with two inwardly-angled side panels 24 extending along a length of the bottom section 20, the product openings 22 may be formed through only a single one of the side panels 24, as illustrated in FIG. 4. Specifically, the product openings 22 may begin at a bottom edge of the bottom section 20 (i.e., where the side panels 24 meet) and extend upward along one of the side panels 24.

Embodiments provide for the metering devices 16 to be secured to an exterior side of the bottom of the bottom section 20, with each metering device 16 being positioned in alignment with one of the product openings 22 (See FIG. 3). The metering devices 16 are described in more detail below; however, it is noted that the metering devices 16 will each include a plurality of tabs 26 (e.g., four tabs 26) extending from an upper surface of the metering device 16, as illustrated in FIG. 5, and which are configured to slidingly engage with slots 28 formed in the bottom section 20 of the bin 14 for purposes of securing the metering device 16 to the bottom section 20 of the bin 14.

Given the configuration of the bins 14 (and particularly the bottom sections 20 of the bins 14), agricultural product held within the bins 14 will be funneled downward under the force of gravity towards the product openings 22, such that the agricultural product can pass through the product openings 22 to the metering devices 16 that function to dispense the agricultural product from the bins 14 into or onto the ground. To promote efficient funneling and mixing of the agricultural product within the bins 14, some embodiments may provide for each of the bins 14 to include a mixing assembly (not shown) extending through the interior space of the bin 14. Such mixing assemblies may include a rotatable shaft that extends through a length of the bin 14 and includes a plurality of mixing arms extending therefrom. Embodiments may provide for the rotatable shaft to be rotated in different directions and/or at different rotational speeds. Alternatively, the rotatable shaft may rotate at a generally constant speed and direction. Regardless, rotation of the rotatable shaft will cause the mixing arms to mix the agricultural product within the bins 14 so as to ensure proper mixing, funneling, and flow of the agricultural product through the bin 14. In some additional embodiments, oscillators and/or agitators may be used to ensure proper mixing, funneling, and flow of the agricultural product through the bin 14.

In addition, to facilitate proper funneling and complete flow of the agricultural product through the bins 14, embodiments of the present invention provide for the bins 14 to each include a plurality of flow tents 30 (See FIGS. 4 and 5) secured within an interior of the bins 14, and particularly to an interior side of the bottom of the bottom sections 20 of the bins 14. With reference to FIGS. 6-9, the flow tents 30 may each be configured as a thin section of material with a generally diamond shape. The flow tents 30 may each have a bend along a centerline, such that the flow tent 30 is formed with two downwardly-sloping triangular sides that causes the flow tent 30 to be formed in a "tent-like" configuration. As such, when the flow tents 30 are inserted within the bins 14, as shown in FIGS. 4 and 5, the flow tents 30 will extend upward from an interior bottom side of the bottom section 20 such that the bend along the centerline is positioned higher than the bottom edge of the bottom section 20 and/or the bin 14. In some embodiments, as shown in FIGS. 4 and 5, a single flow tent 30 will be positioned between each adjacent pair of product openings 22. As such, the downwardly sloping sides of the flow tents 30 can function as declining planes that guide agricultural product downward to the product openings 22. In some embodiments, as shown in FIG. 6, upper surfaces of the flow tents 30 may be formed with grooves or depressions 31 that further facilitate the flow of agricultural product downward towards the product openings 22. Such grooves or depressions 31 may also improve the strength and/or structural integrity of the flow tents 30. It should be understood that many prior art bins, which did not include such flow tents 30, were known to unwantedly retain agricultural product within the interior of the bins 14 (e.g., on the bottom, interior surface of the bottom section 20 of the bins 14 between the product openings 22). Such unwanted retainment of agricultural product caused incomplete dispensing of agricultural product during operation of the drill 10, and further required difficult and time-consuming cleanout operations to remove the retained agricultural product from the bin 14.

Embodiments provide for the flow tents 30 to be formed from a generally thin, flexible material, such as plastic, which can be plastically deformable yet rigid enough to form and retain the tent-like shape. As shown in FIGS. 6-9, the flow tents 30 may be formed with one or more attachment or hook elements 32 extending from a bottom surface of the flow tents 30. Such hook elements 32 are configured to be inserted within small openings (not shown) formed in the bottom section 20 of the bins 14 so as to hold the flow tents 30 in position between the product openings 22 (with such positioning illustrated in FIGS. 4 and 5). As such, the flow tents 30 can be inserted into and removed from the bins 14 by hand, without need of tools.

Figure 9:
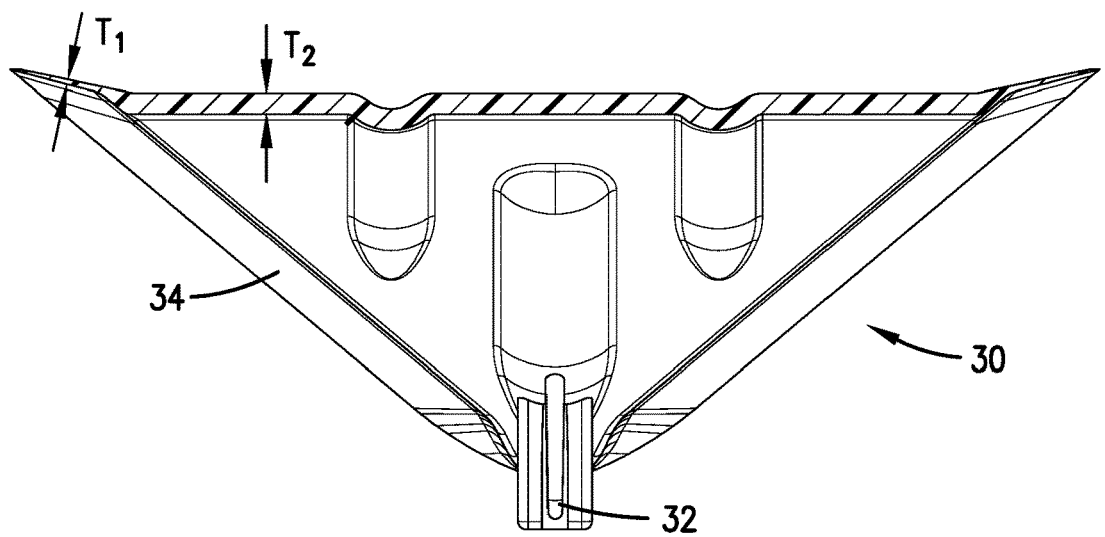
FIG. 9 is a cross section of the flow tent from FIGS. 6-8 taken along the line 9-9 from FIG. 8.
Figure 10:
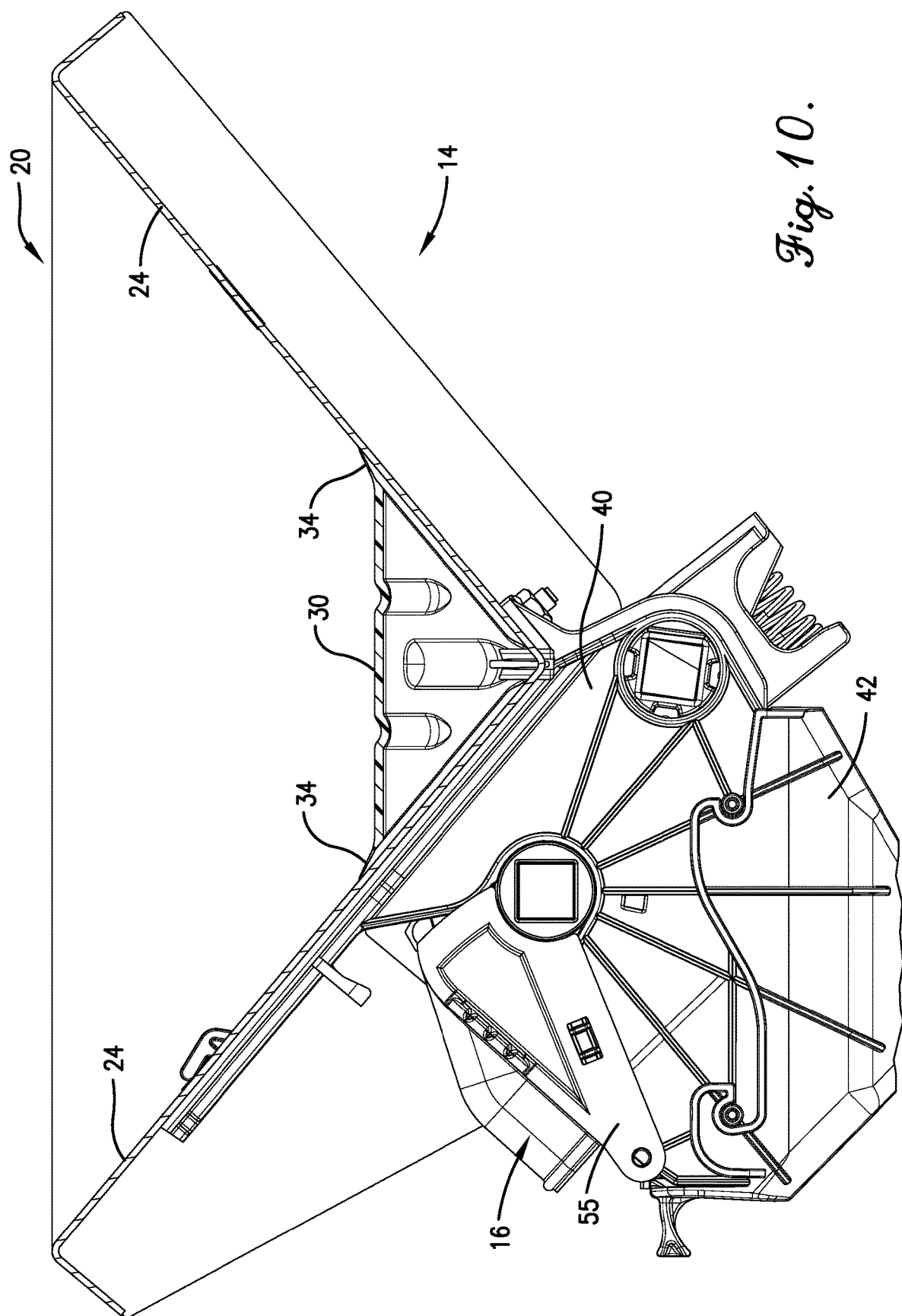
FIG. 10 is a cross section of the bottom section of the bin taken along the line 10-10 from FIG. 4.

Furthermore, with reference to FIGS. 6-9, the flow tents 30 may include edge elements 34 that extend circumferentially about the flow tents 30. The edge elements 34 of the flow tents 30 may be formed with a thickness T1 that "thins out" or reduces with respect to a thickness T2 of the main, inner (or central) portions of the flow tents 30 (See FIG. 9). As shown in FIG. 9 the main, inner portions of the flow tent 30 has a relatively large thickness T2 in comparison to the thickness T1 of the edge element 34. It is noted that the thickness T1 of the edge elements reduces generally linearly moving outwardly from the main, inner portions of the flow tents 30. Given that the thickness T1 of the edge elements 34 is smaller than the thickness T2 of the main, inner portions of the flow tent 30, the edge elements 34 of the flow tents 30 can bend or flex with respect main, inner portions of the flow tents 30. As a result, and as perhaps best illustrated in FIG. 10, the edge elements 34 can flex upward (with respect to the main, inner portion of the flow tent 30) so as contact the side panels 24 of the bottom section 20 of the bin 14 in a manner that creates a living seal between the flow tent 30 and the interior surfaces of the bottom sections 20 of the bins 14. Such a sealing requires no additional sealing material (e.g., epoxy). Nevertheless, the living seal is sufficient to prevent agricultural product from working its way underneath the flow tents 30, between the flow tents 30 and the bottom section 20 of the bins 14, as the agricultural product flows through the bins 14.

Given the configuration of the flow tents 30 described above, and with reference to FIG. 5, a left corner of each flow tent will be sealingly secured (via a living seal) to the bottom edge of the bottom section 20 adjacent to a first product opening 22. The edge elements 34 of each flow tent 30 will extend upward along the side panels 24 (with the edge elements 34 forming a living seal with the side panels 24) to the middle corners of the flow tent 30 (i.e., formed at the bend in the centerline of the flow tent 30). The middle corners form the pinnacle of the flow tent 30 that extends upward the highest magnitude above the bottom edge of the bottom section 20 of the bin 14. The edge elements 34 of each flow tent 30 will extend downward from the middle corners along the side panels 24 (with the edge elements 34 forming a living seal with the side panels 24) to a right corner that will be sealingly secured to the bottom edge of the bottom section 20 adjacent to a second, adjacent product opening 22. As noted above, given the position (i.e., between product openings 20) and the shape (e.g., tent-like) of the flow tents 30, the flow tents 30 are configured to guide the flow of agricultural product downward within the bins 14, such that the agricultural product flows towards the product openings 22 and does not become unwantedly retained within the seed bins 14. In some embodiments, however, the flow tents 30 may not form a living seal with the bins 14 at all locations at which the flow tents 30 make contact with the bins 14. For example, the lower corners of the flow tents 30 may not have a reduced thickness and/or may not form a living seal with the bottom edge of the bottom section 20 of the seed bins 14.

Turning now to the metering devices 16 in more detail, as illustrated in FIGS. 11-14, each metering device 16 may comprise an upper housing 40, a lower housing 42 removably engaged with the upper housing 40, a metering assembly 44 (See FIGS. 13 and 14) removably secured within an interior of the upper and/or lower housing 40, 42, and a gate assembly 46 (See FIGS. 13 and 14) removably secured within an interior of the upper and/or lower housing 40, 42. In operation of the drill 10, a plurality of the metering devices 16 may be secured to an exterior bottom surface of the bin 14, as shown in FIGS. 2 and 3. Thus, agricultural product can be passed from the bin 14 to the seed meter 16, such that the metering assembly 44 can convey the agricultural product through the metering device 16 and out of the metering device 16 where the agricultural product is dispensed into or onto the ground.

Figure 11:
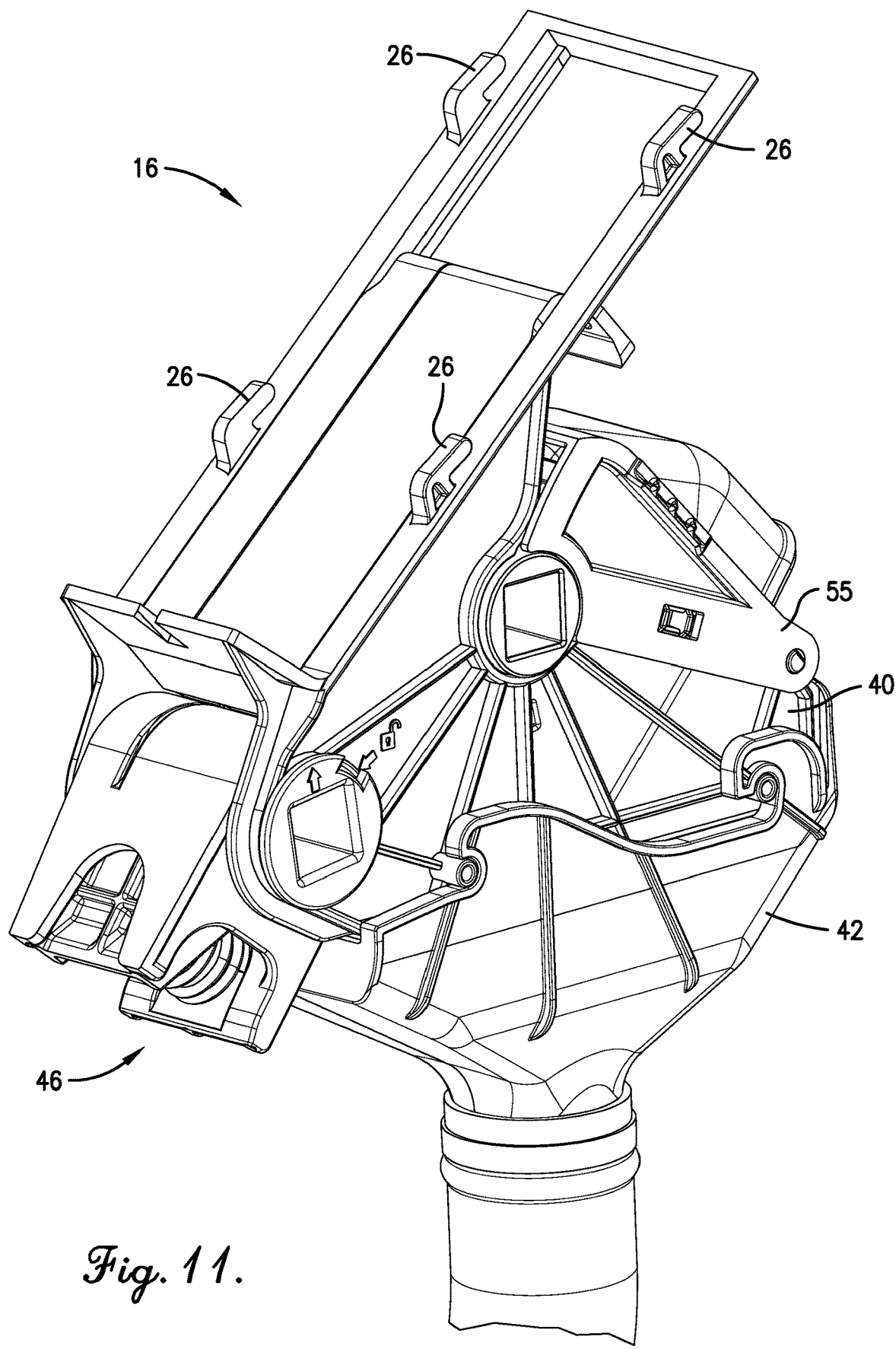
FIG. 11 is a front perspective view of a metering device according to embodiments of the present invention.
Figure 12:
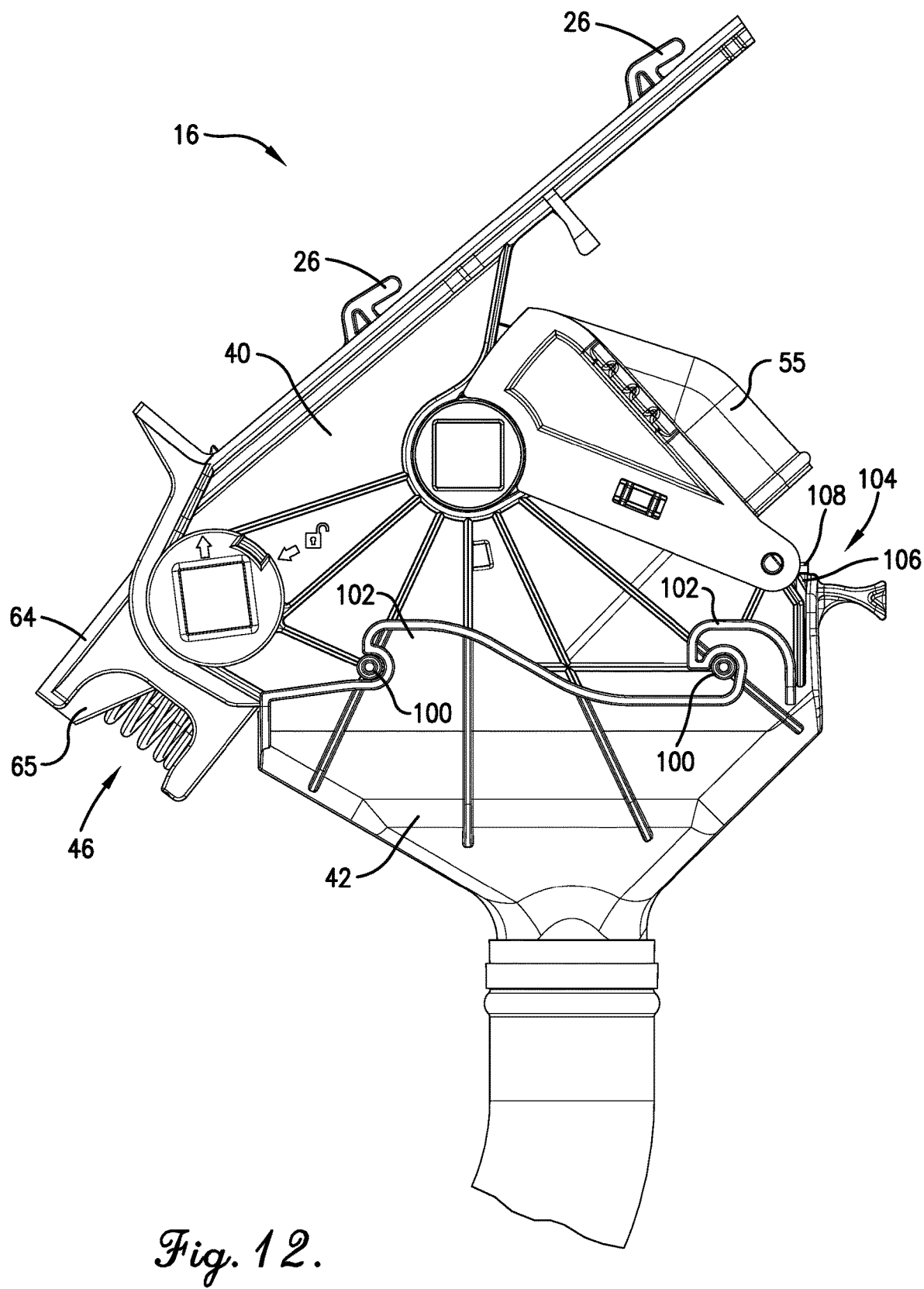
FIG. 12 is a side elevation of the metering device from FIG. 11.
Figure 15:
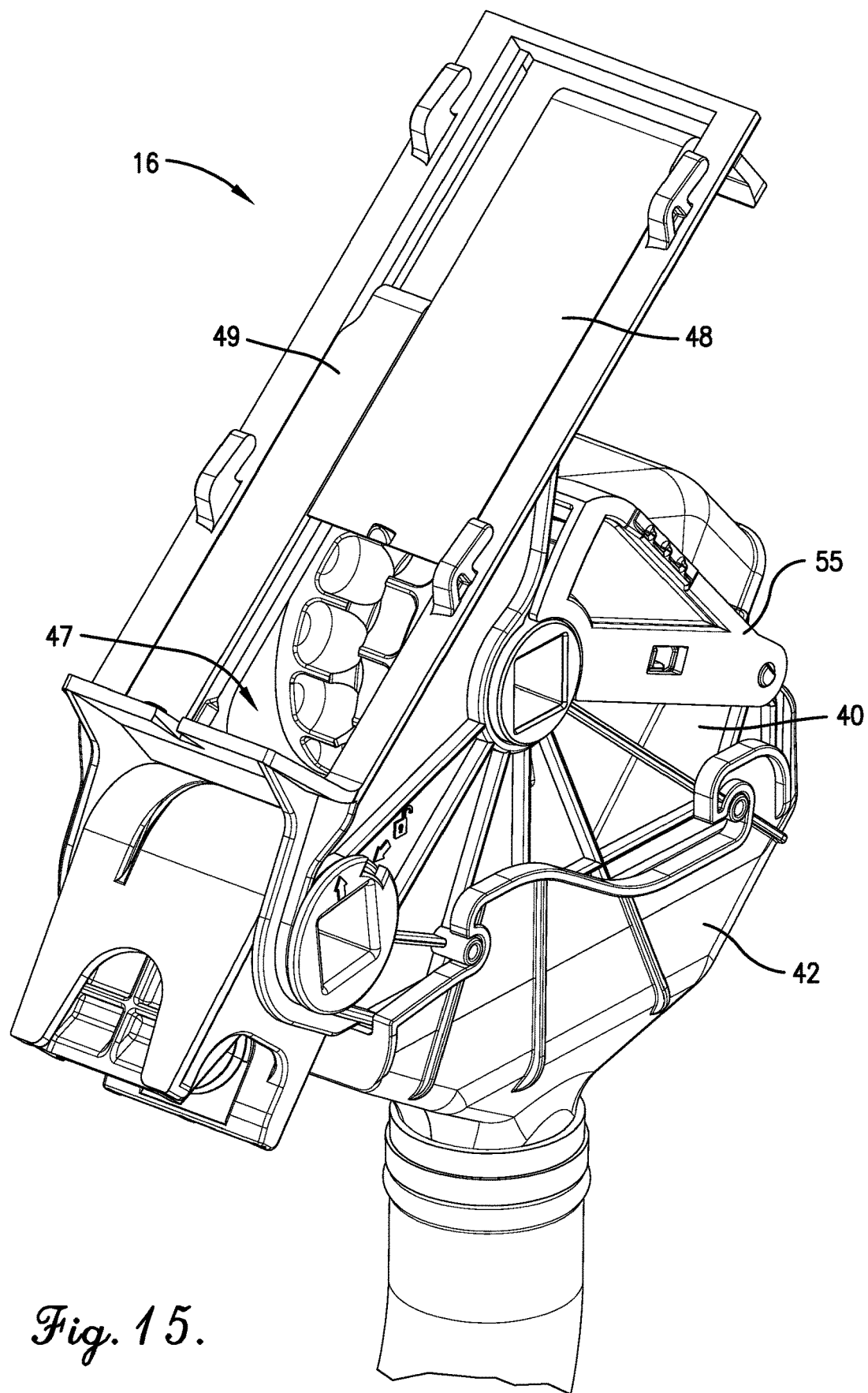
FIG. 15 is another front perspective view of the metering device from FIGS. 11-14, particularly illustrating a first product door in the open position.
Figure 16:
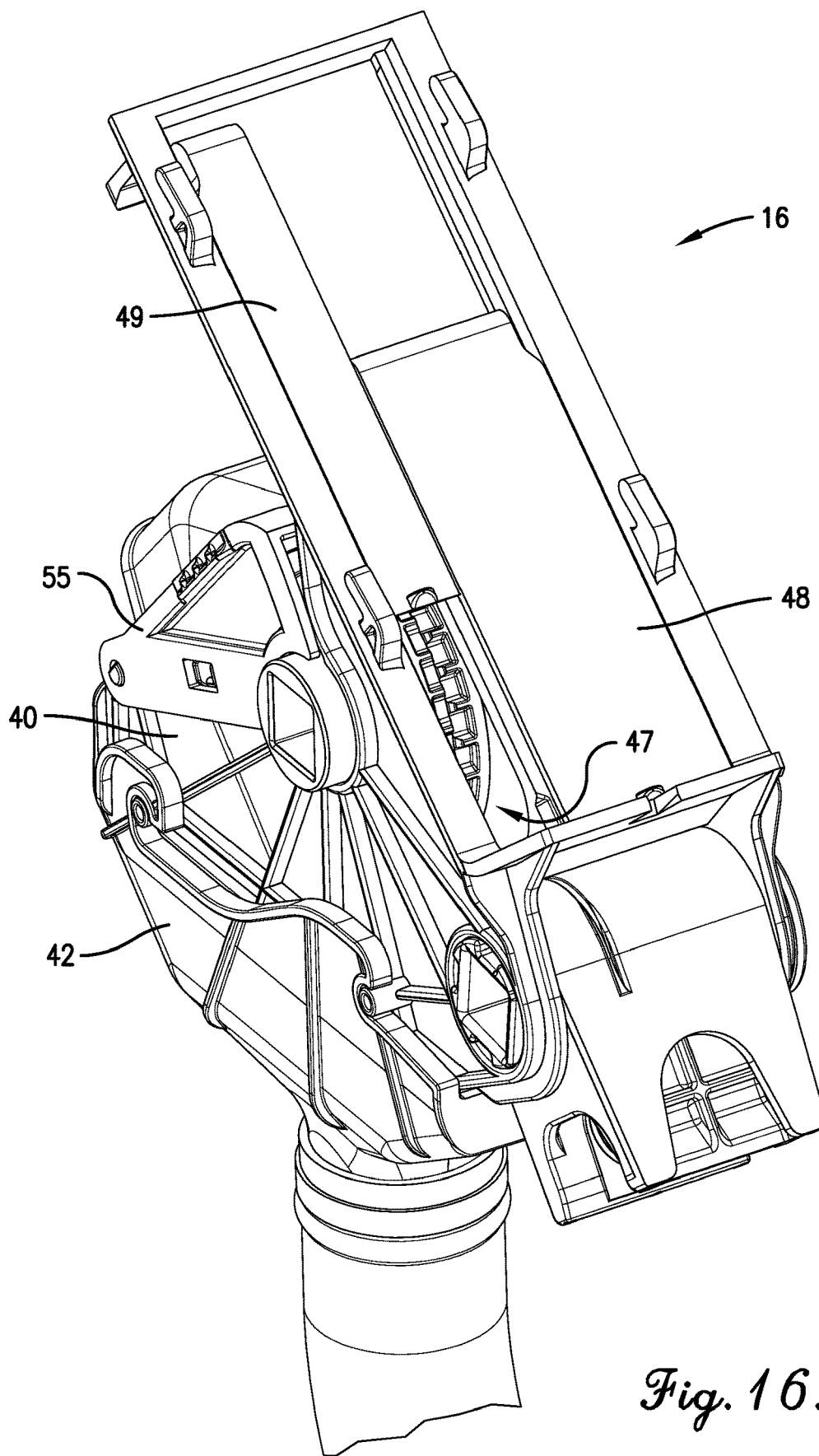
FIG. 16 is another front perspective view of the metering device from FIGS. 11-15, particularly illustrating a second product door in the open position.
Figure 17:
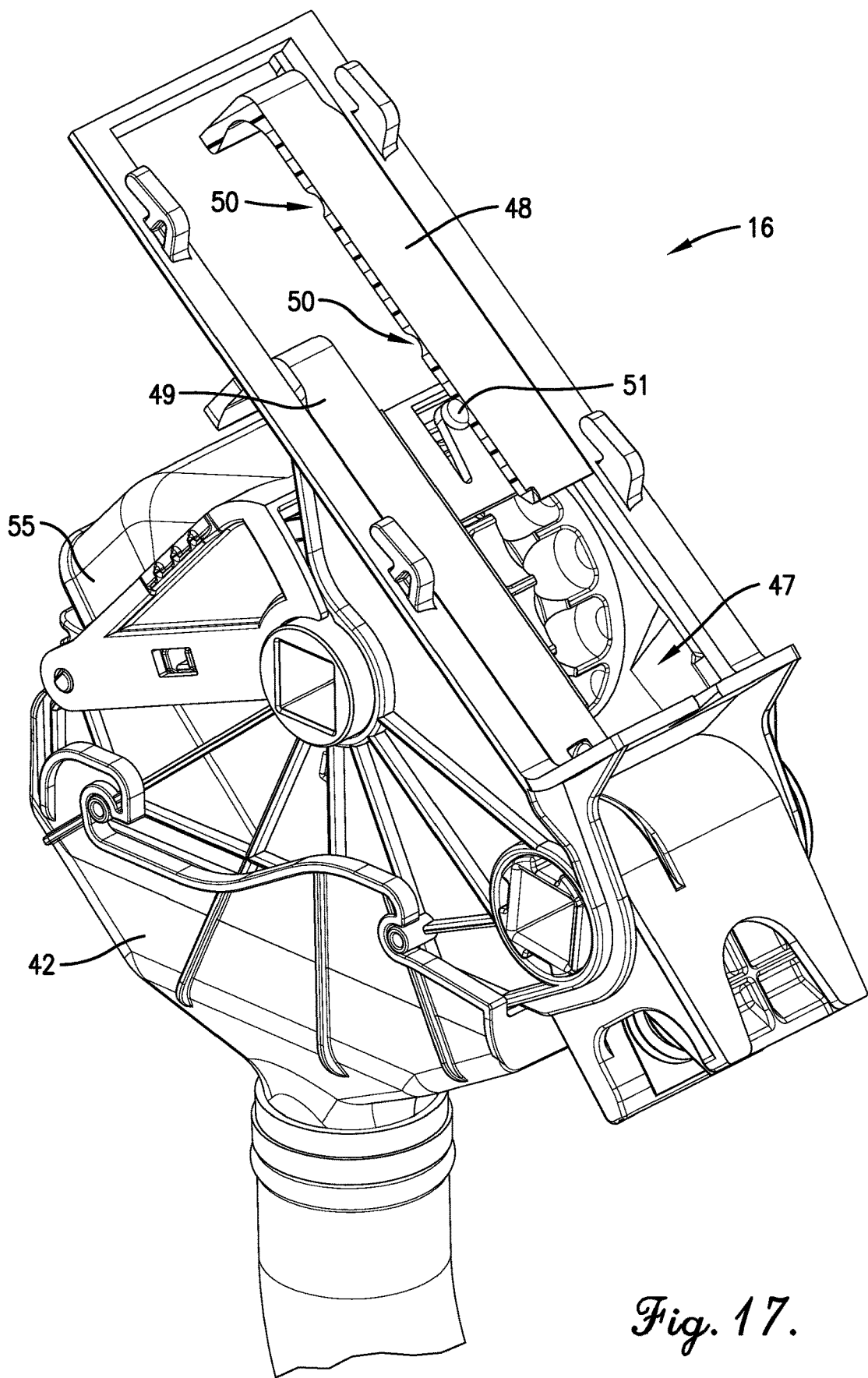
FIG. 17 is another front perspective view of the metering device from FIGS. 11-16, particularly illustrating a portion of the first product door cut away to illustrate notches for securing the first product door in open positions.
Figure 18:
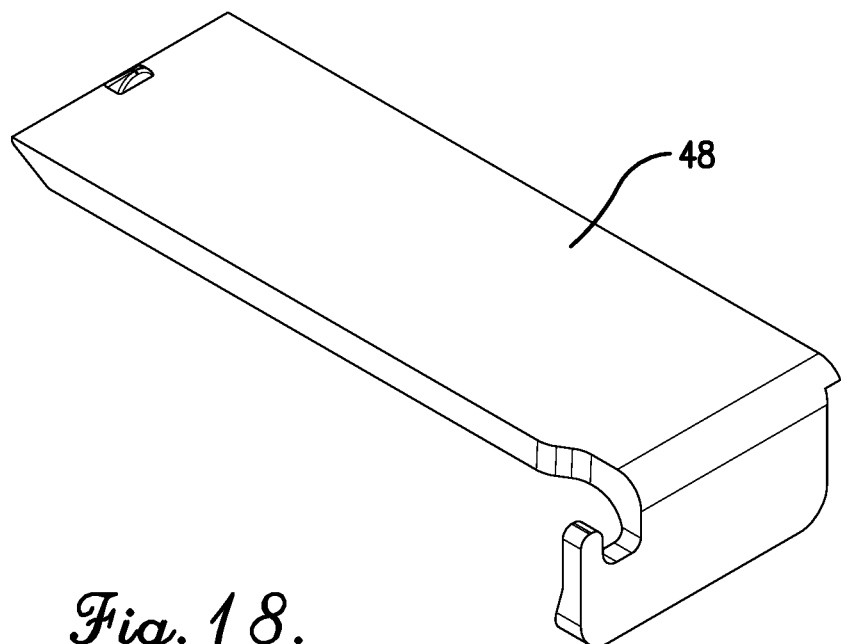
FIG. 18 is perspective view of an upper side of the first product door from FIG. 15.
Figure 19:
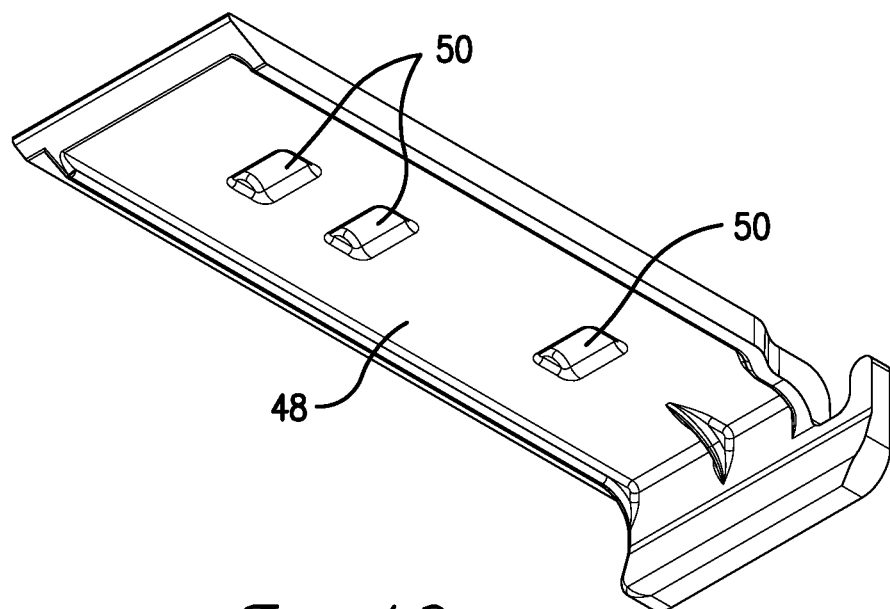
FIG. 19 is perspective view of a lower side of the first product door shown in FIG. 18.
Figure 20:
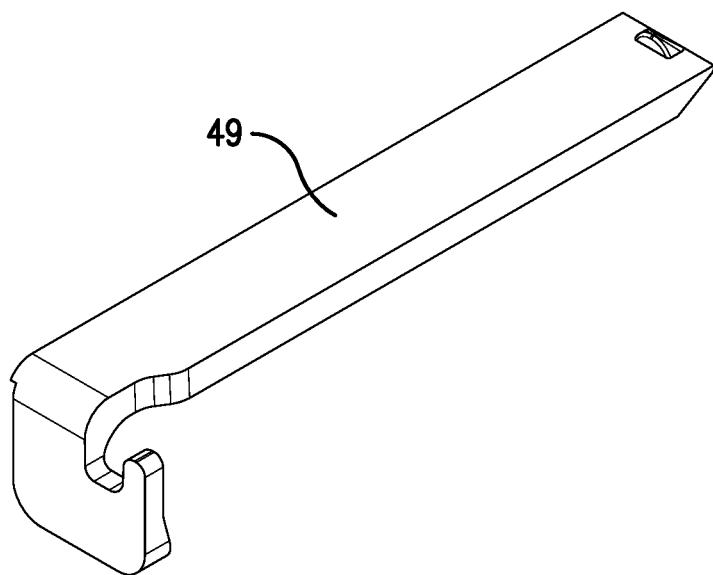
FIG. 20 is perspective view of an upper side of the second product door from FIG. 16.
Figure 21:
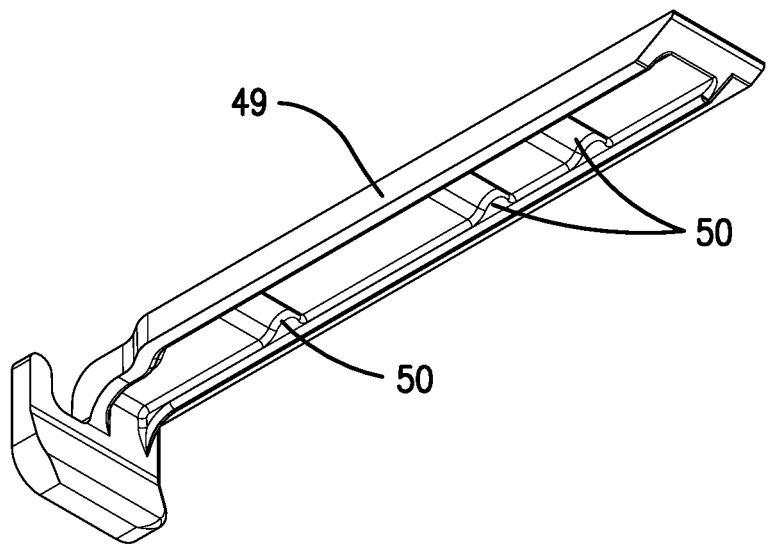
FIG. 21 is perspective view of a lower side of the second product door shown in FIG. 20.

In more detail, as shown in FIGS. 11 and 12 the metering device 16 may be secured to the bin 14 via the hooks or tabs 26 extending from the upper housing 40. Turning to FIGS. 15 and 16, the upper housing 40 may present a product inlet 47 through selective opening of a first product door 48 and a second product door 49 slidingly engaged with the top end of the upper housing 40. Each of the product doors 48, 49 can be slidingly actuated between a closed position and an open position. In the closed position (e.g., slid downward as shown in FIG. 11), the product doors 48, 49 restrict agricultural product from entering the metering device 16. In contrast, in the open position (e.g., slid upward as shown in FIGS. 15 and 16), the product doors 48, 49 permit agricultural product to enter the metering device 16 via the presented product inlet 47. In some embodiments, each of the product doors 48, 49 can be partially opened to various levels of extension (i.e., positions between completely closed and completely open) so as to regulate how much agricultural product can be provided into the metering device 16. FIG. 17 shows a portion of the first product door 48 cut away to illustrate notches 50 formed on the back side of the first product door 48 that are configured to engage with a flexible tab 51 protruding upward from the upper housing 40. When the protruding tab 51 is engaged with one of the notches 50, such engagement can secure the first product door 48 open in the particular level of extension associated with the notch 50. The first product door 48 is shown in more detail in FIGS. 18 and 19, with the notches 50 particularly illustrated in FIG. 19. The back side of the second product door 49 may be similarly formed with notches 50 for maintaining the second product door 49 open at various levels of extension. The second product door 49 is shown in more detail in FIGS. 20 and 21, with the notches 50 particularly illustrated in FIG. 21.

As will be described in more detail below, the interior space of the metering device 16 may be divided into two agricultural product sections (e.g., a first agricultural product section and a second agricultural product section), such that two different types of agricultural product can be separately processed through the metering device 16. To facilitate such separate processing, the first and second product doors 48, 49 can be individually actuated. For instance, in order to supply a first agricultural product from the bin 14 to the metering device 16, the first product door 48 can be opened, as shown in FIG. 15, and the second product door 49 can remain closed. As such, the first agricultural product can be passed form the bin 14 to the interior space of the metering device 16 via the product inlet 47 presented by the opened first product door 48. In contrast, to supply a second agricultural product from the bin 14 to the metering device 16, the second product door 49 can be opened, as shown in FIG. 16, and the first product door 48 can be closed. As such, the second agricultural product can be passed from the bin 14 to the interior space of the metering device 16 via the product inlet 47 presented by the opened second product door 49.

Figure 22:
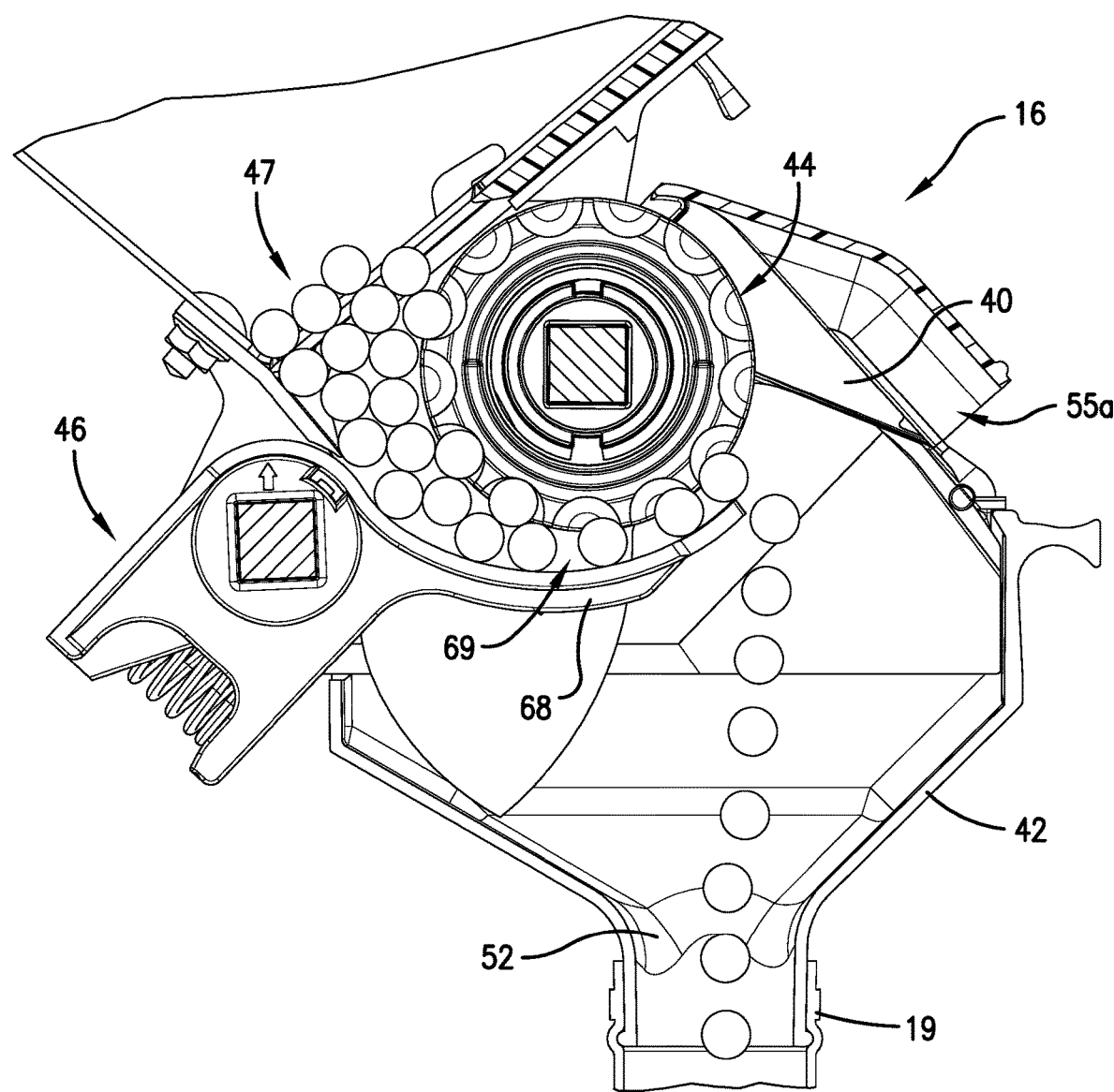
FIG. 22 is a cross section of a metering device according to embodiments of the present invention, with the metering device secured to a bottom of a bin, and with the metering device conveying agricultural product from the bin and through the metering device.

Turning to FIG. 22, upon agricultural product being received into the upper housing 40 of the metering device 16, via the product inlet 47 presented by either the first product door 48 or second product door 49, the agricultural product can be conveyed through metering device 16, via the metering assembly 44. By way of such conveyance, the agricultural product can be dispensed from the lower housing 42 via a product outlet 52. As illustrated in the drawings, the lower housing 42 may be shaped generally as a funnel with an upper end secured to the upper housing 40 and the product outlet 52 positioned a bottom end of the lower housing 42. As such, agricultural product can be dispensed from the metering device 42 via the product outlet 52 of the lower housing 42. In some embodiments, as noted previously, a product tube 19 may be secured to the bottom end of the metering device 16 (e.g., attached to the product outlet 52), such that agricultural product will exit the metering device 16 by passing through the product outlet 52 to the product tube 19. Regardless, embodiments provide for agricultural product to be dispensed from the metering device 16 and/or from the product tube 19 into and/or onto the ground.

Figure 13:
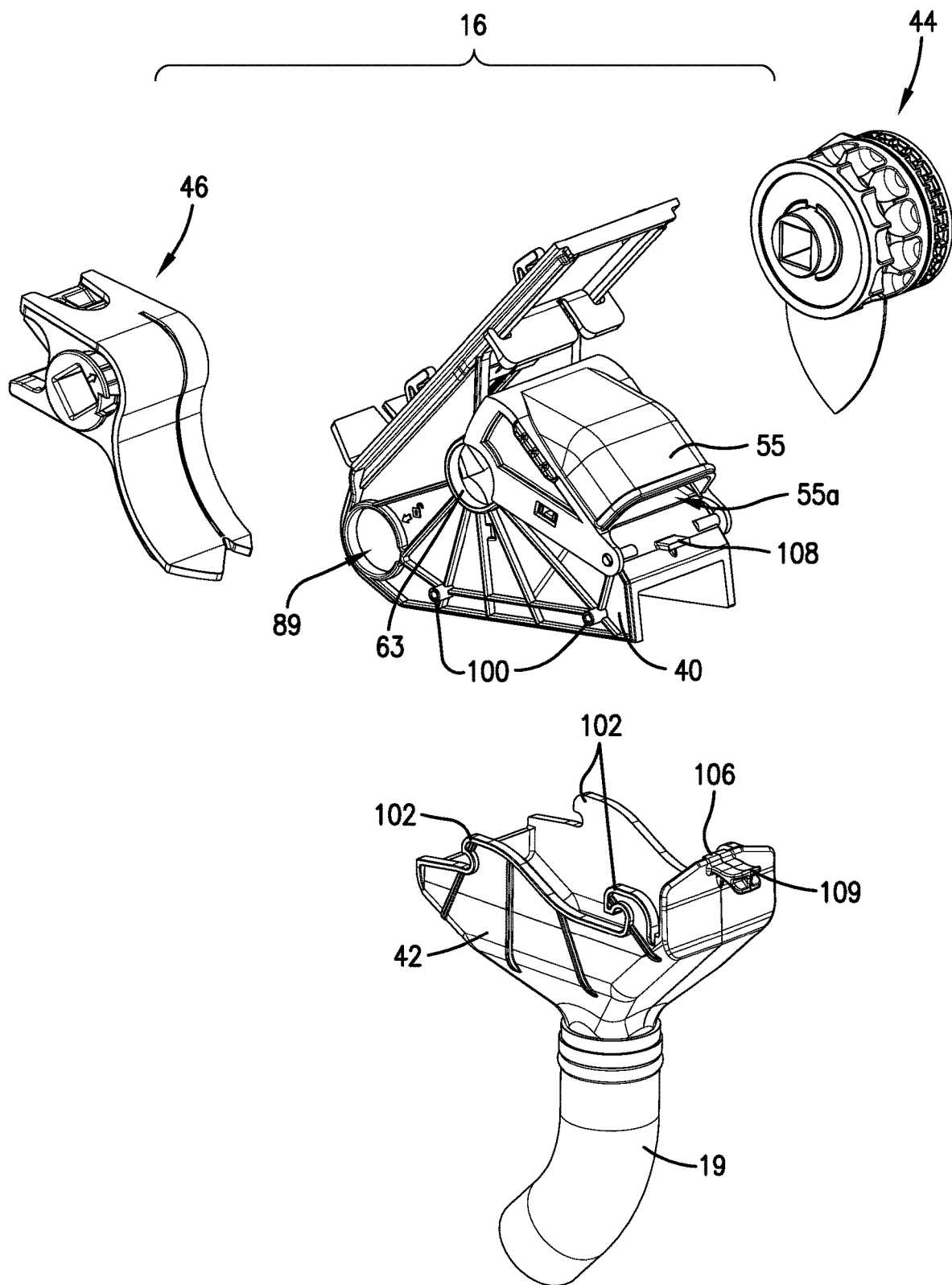
FIG. 13 is a rear perspective exploded view of the metering device from FIGS. 11 and 12.
Figure 14:
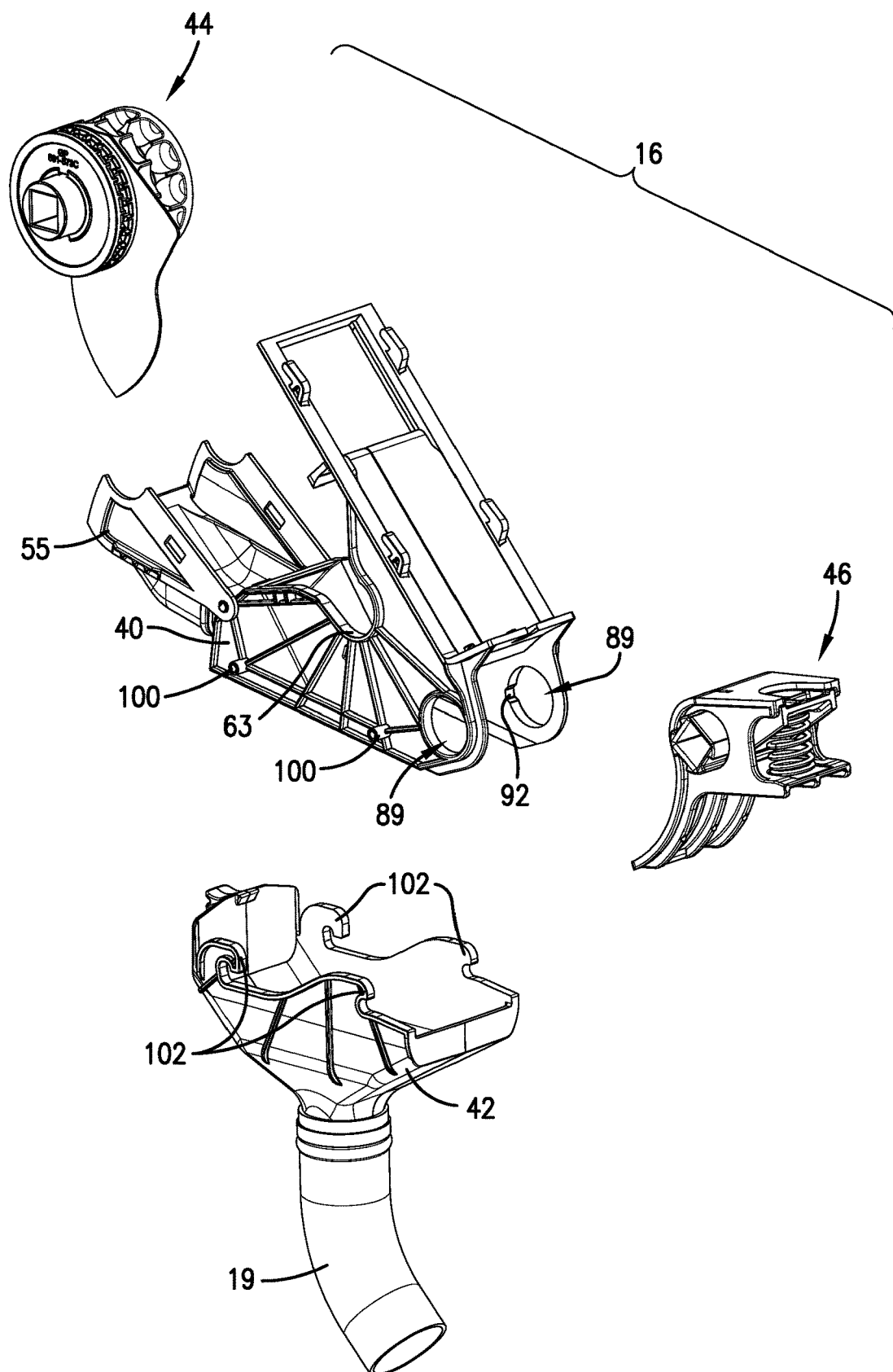
FIG. 14 is a front perspective exploded view of the metering device from FIGS. 11-13.

Embodiments provide for the metering devices 16 to convey various types of agricultural products. To facilitate such conveyances, the metering assembly 44 of the metering device 16 may comprise a plurality of metering wheels (e.g., a first metering wheel 53 and a second metering wheel 54), as perhaps best illustrated in FIGS. 23-26, each being particularly configured to convey a particularly type of agricultural product. As noted previously, the metering assembly 44 may be removable from the upper and lower housings 40, 42. FIGS. 13 and 14 illustrates the metering assembly 44 removed from the upper and lower housings 40, 42. To facilitate such removal, an access door 55 may be hingedly secured to the upper housing 40 so as to be shiftable from a closed position to an open position. With the access door 55 in the open position, as shown in FIG. 14, the access door 55 provides access to the interior space of the metering device 16 via an opening presented by the open access door 55. Through the opening provided by the access door 55, the metering assembly 44 can be inserted into and/or removed from the metering device 16 by hand, without the use of tools. FIGS. 12 and 13 illustrated the access door 55 in the closed position. In some alternative embodiments, the metering devices 16 may not include an access door 55, such that access to the interior space of the metering devices 16 is constantly provided. In certain embodiments, the access door 55 may be formed with a raised outer surface, which extends away from the upper housing 40 so as to present an overflow channel 55*a*, as illustrated in FIG. 13. With reference to FIG. 22, the overflow channel 55*a* allows for agricultural product to be expelled or spilled out from the metering device 16 through the overflow channel 55*a* without damaging the components of the metering device 16 should a blockage of agricultural product form in the metering device 16 or downstream therefrom.

Turning to the metering assembly 44 in more detail, as shown in FIGS. 23-26, the metering assembly 44 may comprise a sub-shaft 56, the first metering wheel 53 positioned on the sub-shaft 56, the second metering wheel 54 positioned on the sub-shaft 56, and a divider 57 positioned on the sub-shaft 56 between the first metering wheel 53 and the second metering wheel 54. The sub-shaft 56 may comprise an elongated, hollow cylinder with an interior passageway having a surface shaped to conform to an exterior surface of the primary driveshaft 18 (not shown in FIGS. 23-26) associated with the drill 10. As was discussed above, with respect to FIGS. 3 and 4, the drill 10 may comprise the primary driveshaft 18, which extends through each of the metering devices 16 that are attached to the bin 14 of the drill 10. The primary driveshaft 18 extending through a metering device 16, and particularly through the sub-shaft 56 of the metering device 16, is shown in more detail in FIG. 27. The primary driveshaft 18 may be caused to rotate by a power system (not shown) of the drill 10. Such power system may take various forms. For instance, the power system may comprise a chain gear system that is actuated by the drill's 10 movement over the ground. Such actuation of the chain gear system can, thus, impart rotation to the primary driveshaft 18.

Rotation of the primary driveshaft 18 is configured to cause a corresponding rotation of the metering wheels 53, 54 of the metering devices 16. Specifically, rotation of the primary driveshaft 18 will cause a corresponding rotation of each of the sub-shafts 56 through which the primary driveshaft 18 extends. To facilitate such corresponding rotation, as perhaps best illustrated in FIGS. 25 and 26, an exterior surface of the sub-shaft 56 may be formed with one or more longitudinally-extending grooves or keyways 58, which as will be discussed in more detail below, may be used to secure the metering wheels 53, 54 onto the sub-shaft 56 such that rotation of the sub-shaft 56 (via rotation of the primary driveshaft 18) will cause a corresponding rotation of the metering wheels 53, 54.

Figure 26:
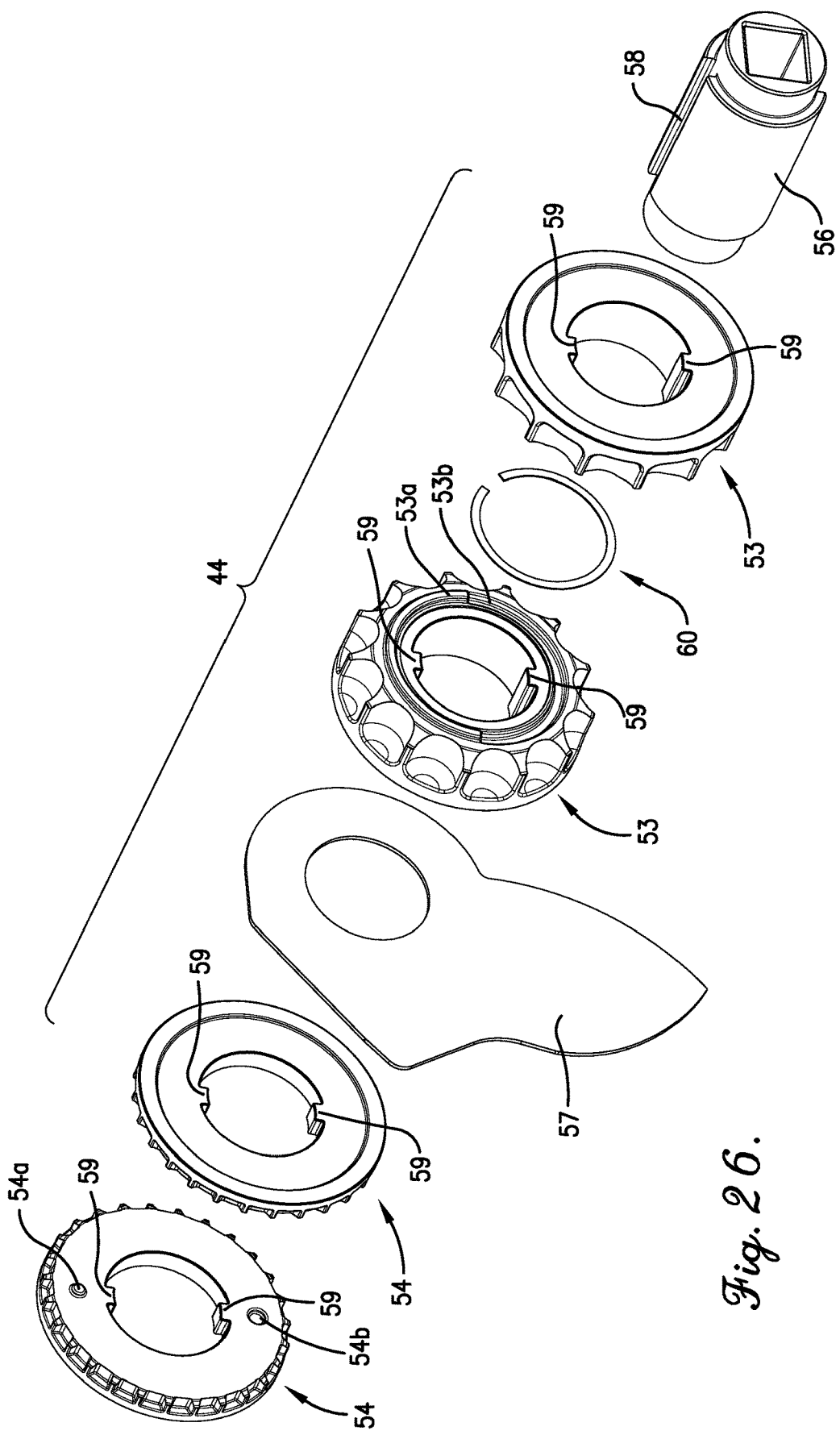
FIG. 26 is a second side exploded view of the metering assembly from FIGS. 23-25.

The metering wheels 53, 54 may each comprise a hollow interior section and a fluted exterior section. The interior section may include one or more protrusions or keys 59, as illustrated in FIGS. 25 and 26, which are configured to be received in the grooves of the sub-shaft 56 when aligned. As such, the metering wheels 53, 54 may be slid onto the sub-shaft 56 and secured in place via engagement between the keys 59 (of the metering wheels 53, 54) and the keyways 58 (of the sub-shaft 56), such that rotation of the sub-shaft 56 will cause a corresponding rotation of the metering wheels 53, 54. The exterior sections of each of the metering wheels 53, 54 may include a number of flutes or concave grooves within which agricultural product (e.g., seed or treatment) can be received or captured for rotation through the metering device 16. The size of the flutes can vary depending on the type and size of the agricultural product intended to be processed by the metering device 16. In some embodiments, the flutes of the first metering wheel 53 may be larger than the flutes of the second metering wheel 54, such that the first metering wheel 53 is configured to capture and/or convey (e.g., via rotation) agricultural product that is larger than the agricultural product that is intended to be captured and/or conveyed (e.g., via rotation) by the second metering wheel 54. For example, the first metering wheel 53 may be configured to capture and convey relatively large-sized seed, while the second metering wheel 54 may be configured to capture and convey relatively small-sized or fine seed.

In some embodiments, as illustrated in FIGS. 25-26, each of the metering wheels 53, 54 may comprise two halves that individually make up one half of the respective metering wheel 53, 54. The halves of the metering wheels 53, 54 may each include the flutes on their exterior sections and the keys 59 on their interior sections. When the halves are secured together to from the metering wheels 53, 54, the flutes of one of the halves may be misaligned with the flutes of the other one of the halves. Such misalignment of the flutes may provide for a consistent and accurate conveyance of agricultural product through the metering device 16. In addition, when the halves of the metering wheels 53, 54 are secured together, the keys 59 on the interior sections of the halves of a given metering wheel 53, 54, may be aligned so as to permit the metering wheels 53, 54 to engaged with the sub-shaft 56. Such alignment may be facilitated by the use of protrusions and corresponding cavities. For example, as shown in FIGS. 25 and 26, each of the halves of the first metering wheel 53 (e.g., the metering wheel with the larger flutes) may be formed with an elongated protrusion 53a and an elongated cavity 53b on an interior side of the half. As such, the elongated protrusion 53a of a first half of the metering wheel 53 can engage within the elongated cavity 53b of a second half of the metering wheel 53, and the elongated cavity 53b of the first half of the metering wheel 53 can engage within the elongated protrusion 53b of the second half of the metering wheel 53, so as to ensure proper alignment of the halves of the metering wheel 53. Similarly, each of the halves of the second metering wheel 54 (e.g., the metering wheel with the smaller flutes) may be formed with a nub-like protrusion 54a and a dimple-like cavity 54b on an interior side of the half. As such, the nub-like protrusion 54a of a first half of the metering wheel 54 can engage within the dimple-like cavity 54b of a second half of the metering wheel 54, and the dimple-like cavity 54b of the first half of the metering wheel 54 can engage within the nub-like protrusion 54a of the second half of the metering wheel 54, so as to ensure proper alignment of the halves of the metering wheel 54.

As illustrated in FIGS. 25 and 26, some further embodiments of the metering assembly, may include a biasing element, such as wave spring 60, positioned over the sub-shaft 56 and between the halves of the first metering wheel 53 (e.g., the metering wheel with the larger flutes). The wave spring 60 will be configured to force the halves of the first metering wheel 53 at least partially apart, so as to provide for proper spacing of the halves of the metering wheel 53 and/or to provide for proper alignment and positioning of the overall metering assembly 44 within the metering device 16. Proper spacing/alignment/positioning is beneficial, for instance, so as to ensure that the metering assembly 44 can be properly received within and can operate appropriately within the interior space presented by the upper and/or lower housings 40, 42 of the metering device 16.

Figure 28:
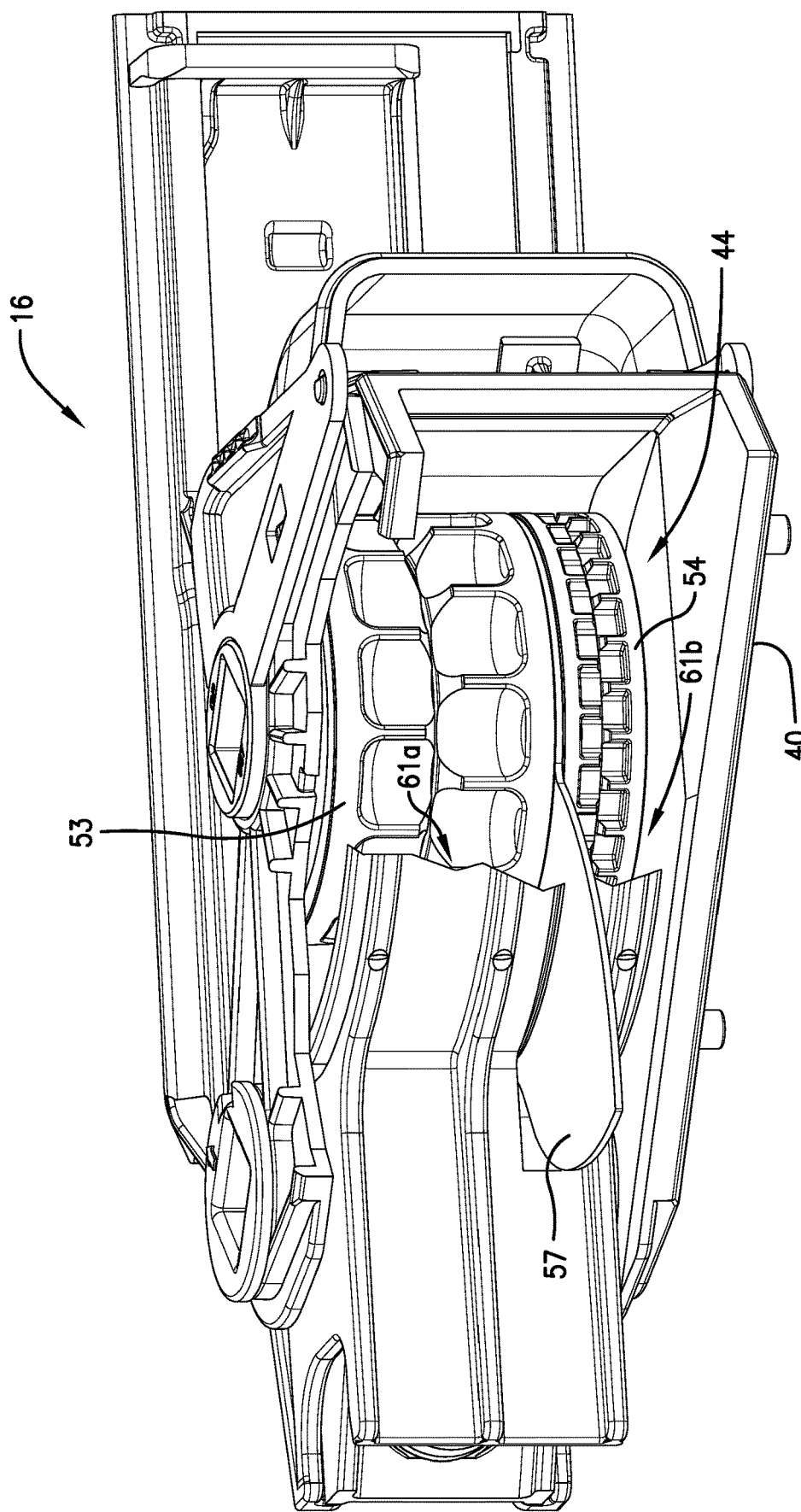
FIG. 28 is a perspective view of the metering device from FIGS. 11-14, with portions of the metering device cut away to illustrate a divider separating an interior space of the metering device into a first product space and a second product space.

The metering assembly 44 may, as noted above, additionally comprise a divider 57 configured to be positioned on the sub-shaft 56 between the two metering wheels 53, 54. As such, the divider 57 may comprise a flat, plate-like element with an aperture for receiving the sub-shaft 56. The divider 57 may have an elongated shape that is configured to extend downward from the sub-shaft. As such, when the metering assembly 44 is installed within the interior space of the metering device 16, as illustrated in FIG. 28, the divider 57 is configured to divide the interior space of the metering device 16 into a first product space 61a and a second product space 61b. Thus, agricultural product provided to the metering device 16 will be conveyed by the metering assembly 44 through either the first product space 61a or the second product space 61b.

In more detail, with the first product door 48 in the open position (as illustrated in FIG. 15), a first type of agricultural product from the bin 14 can pass into the metering device 16 whereby the first metering wheel 53 can capture and convey the first type of agricultural product through the interior space of the metering device 16. Furthermore, due to the divider 57 separating the interior space into the first and second product spaces 61a, 61b, as shown in FIG. 28, the first type of agricultural product will be conveyed through the first product space 61a by the first metering wheel 53. In contrast, with the second product door 49 in the open position (as illustrated in FIG. 16), a second type of agricultural product from the bin 14 can pass into the metering device 16 whereby the second metering wheel 54 can capture and convey the second type of agricultural product through the interior space of the metering device 16. Furthermore, due to the divider 57 separating the interior space into the first and second product spaces 61a, 61b, as shown in FIG. 28, the second type of agricultural product will be conveyed through the second product space 61b by the second metering wheel 54. In some alternative embodiments, both product doors 48, 49 may be opened simultaneously to permit a significant quantity of agricultural product to flow through the metering device 16.

Beneficially, because the metering assembly 44 is removable from the remaining components of the metering device 16, the metering assembly 44 can be efficiently accessed for cleaning, maintenance, and/or repair without requiring that the entire metering device 16 first be removed from the seed bin 14. Such removal of the metering assembly 44 can also be used to efficiently facilitate the changing out of metering assemblies, such as may be required to integrate different types or sizes of metering wheels within the metering device 16. For instance, if larger or small metering wheels are needed for a particular seeding or treatment dispensing operation, removal of the metering assembly 44 will permit the changing or replacement of the metering wheels with minimal effort. Furthermore, if the first and second product doors 48, 49 of the metering device 16 are retained in their closed positions, the metering assembly 44 can be removed from the remaining components of the metering device 16 even while the bin 14 is filled with agricultural product.

To remove the metering assembly 44 of a given seed meter 16, the primary driveshaft 18 may be removed from the seed meter 16. Next, the access door 55 may be opened (as shown in FIG. 14) and the metering assembly 44 can be extracted from the interior space of the metering device 16. Upon removal, the components of the metering assembly 44 (e.g., the sub-shaft 56, the metering wheels 53, 54, and/or the divider 57) being removed from the interior space of the metering device 16, such components can be disassembled from each other for cleaning, maintenance, repair, etc. Thereafter, the components of the metering assembly 44 can be assembled (re-assembled) to for insertion into the interior space of the metering device 16. Specifically, the first metering wheel 53 can be slid onto the sub-shaft 56 (with the keys 59 of the first metering wheel 53 placed in alignment and engaged with the keyways 58 of the sub-shaft 56). Next, the divider 57 can be slid onto the sub-shaft 56 to a position adjacent with the first metering wheel 53. Finally, the second metering wheel 54 can be slid onto the sub-shaft 56 (with the keys 59 of the second metering wheel 54 placed in alignment and engaged with the keyways 58 of the sub-shaft 56) to a position adjacent with the divider 57. Upon assembly of the metering assembly 44, the metering assembly 44 can be inserted within the interior space of the metering device through the opening presented by the access door 55 in the open position. To hold the metering assembly 44 in place within the interior space of the metering device 16, each side panel of the upper housing 40 may be formed with a concave-shaped indentation 63, as shown in FIG. 14, configured to receive and retain a free end of the sub-shaft 56. Such indentations 63 present openings through each of the side panels of the upper housing 40. As such, the sub-shaft 56 is can be engaged with the upper housing 40 and retained in a position at which the interior passageway of the sub-shaft 56 is aligned with a center of the openings presented by the indentations 63 formed in the side panels of the upper housing 40. In such a position, the primary driveshaft 18 of the drill 10 can extend simultaneously through the openings of the side panels of the upper housing 40 and through the interior passageway of the sub-shaft 56. As was described above, such a configuration permits the primary driveshaft 18 to cause a rotation of the metering wheels 53, 54 of the metering assembly 44. Furthermore, because the primary driveshaft 18 can simultaneously extend through a plurality of metering devices 16 that are attached to a bottom of the bin 14 (and particularly through the sub-shafts 56 of each of the metering devices 16), rotation of the primary driveshaft 18 is configured to simultaneously rotate each of the metering wheels 53, 54 of the metering devices 16.

In addition to the metering assembly 44, certain embodiments of the present invention will provide for the metering device 16 to include the gate assembly 46, which was previously illustrated in FIGS. 13 and 14. Turning to FIGS. 29-32, embodiments provide for the gate assembly 46 to comprise a product gate 64, a gate stop 65, and a gate key 66. The product gate 64 may comprise a base 67 and an elongated, arcuate gate valve 68 extending from the base 67. When installed within the metering device 16 during operation, as perhaps best shown in FIGS. 22 and 34, the gate valve 68 will be spaced below the metering wheels 53, 54 so as to provide a product channel 69 through which agricultural product can be conveyed by the metering wheels 53, 54. The size of the channel 69 can be adjusted by adjusting a position of the gate valve 68 with respect to the metering wheels 53, 54. For instance, shifting the gate valve 68 downward will create a larger channel 69. Such a larger channel 69 may be preferable when using the metering device 16 to dispense relatively large agricultural products from the bin 14 (e.g., large seeds). Alternatively, shifting the gate valve 68 upward towards the metering wheels 53, 54 will create a smaller channel 69. Such a smaller channel may be preferable when using the metering device 16 to dispense relatively small agricultural products from the bin 14 (e.g., fin seeds). Ensuring the appropriate size of channel 69 fora given agricultural product will ensure consistent and accurate flow of such agricultural product through the metering device 16. In some embodiments, it may be preferable to reduce the product channel 69 to a minimum such that the gate valve 68 is forced upward into contact with the metering wheels 53, 54.

Figure 27:
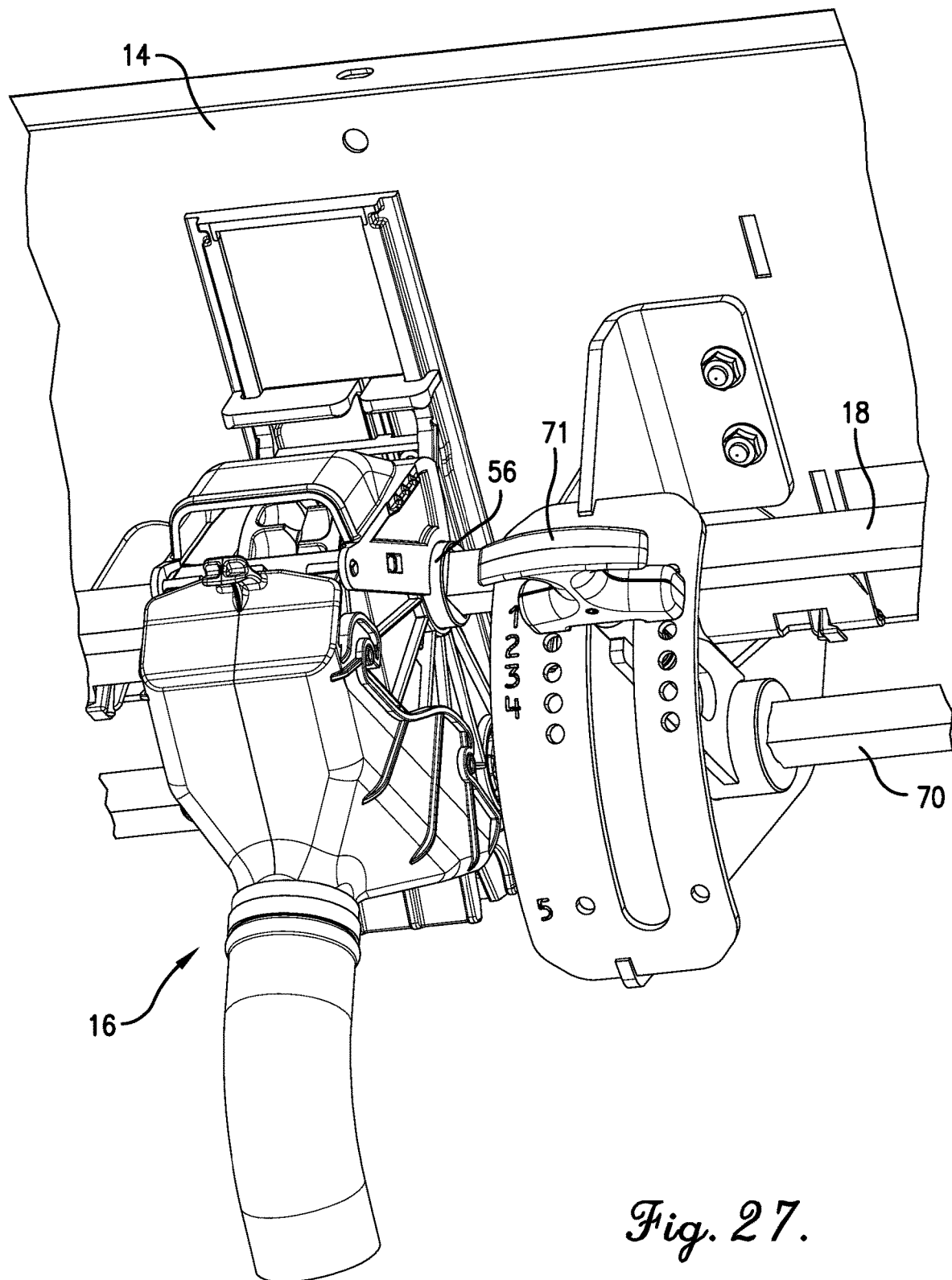
FIG. 27 is a rearward perspective view of a portion of a bottom of the bin from FIG. 3, particularly illustrating a metering device secured to the bottom of the bin and a lever and a driveshaft for adjusting a position of a gate assembly within the metering device.
Figure 34:
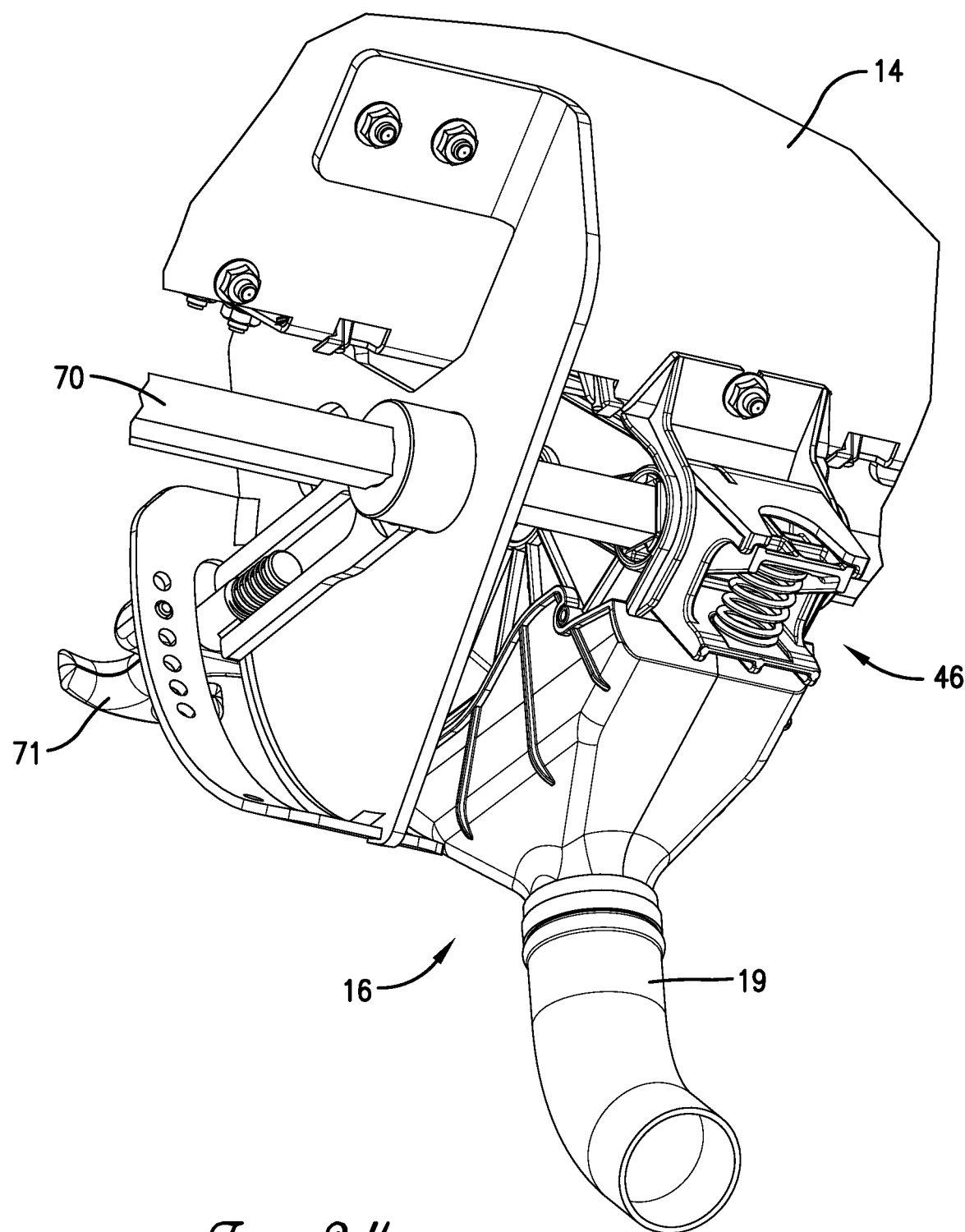
FIG. 34 is a forward perspective view of the portion of the bottom of the bin from FIG. 27, particularly illustrating the lever and the driveshaft for adjusting a position of the gate assembly within the metering device.

As will be described in more detail below, the position of the gate valve 68 (and thus the size of the channel 69) can be shifted by a secondary driveshaft 70, which as illustrated in FIG. 3 can extend through each of the metering devices 16 of the drill 10. Specifically, the secondary driveshaft 70 may extend through each of the gate assemblies 46 of the metering devices 16, such that rotation of the secondary driveshaft 70 will cause a corresponding adjustment to the positions of each of the product gates 64, and particularly to the gate valve 68, with respect to the metering assemblies 44. The secondary driveshaft 70 can be rotated by various components or methods. For instance, as illustrated in FIGS. 27 and 34, in some embodiments, the secondary driveshaft 70 may be connected to a handle or lever 71, which can be manually adjusted by an operator of the drill 10. The lever 71 may be securely held in various positions, which correspond with the secondary driveshaft 70 and/or the gate valve 68 being securely held in various positions. As was noted above, the gate valve 68 being positioned at various positions (e.g., further away from or closer to the metering wheels 53, 54) will provide for the channel 69 to have a correspondingly larger or smaller size. It is noted that a single lever 71 may be used to rotate the secondary driveshaft 70, such that the positions of each of the gate valves 68 of the metering devices 16 through which the secondary driveshaft 70 extends can be simultaneously adjusted. As an alternative to the lever 71, the secondary driveshaft 70 may be connected to a motor or gear system, which can actuate the secondary driveshaft 70 automatically or from a remote command provided by the operator of the drill 10 (e.g., from a cab of the tractor pulling the drill 10).

Figure 30:
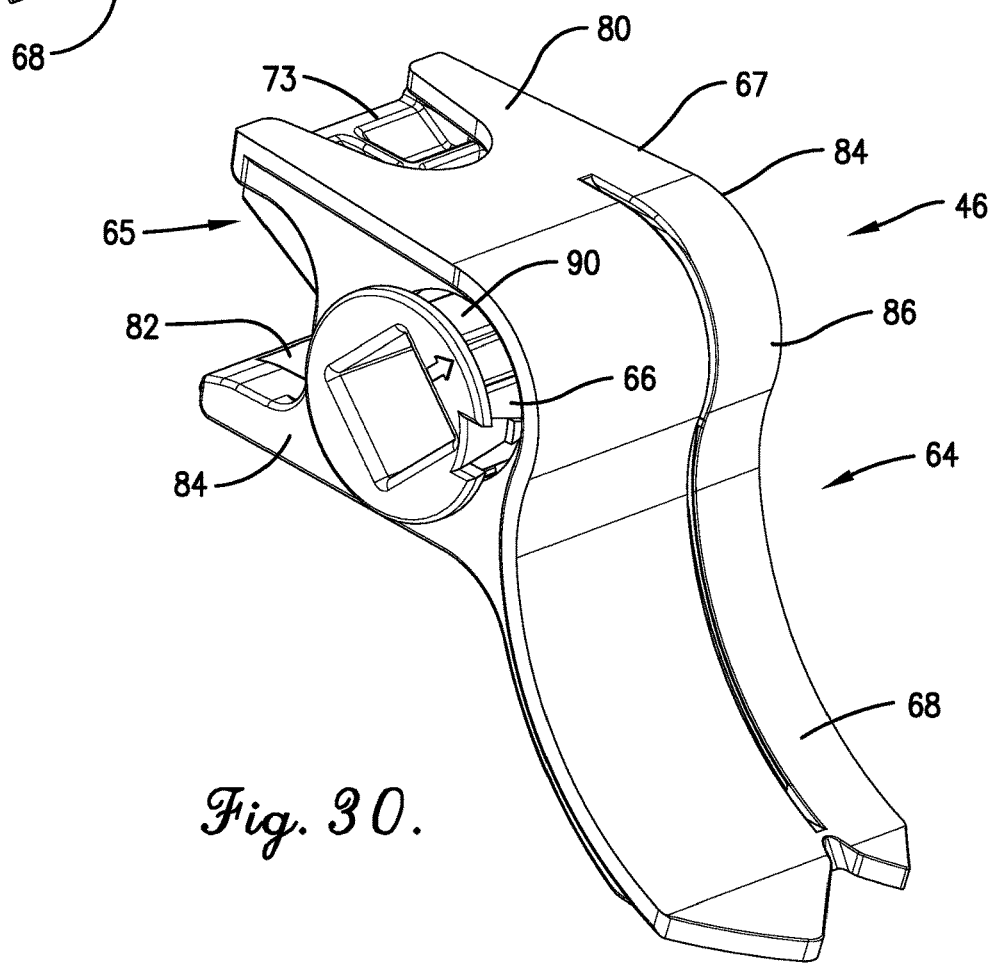
FIG. 30 is a perspective view of a second side of the gate assembly from FIG. 29.
Figure 31:
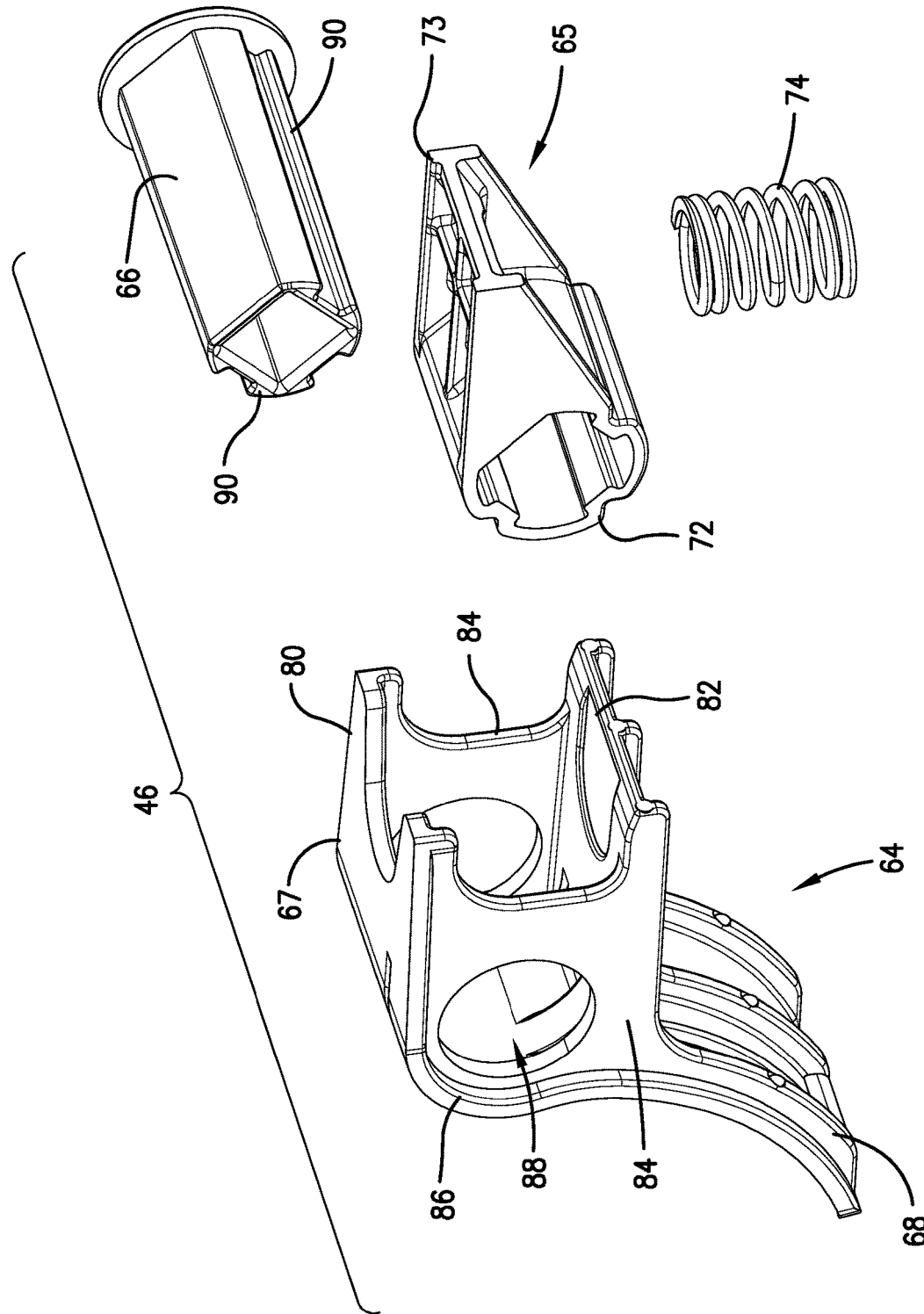
FIG. 31 is a first side exploded view of the gate assembly from FIGS. 29 and 30.
Figure 32:
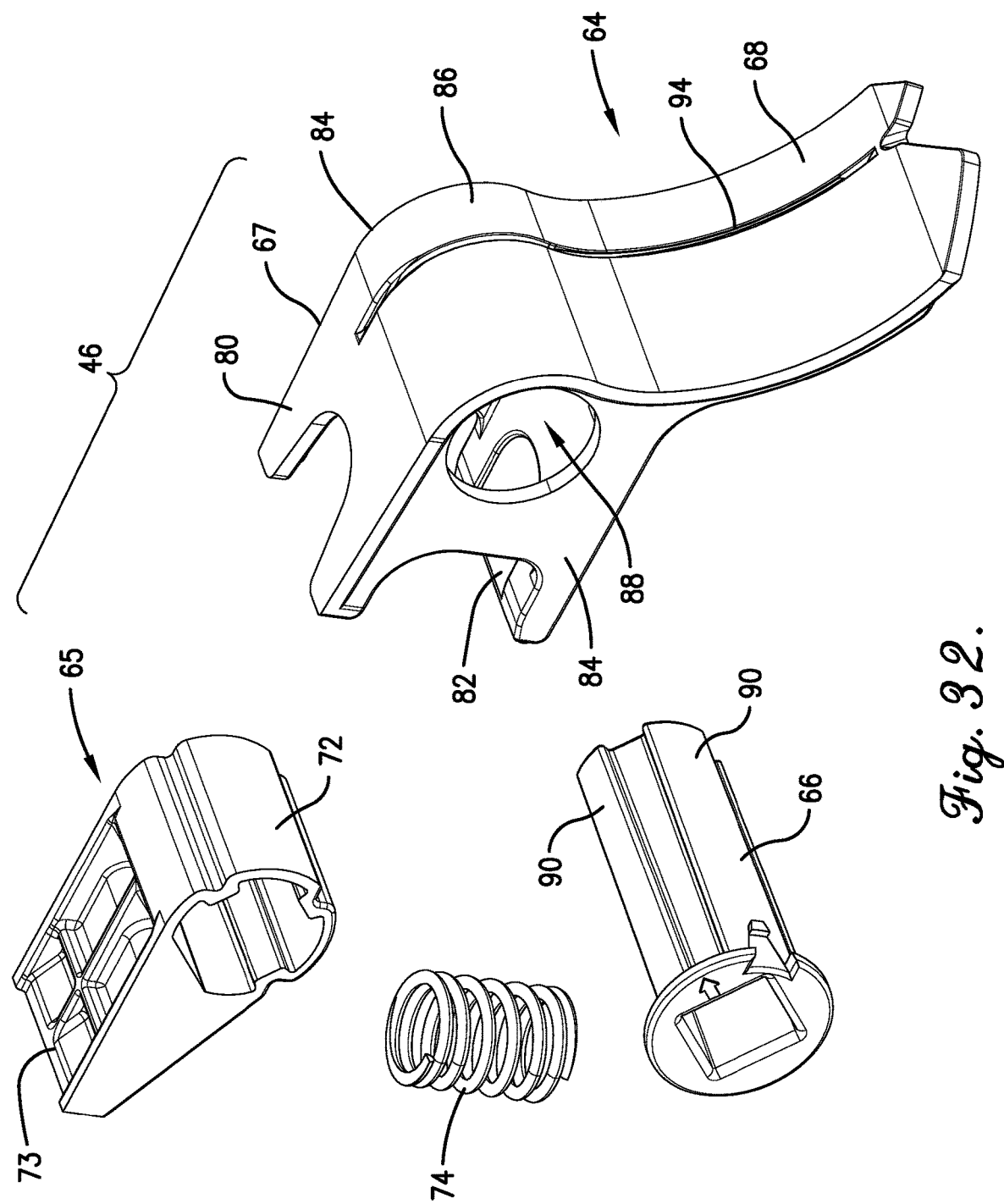
FIG. 32 is a second side exploded view of the gate assembly from FIGS. 29-31.

As illustrated in FIGS. 31 and 32, the gate stop 65 may comprise a hollowed barrel section 72 and a flange element 73 extending from the barrel section 72. The gate stop 65 may further comprise a biasing element 74, which as will be discussed in more detail below, may be used to maintain the product gate 64 (including the gate valve 68) in an intended position within the interior space of the metering device 16. In some embodiments, the biasing element 74 will comprise a spring. In more detail, the gate stop 65 will generally be positioned within a receiving area presented by the base 67 of the product gate 64 (See FIGS. 29 and 30). The receiving area may be a generally rectangular area defined by, as shown in FIGS. 31 and 32, a top side 80, a bottom side 82, a pair of lateral sides 84, and back side 86. In some embodiments, an exterior surface of the back side 86 may provide a continuation surface of the gate valve 68.

Figure 29:
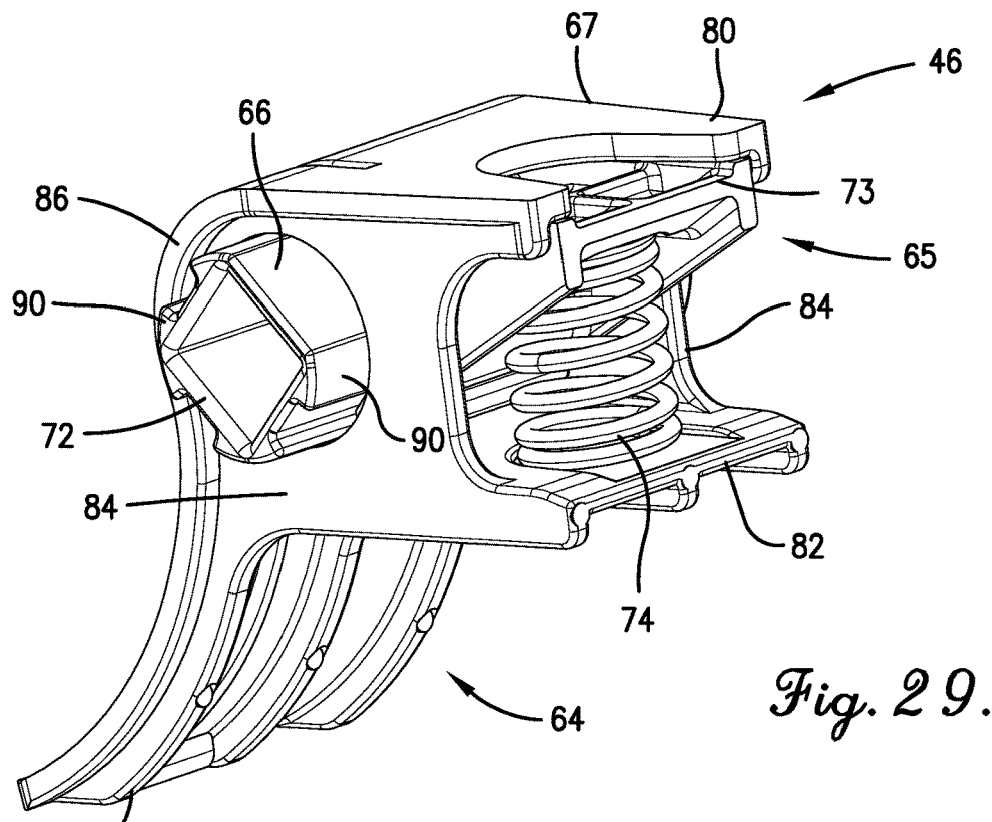
FIG. 29 is a perspective view of a first side of a gate assembly according to embodiments of the present invention.

The gate stop 65 may be positioned within the base 67 of the product gate 64, as illustrated in FIGS. 29 and 30, such that the interior passageway presented by the barrel section 72 of the gate stop 65 is aligned with openings 88 (See FIGS. 31 and 32) formed through both the lateral sides 84 of the product gate 64. In such a position, the biasing element 74 will extend between a bottom surface of the flange element 73 of the gate stop 65 and a top surface of the bottom side 82 of the product gate 64. In such a configuration, the biasing element 74 can be used to bias the gate valve 68 in a particular position, such that if the gate valve 68 is forced downward (e.g., via a force applied to an upper surface of the gate valve 68), the biasing element 74 will function to counteract such downward force, as will be discussed in more detail below.

The gate assembly 46 may be held in position within the interior space of the metering device 16 via the gate key 66. Specifically, the gate key 66 is configured to secure the remaining components of the gate assembly 46 to the upper housing 40. In more detail, a lower, front side of the upper housing 40 may include a pair of openings 89, as illustrated in FIGS. 13 and 14, extending through the side panels of the upper housing 40. The assembled gate assembly 46 can be inserted into engagement with the upper housing 40 of the metering device 16, such that the interior passageway of the barrel section 72 of the gate stop 65 (as well as the openings 88 in the lateral sides 84 of the product gate 64) is aligned with the openings 89 formed in the side panels of the upper housing 40. In some embodiments, the gate assembly 46 may only be inserted into in engagement with the metering device 16 when the lower housing 42 has been removed from the upper housing 40. Regardless, with the gate assembly 46 positioned in alignment with the upper housing 40 of the metering device 16, as described above, the gate valve 68 will extend downward and/or rearward from the upper housing 40 (See, e.g., FIG. 35), while forward portions of the product gate 64 and the gate stop 65 will extend forward from the upper housing 40. To retain the gate assembly 46 in such position and in engagement with the upper housing 40, the gate key 66 can be inserted through the openings 89 in the upper housing 40, through the openings 88 in the product gate 64, and through the interior passageway of the gate stop 65 (See, e.g., FIG. 35).

With reference to FIGS. 31 and 32, the gate key 66 may be shaped as a generally hollow cylinder, with a flange extending around a circumference of one end of the cylinder. The exterior surface of the gate key 66 may include one or more longitudinally-extending protrusions 90. Such protrusions 90 are configured to engage with corresponding longitudinally-extending grooves formed on the interior surface of the interior passage way of the barrel section 72 of the gate stop 65. As a result, the gate key 66 and the gate stop 65 can be rotationally coupled/engaged, such that rotation of the gate key 66 will cause a corresponding rotation of the gate stop 65, and vice versa.

One of the openings 89 through the upper housing 40 may be formed so as to include a notch 92 within the side panel of the upper housing 40, as is shown in FIG. 14. In such a configuration, the gate key 66 may only be inserted into and/or removed from the opening 89 of the upper housing 40 when one of the protrusions 90 of the gate key 66 is aligned with the notch 92 of the opening 89. As such, once the product gate 64 and the gate stop 65 are inserted within the interior space of the upper housing 40 of the metering device 16 (as discussed above), the gate key 66 can hold such components in place by inserting the gate key 66 through the openings 89 in the upper housing 40, through the openings 88 in the product gate 64, and through the interior passageway of the gate stop 65.

Figure 35:
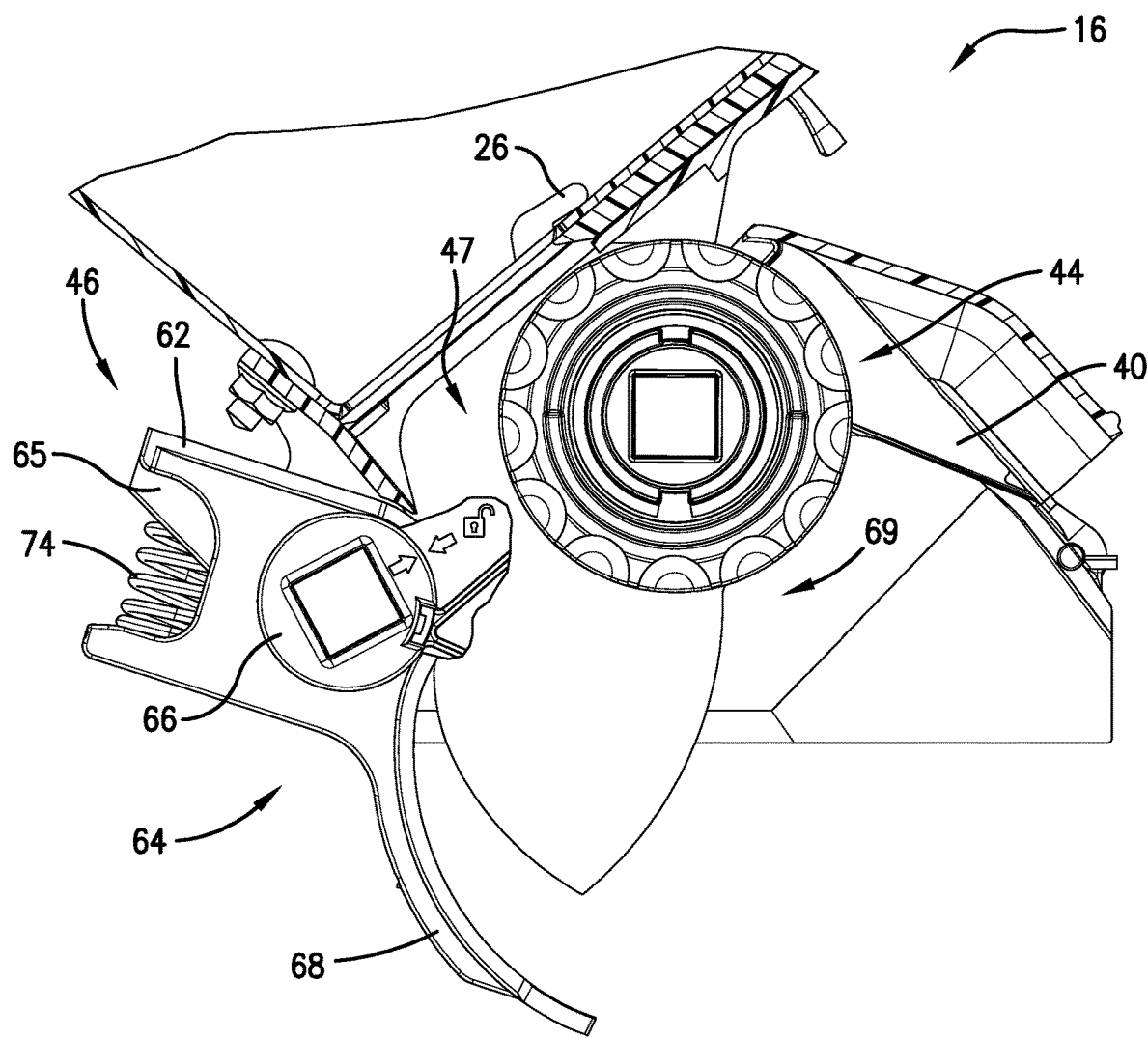
FIG. 35 is a cross section of a portion of a metering device according to embodiments of the present invention, with the metering device secured to a bottom of a bin, and with the metering device including a gate assembly configured in an installation position, and particularly illustrating a gate key in alignment with an upper housing of the metering device so as to facilitate insertion or removal of the gate key through the upper housing.

However, as was noted above, to insert the gate key 66 through the openings 89, the gate key 66 must be orientated such that one of the protrusions 90 of the gate key 66 is aligned with the notch 92 of the opening 89 formed in the side panel of the upper housing 40. To facilitate proper alignment for insertion, the flange of the gate key 66 and the exterior surface of the side panel of the upper housing 40 may include one or more markings to help illustrate when proper alignment has been obtained to permit insertion of the gate key 66 through the opening 89. For example, as shown in FIG. 35, both the gate key 66 and the side panel of the upper housing 40 may be formed with an arrow marking, such that alignment of the arrow markings indicates proper installation alignment between the protrusions 90 of the gate key 66 and the notch 92 of the opening 89 of the side panel of the upper housing 40. Upon proper installation alignment, as indicated by aligning the arrow markings (See, e.g., FIG. 35), the gate key 66 can be inserted within the openings 89 of the upper housing 40. It is also noted that the gate key 66 may, in some embodiments, only be removed from the openings 89 of the upper housing 40 when properly aligned (e.g., by aligning the arrow markings as shown in FIG. 35).

Figure 36:
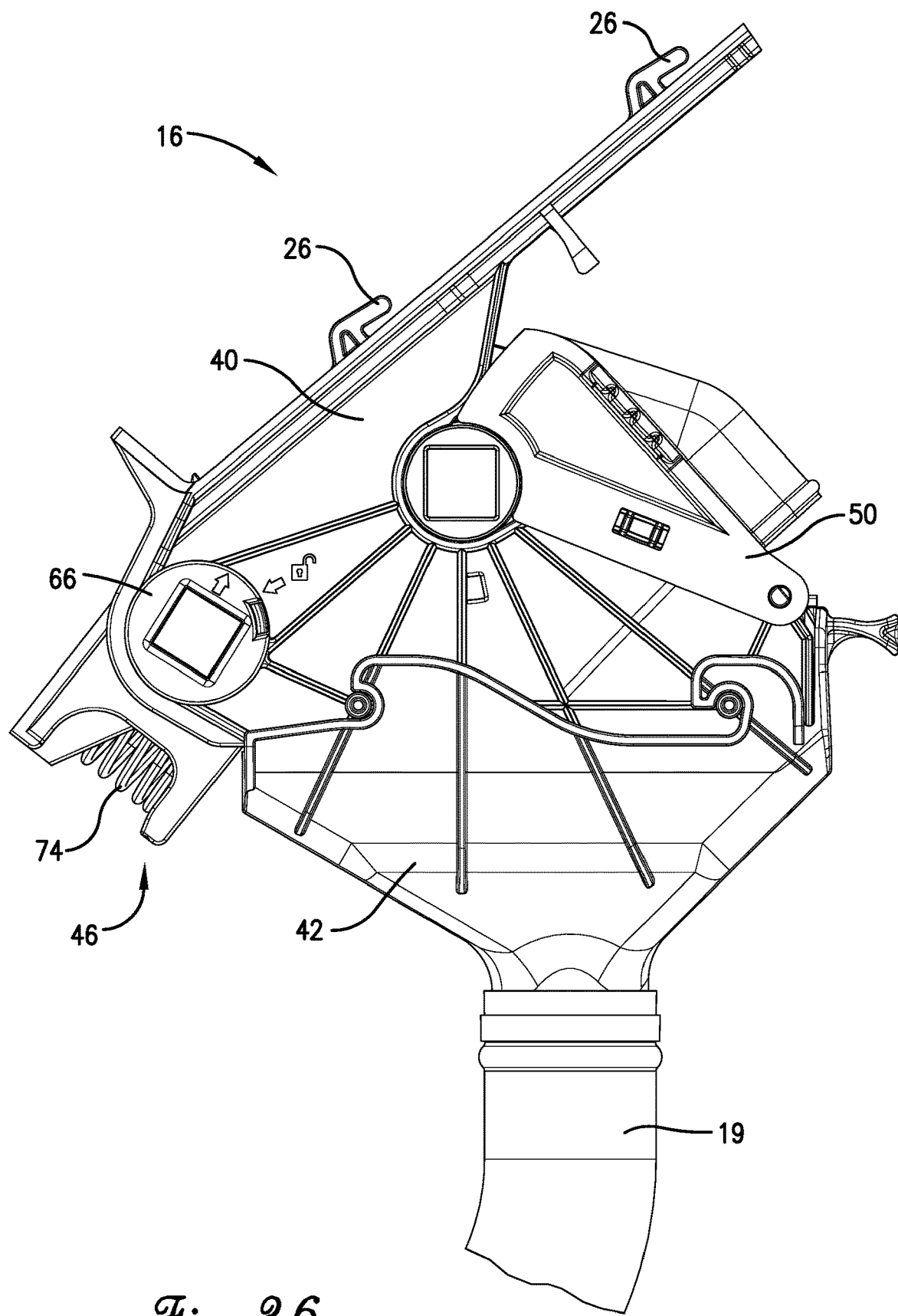
FIG. 36 is a side elevation view of the metering device from FIGS. 11-14, particularly illustrating a gate key partially out of alignment with an upper housing of the metering device such that a gate assembly is in a cleanout position.
Figure 37:
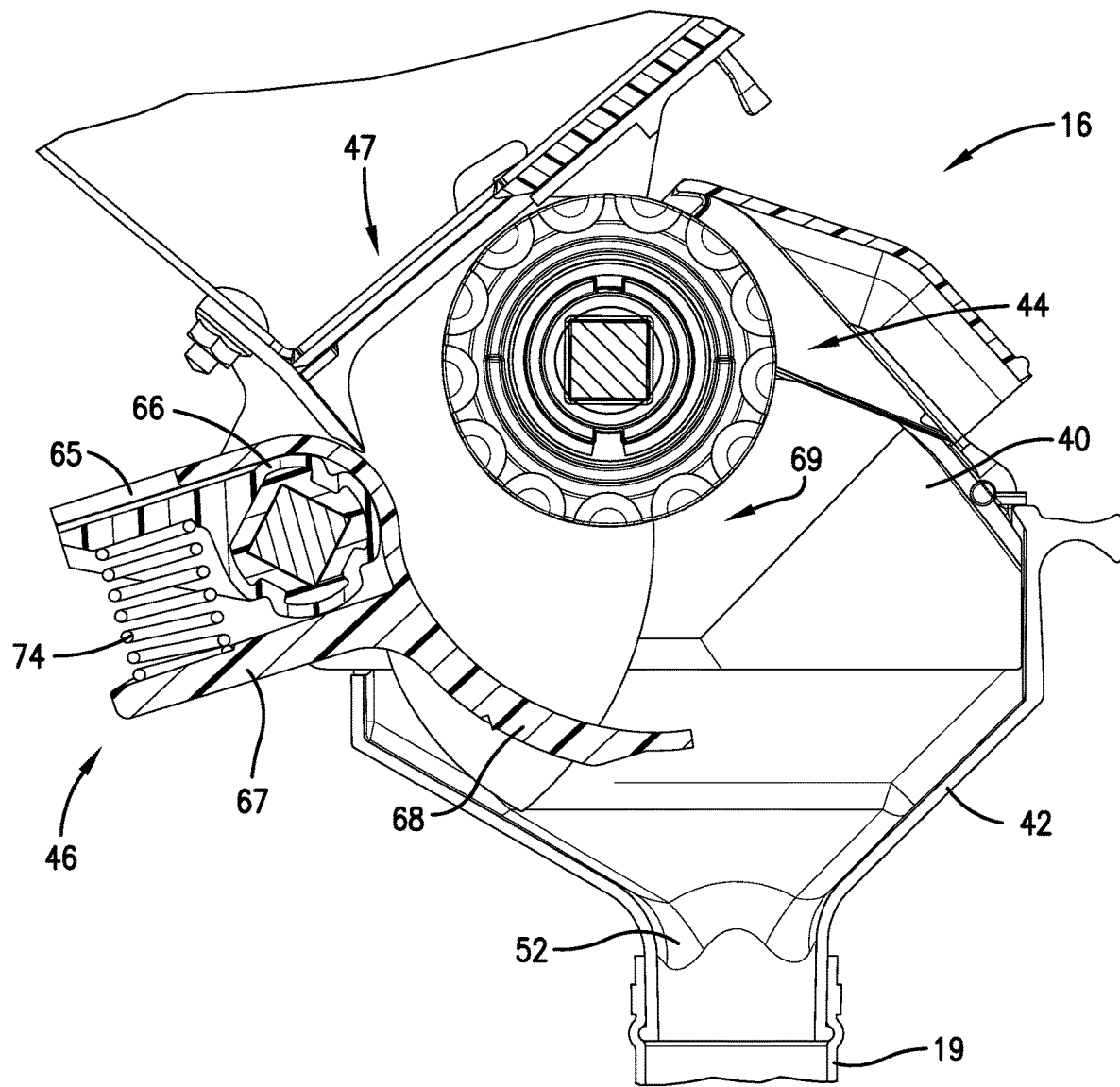
FIG. 37 is a cross section of the metering device from FIG. 36 secured to a bottom of a bin, and further illustrating the gate assembly in the cleanout position.

In more detail each of the protrusions 90 of the gate key 66 must also be aligned with corresponding grooves formed in the barrel 72 of the gate stop 65 to permit the gate key 66 to be inserted through the gate stop 65. Given such alignment requirements between the gate key 66 and the gate stop 65, when the gate key 66 is aligned and inserted within both the openings 89 and the gate stop 65, the gate valve 68 will generally not be positioned in a normal operating position that is to be used when the metering device 16 is operating to dispense agricultural products. Instead, the gate valve 68 will be positioned in an installation position, as illustrated in FIG. 35, which provides for the gate valve 68 to be spaced significantly apart from the metering wheels 53, 54. In such a configuration, the gate valve 68 is generally orientated downward so as to maximize the size of the channel 69. In addition to the installation position, and as will be discussed in more detail below, the gate valve 68 can be actuated to a cleanout position as illustrated in FIGS. 36 and 37. In such a cleanout position, the gate valve 68 may be spaced apart from the metering wheels 53, 54 an extent that is in between the installation position and an operational position (described below). Such positioning of the gate valve 68 permits agricultural product to flow generally freely through the metering device 16, such as may be required when cleaning out the metering device 16 and/or the bin 14 to which the metering device 16 is secured. In the cleanout position, the arrow of the gate key 66 may be rotated at least partly upward, out of alignment with the arrow on the upper housing 40 (See FIG. 36).

From the installation position and/or from the cleanout position, the gate valve 68 can be actuated to an operating position by rotating the product gate 64 upward, as is illustrated in FIG. 22. In the operating position, the arrow of the gate key 66 may be rotated upward (e.g., directly upward), significantly out of alignment with the arrow on the upper housing 40, as shown in FIG. 12. In more detail, the secondary driveshaft 70 can be inserted within the interior channel of the gate key 66. It should be understood that the surface of the interior channel of the gate key 66 will generally have a shape that corresponds with a shape of the exterior surface of the secondary driveshaft 70, such that rotation of the secondary driveshaft 70 will cause a corresponding rotation of the gate key 66. Beneficially, rotation of the gate key 66 by the secondary driveshaft 70 will cause a misalignment of the protrusions 90 of the gate key 66 and the notch 92 of the opening 89 in the side panel of the upper housing 40, which will restrict the gate key 66 from being removed from the upper housing 40. Such rotation will also cause a misalignment of the arrow marking of the gate key 66 and the side panels of the upper housing 40, as shown in FIG. 12. In such a configuration (i.e., with the protrusions 90 of the gate key 66 misaligned with the notch 92 of the opening 89), the gate key 66 will be restricted form being removed from the openings 89 (as well as restricted from being removed from the product gate 64 and the gate stop 65). As such, embodiments provide for the gate key 66 to be rotated between an unlocked position and a locked position. When in the unlocked position, the gate key 66 can be removed from the upper housing 40. When in the locked position, the gate key 66 is restricted from being removed from the upper housing 40. Once the gate key 66 has been removed from the upper housing 40, the remaining components of the gate assembly 46 can also be removed from the upper housing 40.

With reference to FIGS. 29 and 30, rotation of the gate key 66 (as caused by the rotation of the secondary driveshaft 70) will cause a corresponding rotation of the gate stop 65 due to the engagement between the protrusions 90 of the gate key 66 with the grooves formed in the barrel 72 of the gate stop 65. Correspondingly, rotation of the gate stop 65 will cause a rotation of the product gate 64 (including the gate valve 68) due to the engagement of the gate stop 65 with the base 67 of the product gate 64. Specifically, an upper surface of the gate stop 65 will generally be positioned adjacent to (and engaged with) an inner surface of the top side 80 of the product gate 64. In addition, the biasing element 74 of the gate stop 65 will generally be positioned adjacent to (and engaged with) an inner surface of the bottom side 82 of the product gate 64. As such, rotation of the gate stop 65 will cause a corresponding rotation of the product gate 64. As a result of such engagement, the gate valve 68 can be shifted upward from the installation position (e.g., FIG. 35) to an operational position (e.g., FIGS. 12 and 22) by rotating the secondary driveshaft 69.

Figure 33:
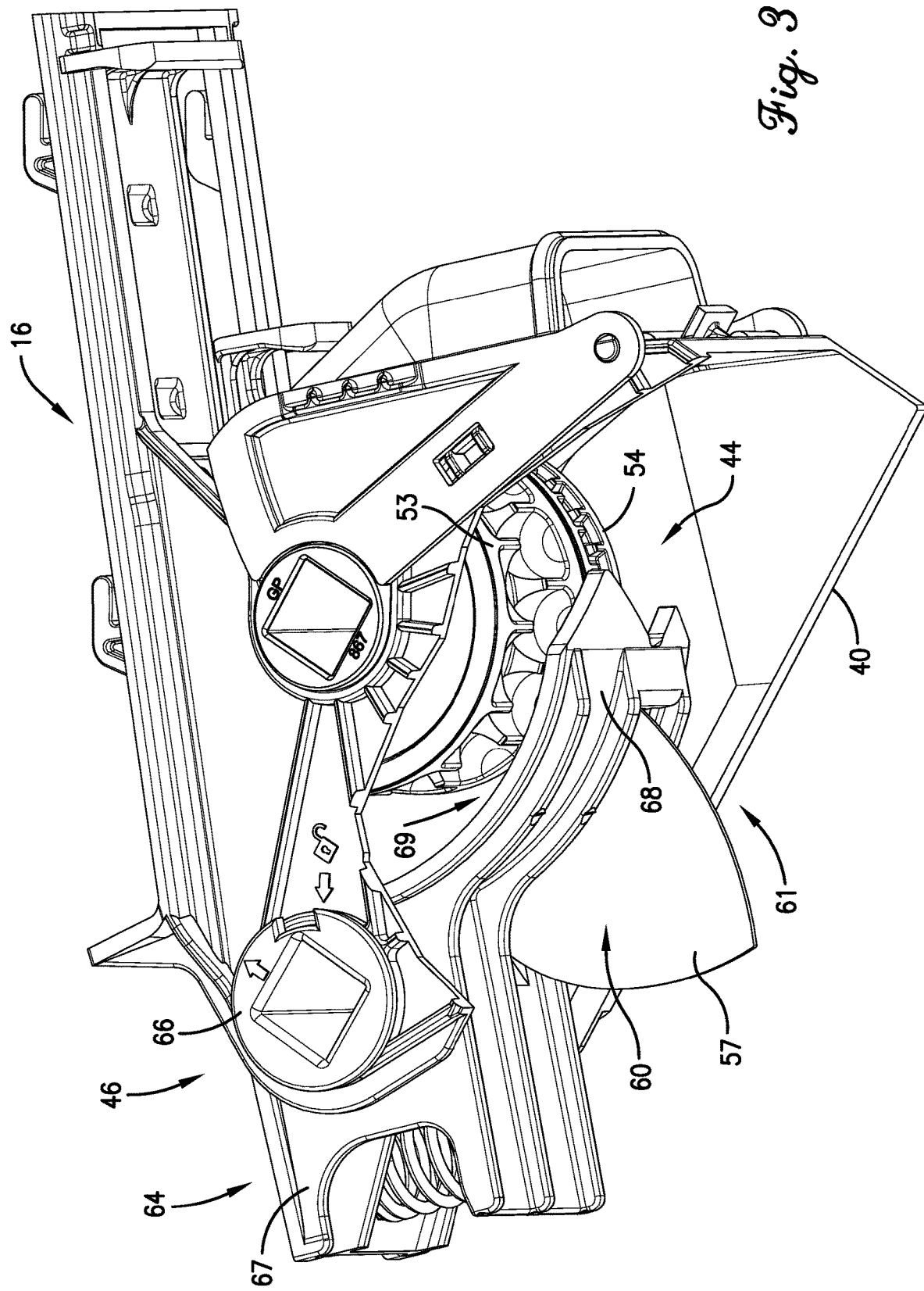
FIG. 33 is another perspective view of the metering device from FIGS. 11-14, with portions of the metering device cut away to illustrate a product channel presented between a gate assembly and metering wheels of the metering device.

As was described above, the gate valve 68 can be positioned in various operating positions, which each correspond to a different channel 69 size (i.e., the size of the channel presented between the gate valve 68 and the metering wheels 53, 54). Beneficially, in some embodiments, the gate valve 68 may be formed with a slit-like opening 94 (See, e.g., FIG. 32) that receives the divider 57 (See FIG. 33), such that the gate valve 68 may be shifted upward and downward within the metering device 16 without the divider 57 interfering with the movement of the gate valve 68. The closer the gate valve 68 is to the metering wheels 53, 54, the smaller the channel 69. And the further the gate valve 68 is from the metering wheels 53, 54, the larger the channel 69. As such, the secondary driveshaft 70 can be used to position the gate valve 68 in the intended operating position required to generate the channel 69 size necessary for conveying a particular type or size of agricultural product. Furthermore, because the secondary driveshaft 70 extends through each of the metering devices (See FIG. 3), the operating position of each of the gate valves 68 of the metering devices 16 associated with a given bin 14 can be controlled simultaneously.

In operation, a plurality of the metering devices 16 will be secured to a bottom side of the bins 14 of the drill 10, as illustrated in FIG. 3. For each of the metering devices 16, one of the product doors 48, 49 will be configured in the open position, such that agricultural product will be permitted to flow from the associated bin 14 into the metering device 16. As was described above, if the first product door 48 is open, a first type of agricultural product (e.g., large seed) can flow from the bin 14 into the first product space 61a of the metering device 16, such that the first metering wheel 53 can convey the first type of agricultural product through the metering device 16 for dispensing from the drill 10 and into and/or onto the ground. Alternatively, if the second product door 49 is open, a second type of agricultural product (e.g., small, fine seed) can flow from the bin 14 into the second product space 61b of the metering device 16, such that the second metering wheel 54 can convey the second type of agricultural product through the metering device 16 for dispensing from the drill 10 and into and/or onto the ground.

FIG. 22 illustrates agricultural product flowing through the metering device 16 with the gate valve 68 in one of the normal operating positions. As illustrated, agricultural product will flow from the bin 14 into the interior space of the metering device 16 via the product inlet 47 (e.g., through one of the open product doors 48, 49). The agricultural product is propelled through the interior space of the metering device 16 via rotation of the metering wheels 53, 54 of the metering assembly 44. Specifically, agricultural product will be captured by the flutes on the metering wheels 53, 54, such that rotation of the metering wheels 53, 54 will convey the agricultural product counterclockwise (when viewing FIG. 22), around the interior space of the metering device 16 to the product gate 64. At such point, the metering wheels 53, 54 continue to convey the agricultural product through the channel 69 presented between the metering wheels 53, 54 and the gate valve 68 of the product gate 64 until the agricultural product passes over the gate valve 68 and falls out of the metering device 16 through the product outlet 52. As should be apparent, the size of the channel 69 can be selected to permit a particular type and size of agricultural product to be efficiently conveyed through the metering device 16. For larger agricultural product, the size of the channel 69 can be increased by positioning the gate valve 68 further away from the metering wheels 53, 54 by rotating the gate assembly 46 via rotation of the secondary driveshaft 70. Alternatively, for smaller agricultural product, the size of the channel 69 can be decreased by positioning the gate valve 68 closer to the metering wheels 53, 54 by rotating the gate assembly 46 via rotation of the secondary driveshaft 70.

Figure 38:
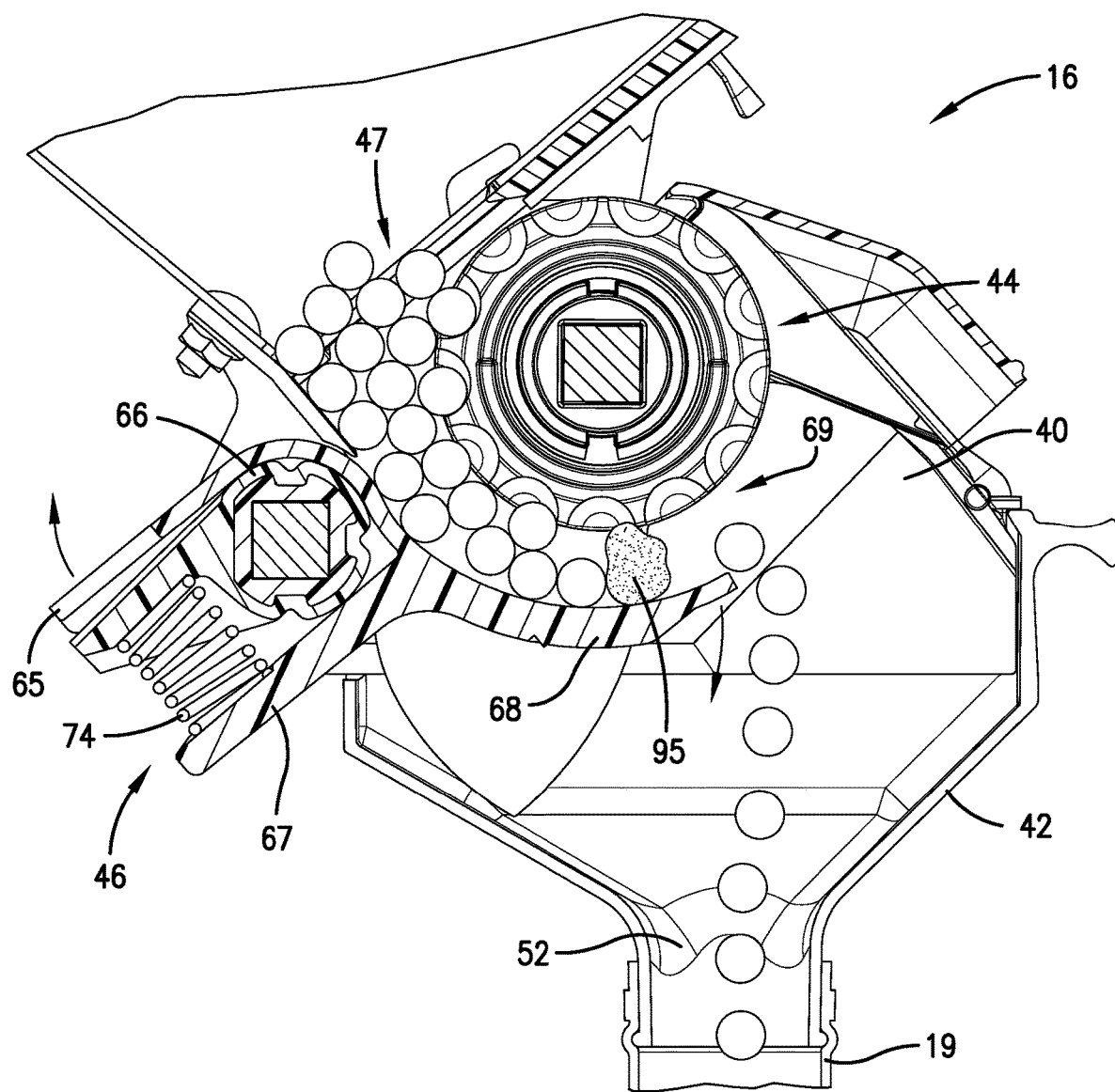
FIG. 38 is another cross section of the metering device secured to a bottom of the bin, as is shown in FIG. 22, and particularly illustrating the metering device conveying a large object through an interior space of the metering device.

Furthermore, the gate valve 68 of the product gate 64 is configured to flex downward so as to prevent potential jamming and damaging of the metering device 16. For instance, as illustrated in FIG. 38, if a large obstacle 95 or piece of debris enters the metering device 16 (along with the agricultural product), the obstacle 95 will be conveyed by the metering wheels 53, 54 in a manner similar to that described above with respect to the agricultural product. If, however, the obstacle 95 is too large to pass through the channel 69 presented between the metering wheels 53, 54 and the product gate 64, the product gate 64 is configured to rotate, thereby permitting the gate valve 68 to flex downward, so as to as to temporarily enlarge the channel 69 to a size sufficient to allow the obstacle 95 to pass without damaging components of the metering device 16. Specifically, as shown in FIG. 38, the product gate 64 can be forced to rotate clockwise (as viewed from FIG. 38) about an axis presented by the gate key 66 under pressure from the obstacle 95. Such rotation of the product gate 64 provides for the gate valve 68 to flex downward to enlarge the channel 69 a sufficient amount to permit the obstacle 95 to pass. Of note, the downward flexing of the gate valve will generally be only temporary because during rotation of the product gate 64, the base 67 of the product gate 64 will compress the biasing element 74 against the gate stop 65. After the obstacle 95 has passed through the channel, the biasing element 74 will force the product gate 64 to rotate back to its previous operating position. As such, embodiments of the present invention provide for the channel 69 to be temporarily enlarged so as to prevent jamming and damage to components of the metering device 16 in instances where large obstacles or debris are received in the metering device 16.

Embodiments of the present invention further provide for the metering devices 16 to be easily disassembled by hand. Such disassembly permits efficient cleaning and maintenance of the metering devices 16, as well as to permit the metering devices 16 and/or the bins 14 to be emptied/cleaned of agricultural product. As was noted previously, the metering devices 16 may each comprise an upper housing 40 and a lower housing 42. Embodiments of the present invention provide for the lower housing 42 to be removed from the upper housing 40. Such removal may be performed by hand, without the need for physical tools.

In more detail, each of the metering devices 16 may comprise a securement assembly that provides for the upper and lower housings 40, 42 to be removably engaged with each other. As illustrated in FIGS. 13 and 14, the securement assembly may comprise a plurality of projections 100 extending exteriorly from the side panels of the upper housing 40. In addition, the securement assembly may comprise a plurality of corresponding receiving hooks 102 extending upward from the lower housings 42. In alternative embodiments, the projections 100 may be formed on the lower housing 42, while the receiving hooks 102 may be formed on the upper housing 40. Nevertheless, to secure the upper housing 40 to the lower housing 42, the upper and/or lower housings 40, 42 can be manipulated until the projections 100 are received within notches presented by the receiving hooks 102, such as illustrated in FIG. 12.

Figure 39:
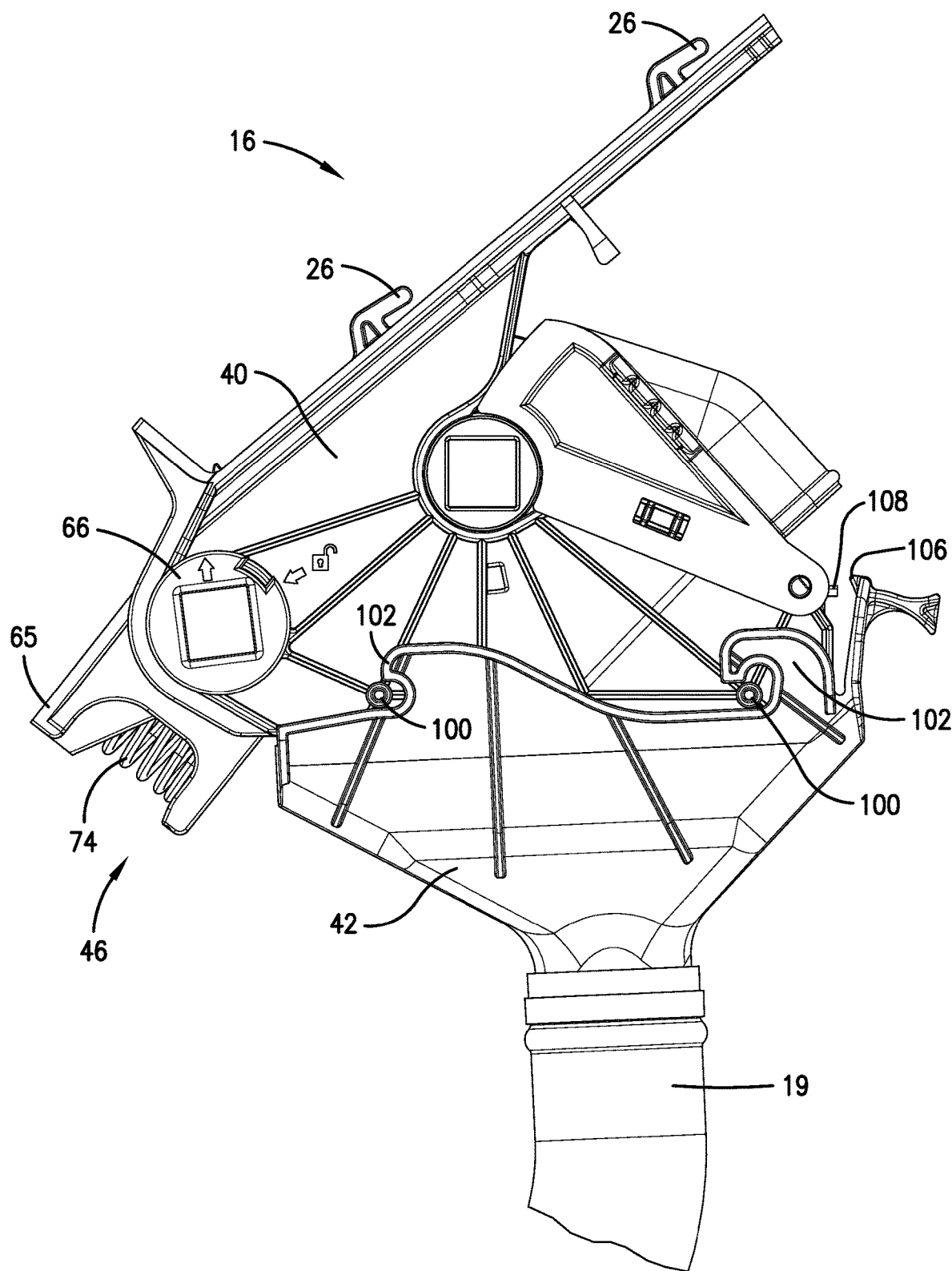
FIG. 39 is a side elevation view of the metering device from FIGS. 11-14, particularly illustrating a lower housing of the metering device being unsecured from an upper housing of the metering device.
Figure 40:
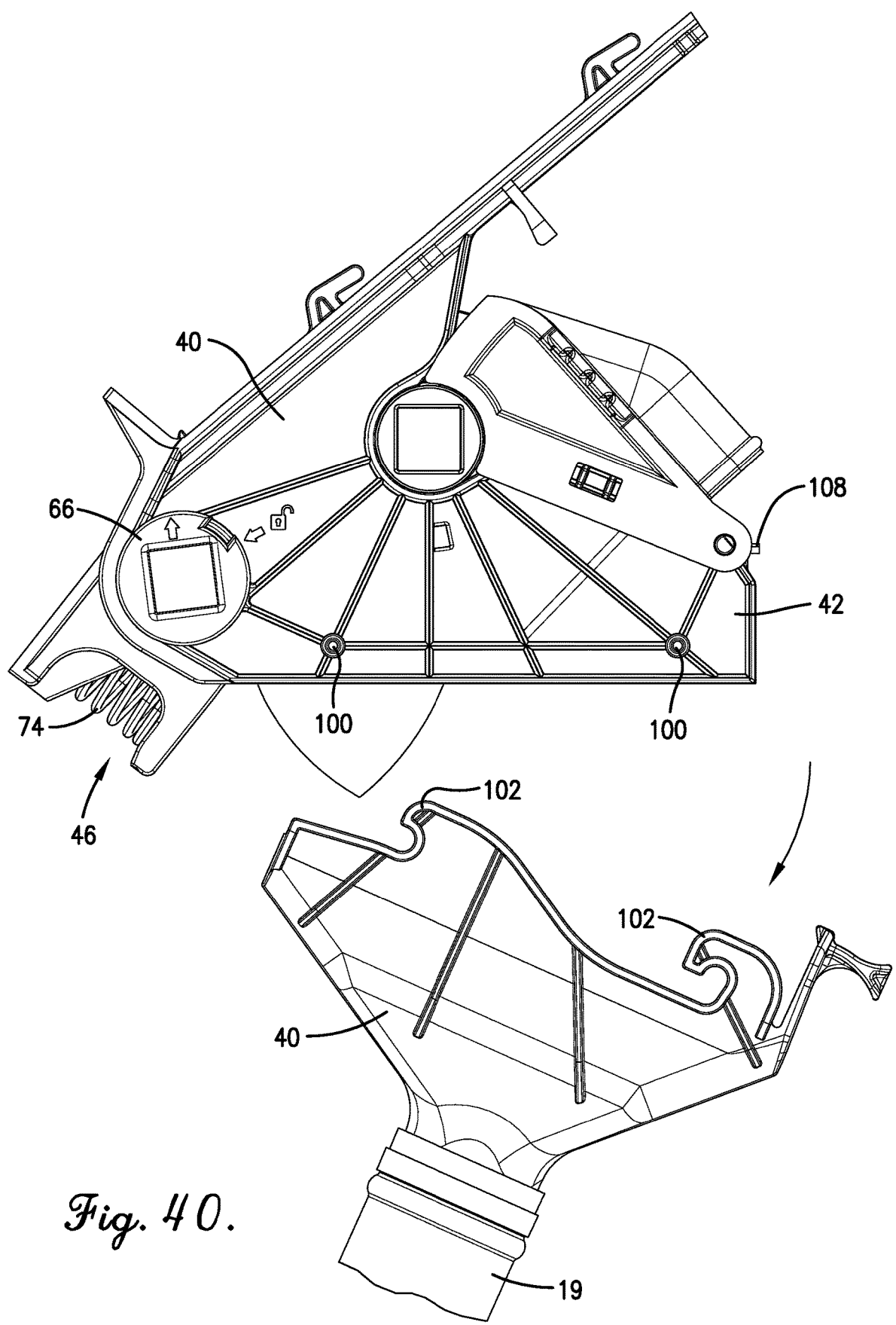
FIG. 40 is another side elevation view of the metering device from FIG. 38, particularly illustrating the lower housing being removed from the upper housing.

In additional embodiments, as shown in FIG. 12, the securement assembly may further include a spring lock 104 positioned on a front side of the metering device 16 (i.e., opposite the gate assembly 46), which can aid in securing the upper and lower housings 40, 42 together. The spring lock 104 may be configured as a snap latch comprising, as illustrated in FIGS. 13 and 39, a lower latch element 106 extending inward from the lower housing 42 and an upper catch element 108 extending outward from the upper housing 40. In some embodiments, the spring lock 104 may additionally include a cantilevered beam 109 that extends outwardly from the lower housing 42. As such, when the lower latch element 106 is engaged with the upper latch element 108, as shown in FIG. 12, the spring lock 104 functions to lock the upper housing 40 in engagement with the lower housing 42. Beneficially, however, because the receiving hooks 102 support the projections 100 when the upper and lower housings 40, 42 are secured together, the spring lock 104 is not required to support a significant amount of weight or stress (e.g., resulting from the weight of the metering device 16 and any agricultural product held therein). For example, the spring lock 104 may be configured to not experience stress forces due to the engagement between the upper and lower housing 40,42 during normal field operations of the drill 10. However, it should be appreciated that in some instances (e.g., the drill 10 encountering an obstacle or travelling over uneven terrain), various components of the drill 10 (e.g., one or more of the metering devices 16) may experience stresses that are imparted to the spring lock 104. As illustrated in FIG. 39, the spring lock 104 can be unlocked by hand (i.e., without the need for tools) by manipulating the cantilevered beam 109 in such a manner that the lower latch element 106 is pulled away from the upper latch element 108 until the bump of the latch elements 106, 108 are disengaged from each other. Upon the spring lock 104 being unlocked (See FIG. 39), the lower housing 42 can be removed from the upper housing 40 by shifting the lower housing 42 upward and/or rearward until the projections 100 on the upper housing 40 are disengaged from the receiving hooks 102 of the lower housing 42 (See FIG. 40). As such, the lower housing 42 can be removed from the upper housing 40 by pulling the lower housing 42 downward, away from the upper housing by hand, without the need for tools.

With the lower housing 42 removed, the interior space of the upper housing 40 of the metering device 16 can be accessed for maintenance, repair, calibration, or the like. In addition, agricultural product remaining in the metering device 16 and/or in the associated bin 14 can be quickly removed (i.e., cleaned out). To facilitate such a clean out, the gate assembly 46 may be actuated such that the gate valve 68 is in a cleanout position. In particular, the secondary driveshaft 70 can be rotated to the position illustrated in FIG. 36. As such, the gate valve 68 will be actuated downward from the operating position to the cleanout position, as illustrated in FIG. 37. As was noted previously, in the cleanout position, the gate valve 68 will generally be positioned apart from the metering wheels 53, 54 a distance that lies between the operating position and the installation position. In such a configuration, the channel 69 between the metering wheels 53, 54 and the gate valve 68 is enlarged from a normal operating position so as to permit the generally free flow of agricultural product through the metering device 16. It should be understood that embodiments of the present invention permit the removal of the lower housing 42 from the upper housing 40 even while the gate assembly 46 is in the cleanout position.

Embodiments provide for the removal of the lower housings 42 of the metering devices 16 to also facilitate calibration of such metering devices 16. Calibration may be used to refer to the rate at which agricultural product is conveyed through and/or dispensed from the metering devices 16. In more detail, embodiments of the present invention may include a calibration system 110, as illustrated in FIG. 41-44, which may comprise a tray 111 and one or more connection assemblies that permit the tray 111 to be secured to one or more upper housings 40 of metering devices 16, as such upper housings 40 are secured to the bottom of a bin 14. In some embodiments, the connection assemblies may include components that are similar to, or the same as, lower housings 42, with such components secured to an upper portion of the tray 111. Further reference to such components of the connection assemblies of the calibration system 110 will be as lower housings 42.

The tray 111 may comprise a generally rectangular receptacle for receiving agricultural product. The lower housings 42 of the calibration system 110 may be configured similar to or the same as the lower housings 42 previously described with respect to metering devices 16, i.e., funnel shaped, includes the receiving hooks 102, and the components of the spring lock 104 (See FIG. 41). The one or more lower housings 42 of the calibration system 110 may each be secured to the tray 111 via a connection brackets 112. In some embodiments, the connection brackets 112 may be slidingly secured to the tray 111, such as via a sliding rods 114 that extend along upper portions of the sides of the tray 111. As such, the position of the one or more lower housings 42 may shifted as necessary at any location along the length of the tray 111. The sliding rods 114 may, in some embodiments include stop elements 115 that prevent the lower housings 42 from sliding off the sliding rods 114.

To perform a calibration of a single metering device 16, the lower housing 42 of the metering device 16 may be removed from the upper housing 40. Next, a calibration system 110 with a single lower housing 42 may be secured to the upper housing 40 of the metering device 16. To accomplish such securement, the receiving hooks 102 of the lower housing 42 of the calibration system 110 may be engaged with the projections 100 of the upper housing 40 of the metering device 16. In addition, the lower latch element 106 of the lower housing 42 of the calibration system 110 may be engaged with the upper latch element 108 of the of the upper housing 40 of the metering device 16 to securely lock the upper and lower housings 40, 42 in place.

In such a configuration, the tray 111 will be securely held in position directly below the metering device 16. As such, the metering device 16 can be operated so as to convey and/or dispense agricultural product. Furthermore, the metering device 16 can be operated for a given period of time so as to dispense a quantity of agricultural product into the tray 111. Upon the expiration of the given period of time, operation of the metering device 16 can be halted, and the actual amount of agricultural product retained within the tray 111 can be measured (e.g., weighed) and compared with expected amounts. If the actual amounts of agricultural product retained within the tray 111 differ from the expected amounts, then the metering device 16 can be re-calibrated to increase or decrease the rate at which the metering device 16 conveys and/or dispenses agricultural product. Such re-calibration can be made through adjustment of the channel 69 size (i.e., the distance between the gate valve 68 and the metering wheels 53, 54, which may be adjusted via rotation of the secondary driveshaft 70), changing the size and/or type of the metering wheels 53, 54 (e.g., by removing the metering assembly 44 and replacing the metering wheels 53, 54 with different types and/or sizes of metering wheels), adjusting the rotational rate of the primary driveshaft 18, actuating the product doors 48, 49 to be more opened or more closed (e.g., expanding or restricting the product inlet 47 presented by the open product doors 48, 49), or other adjustments.

Figure 41:
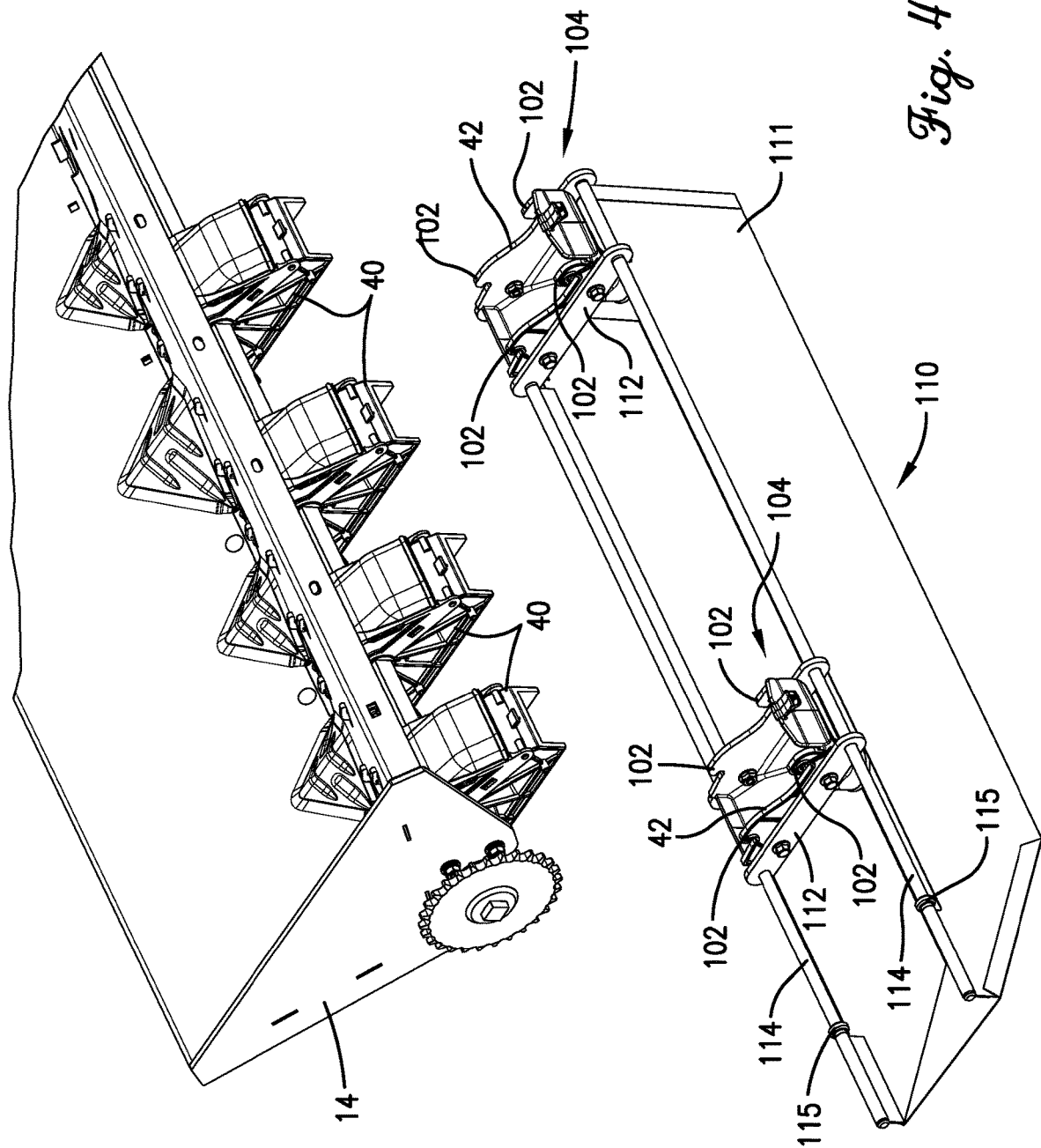
FIG. 41 is an upper perspective view of a calibration system configured for attachment to portions of one or more metering devices that are secured to a bottom of a bin.
Figure 42:
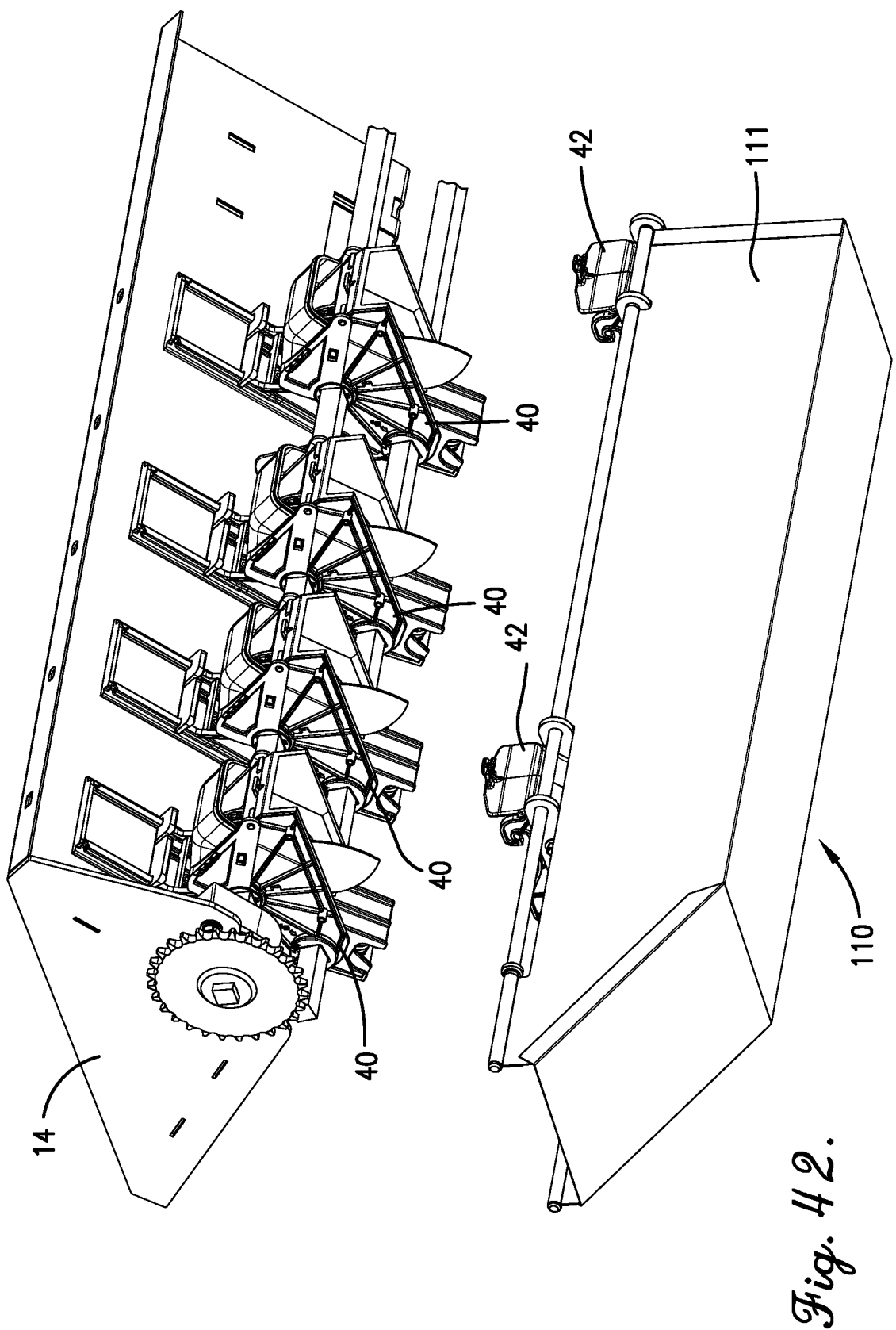
FIG. 42 is a lower perspective view of the calibration system from FIG. 41 configured for attachment with the portions of the one or more metering devices.
Figure 43:
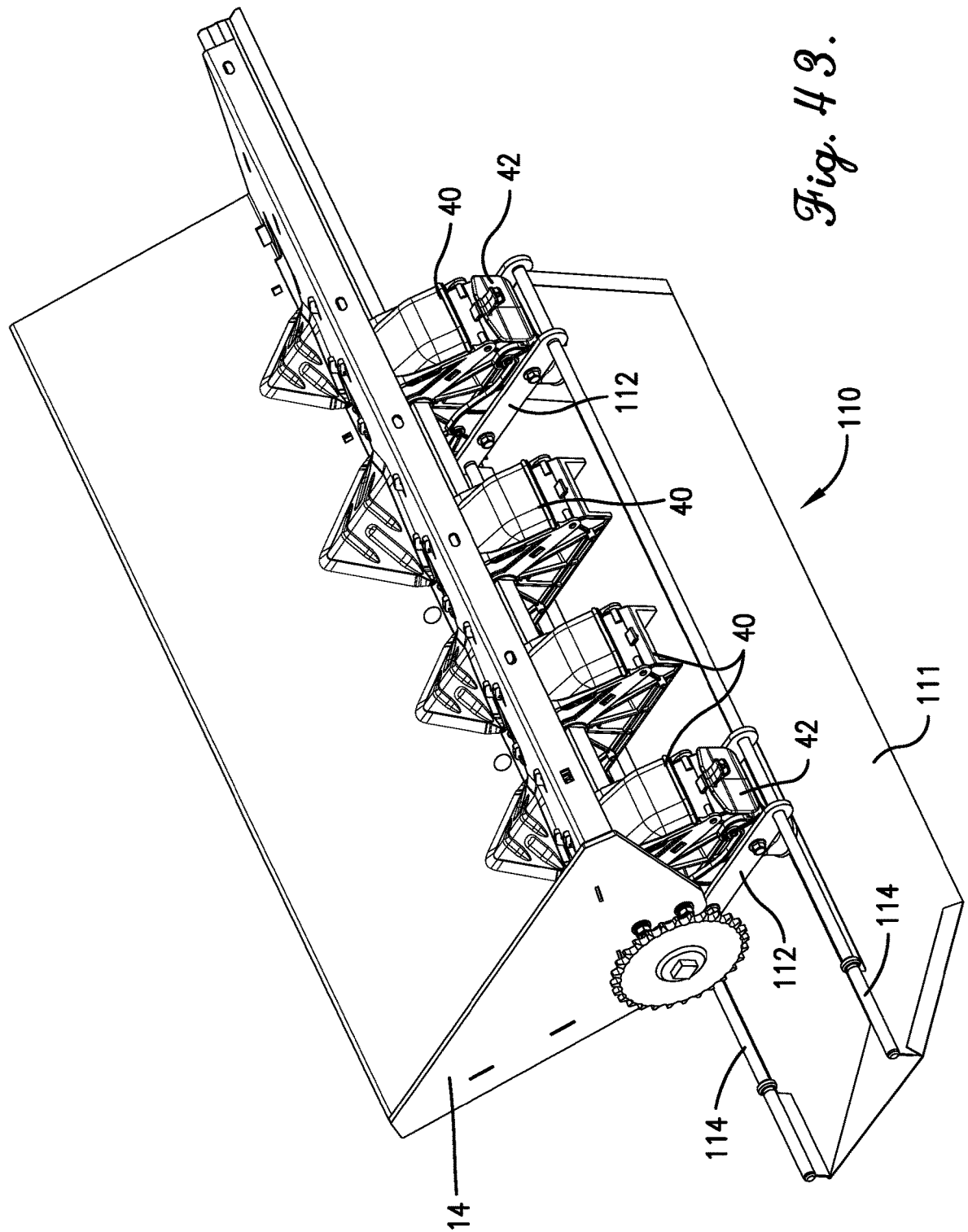
FIG. 43 is an upper perspective view of the calibration system from FIGS. 41 and 42 in attachment with the portions of the one or more metering devices.
Figure 44:
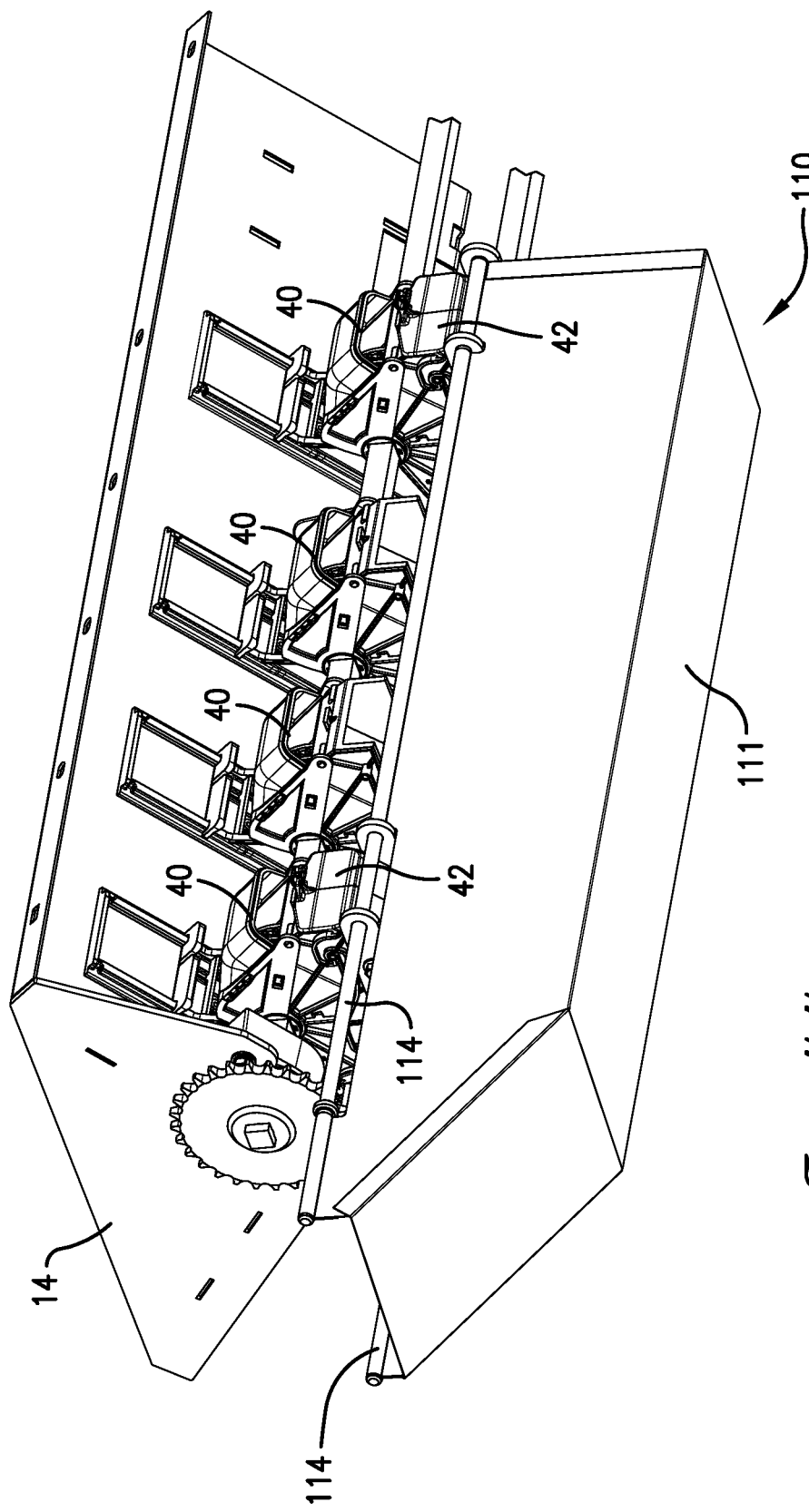
FIG. 44 is lower perspective view of the calibration system from FIGS. 41-43 in attachment with the portions of the one or more metering devices.

In embodiments in which a plurality of metering devices 16 requires calibration, a calibration system 110 with at least two lower housings 42 can be used, such as illustrated in FIGS. 41 and 42. Specifically, the tray 111 may include two lower housings 42, with one being positioned generally at each end of the tray 111. To begin calibration of the plurality of metering devices 16, the lower housings 42 of each of the plurality of metering devices 16 can be removed from their respective upper housings 40. Next, the two lower housings 42 of the calibration system 110 can be secured to the upper housings 40 of the outer two metering devices 16 from the plurality metering devices 16 requiring calibration, as illustrated in FIGS. 43 and 44. Such connection can be made via engagement of the receiving hooks 102 and projections 100, as well as the spring locks 104 (See FIGS. 41 and 42), as was previously described. In some embodiments, the positions of one or both of the lower housings 42 of the calibration system 110 may need to be shifted along the length of the tray 111 to ensure proper alignment with the appropriate upper housings 40 of the outer two metering devices 16 of the plurality of metering devices 16 to be calibrated. Specifically, the lower housings 42 can be shifted via the sliding of the connection brackets 112 along the sliding rods 114. Upon successful securement of the calibration system 110 to the upper housings 40 of the plurality of metering devices 16 to be calibrated, the outer two metering devices 16 as well as any metering devices 16 between the outer two metering devices 16 can be operated (e.g., via actuation of the metering assemblies 44) so as to dispense agricultural product from the bin 14 to the tray 111. Such agricultural product received within the tray 111 can be measured and compared with expected amounts. If the plurality of metering devices 16 require calibration to increase or decrease the rate at which agricultural product is dispensed, such calibration can be performed as was previously described with respect to the single metering device 16.

Figure 45:
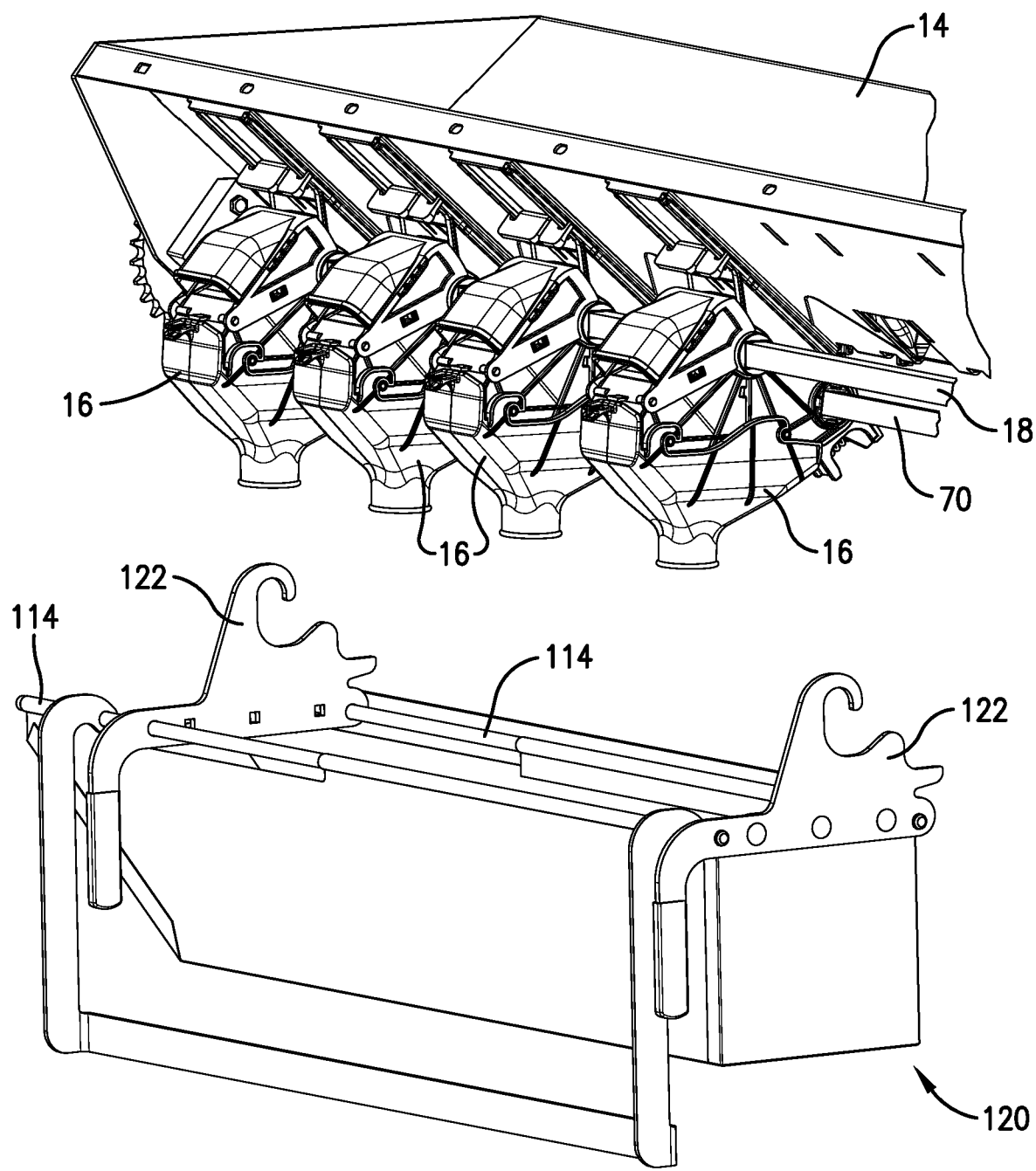
FIG. 45 is a perspective view of an additional embodiment of a calibration system configured to be positioned under one or more metering devices that are secured to a bottom of a bin.
Figure 46:
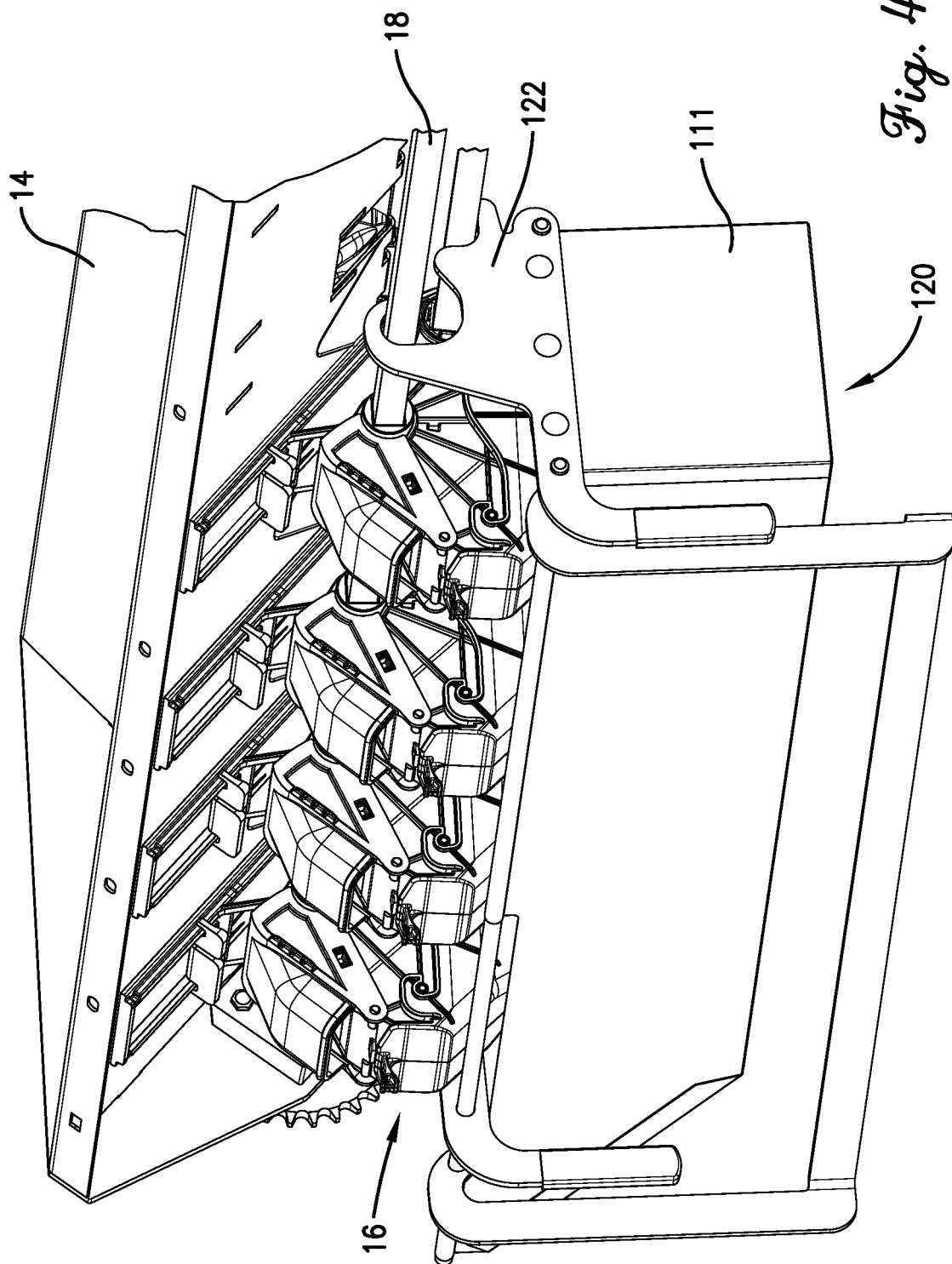
FIG. 46 is a perspective view of the calibration system from FIG. 45 secured underneath the one or more metering devices.

An additional embodiment of a calibration system 120 is illustrated in FIGS. 45 and 46. In such embodiments, the calibration system 120 may include a hanger assembly comprising a one or more hanger elements 122. The hanger elements 122 may be secured to the tray 111 via connection with the sliding rods 114. The hanger elements 122 may each include one or more hooks on an upper end of the hanger element 122. The hooks are configured to be secured over the primary and/or secondary driveshafts 18, 70, so as to secure the tray 111 of the calibration system 120 below one or more metering devices 16. For example, as illustrated in FIG. 46, the calibration system 120 can be hung, via the hooks of the hanger elements 122, on the primary driveshaft 18, such that the tray 111 is positioned below four metering devices 16. In some embodiments, one or more of the hanger elements 122 may slide along the sliding rods 114, such that the position of the hanger elements 122 can be adjusted as necessary to fit around or between the metering devices 16.

With the calibration system 120 configured as shown in FIG. 46, so as to be positioned under a plurality of metering devices 16 (e.g., four metering devices), the plurality of metering devices 16 can be operated so as to dispense agricultural product from the bin 14 to the tray 111. Such agricultural product received within the tray 111 can be measured and compared with expected amounts. If the plurality of metering devices 16 require calibration to increase or decrease the rate at which agricultural product is dispensed, such calibration can be performed as was previously described with respect to the single metering device 16. Beneficially, the calibration system 12 is secured in place via the hanger elements 122, such that the lower housings 42 of the metering devices 16 do not require removal from the upper housings 40 before calibration can be performed. Instead, the product tubes 19 (not shown in FIGS. 45 and 46) may simply be removed form the metering devices 16. In some further embodiments, the calibration system 120 may include a rotatable handle that can be used to facilitate transport and storage of the calibration system 120.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

What is claimed is:
1. A metering device for dispensing agricultural product from a bin, wherein said metering device comprises:
 a housing enclosing an interior space; and
 a gate assembly removably received within the interior space of said housing, wherein said gate assembly is configured to guide agricultural product through said housing, wherein said gate assembly comprises—
a product gate comprising an arcuately-extending gate valve, wherein said product gate at least partially defines a channel within the interior space of said housing through which agricultural product can flow,
a gate key configured to selectively secure said product gate within said housing, wherein rotation of said gate key is configured to cause a corresponding rotation of said product gate,
wherein said gate key is configured to rotate between an unlocked position and a locked position, wherein when in the unlocked position the gate key can be removed from said housing, and wherein when in the locked position the gate key is restricted from being removed from said housing,
wherein said gate key is formed as an elongated cylinder with a longitudinal protrusion extending along an exterior surface of said gate key,
wherein said housing includes an opening formed through a side panel of said housing, and wherein the side panel is formed with a notch positioned adjacent to the opening,
wherein when in the locked position, the protrusion of said gate key is misaligned with the notch formed in the side panel,
wherein when in the unlocked position, the protrusion of said gate key is aligned with the notch formed in the side panel.

2. The metering device of claim 1, wherein said gate assembly is removable from said housing by hand, without the need for tools.

3. The metering device of claim 1, wherein said gate assembly further comprises a gate stop engaged with the product gate via a biasing element.

4. The metering device of claim 3, wherein said biasing element is configured to permit said gate valve to resiliently deflect downward within said housing.

5. The metering device claim 3, wherein said gate key is configured to be received in said gate stop, and wherein an exterior surface of said gate key has a shape that corresponds with a shape of an interior surface of said gate stop such that rotation of said gate key is configured to cause rotation of said gate stop.

6. The metering device claim 1, wherein said gate key is configured to receive a driveshaft extending therethrough, and wherein rotation of the driveshaft is configured to cause a corresponding rotation of said gate key and said product gate.

7. The metering device claim 1, wherein said metering device further includes at least one metering wheel for conveying agricultural product through said housing, and wherein said gate valve extends underneath said metering wheel to present the channel between the product gate and the metering wheel.

8. The metering device of claim 7, wherein rotation of said gate key is configured to adjust a size of the channel.

9. The metering device of claim 1, wherein said bin comprises a seed bin associated with a seed drill.

10. The metering device of claim 1, wherein the agricultural product comprises seed.

11. An implement for dispensing agricultural product, said implement comprising:
a bin for holding the agricultural product;
a plurality of metering devices secured to a bottom of said bin and configured to dispense agricultural product from the bin into or onto the ground, wherein each of said metering devices includes—
a housing enclosing an interior space, and
a gate assembly removably received within the interior space of said housing, wherein said gate assembly is configured to guide agricultural product through said housing, wherein said gate assembly comprises—
a product gate comprising an arcuately-extending gate valve, wherein said product gate at least partially defines a channel within the interior space of said housing through which agricultural product can flow;
a gate key configured to selectively secure said product gate within said housing, wherein rotation of said gate key is configured to cause a corresponding rotation of said product gate,
wherein said gate key is configured to rotate between an unlocked position and a locked position, wherein when in the unlocked position the gate key can be removed from said housing, and wherein when in the locked position the gate key is restricted from being removed from said housing,
wherein said gate key is formed as an elongated cylinder with a longitudinal protrusion extending along an exterior surface of said gate key,
wherein said housing includes an opening formed through a side panel of said housing, and wherein the side panel is formed with a notch positioned adjacent to the opening,
wherein when in the locked position, the protrusion of said gate key is misaligned with the notch formed in the side panel,
wherein when in the unlocked position, the protrusion of said gate key is aligned with the notch formed in the side panel; and
a driveshaft extending through each of said gate keys of said metering devices.

12. The implement of claim 11, wherein said gate assembly of each metering device is removable from said housing by hand, without the need for tools.

13. The implement of claim 11, wherein for each metering device:
said gate assembly further comprises a gate stop engaged with the product gate via a biasing element, and wherein said biasing element is configured to permit said gate valve to resiliently deflect downward within said housing.

14. The implement of claim 13, wherein for each metering device:
wherein said gate key is configured to be received in said gate stop, and wherein an exterior surface of said gate key has a shape that corresponds with a shape of an interior surface of said gate stop such that rotation of said gate key is configured to cause rotation of said gate stop.

15. The implement of claim 11, wherein each of said metering devices further includes at least one metering wheel for conveying agricultural product through said housing of said metering device, and wherein for each metering device said gate valve extends underneath said metering wheel to present the channel through which agricultural product can flow, and wherein rotation of said gate key is configured to adjust a size of the channel.

16. A method of dispensing agricultural product from an implement, said method comprising the steps of:

(a) providing agricultural product from a bin of the implement to a metering device;
(b) conveying agricultural product through a channel formed within a housing of the metering device, wherein the channel is defined between at least one metering wheel and a gate assembly comprising a product gate including an arcuately-shaped gate valve extending below the metering wheel,
wherein the gate assembly further includes a gate key configured to selectively secure the product gate within the housing, wherein rotation of the gate key is configured to cause a corresponding rotation of the product gate, wherein the gate key is configured to rotate between an unlocked position and a locked position, wherein when in the unlocked position the gate key can be removed from the housing, and wherein when in the locked position the gate key is restricted from being removed from the housing, wherein the gate key is formed as an elongated cylinder with a longitudinal protrusion extending along an exterior surface of the gate key, wherein the housing includes an opening formed through a side panel of the housing, and wherein the side panel is formed with a notch positioned adjacent to the opening, wherein when in the locked position, the protrusion of the gate key is misaligned with the notch formed in the side panel, wherein when in the unlocked position, the protrusion of the gate key is aligned with the notch formed in the side panel;
(c) adjusting a position of the gate valve with respect to the metering wheel so as to adjust a size of the channel; and
(d) removing, by hand and without tools, the gate assembly from the housing of the metering device.

17. The method of claim 16, further comprising the step of locking the gate assembly in position within the metering device by rotating the gate key to the locked position.

* * * * *